United States Patent
Halstead et al.

(10) Patent No.: US 11,825,004 B1
(45) Date of Patent: Nov. 21, 2023

(54) COMMUNICATION DEVICE FOR CHILDREN

(71) Applicant: Mattel, Inc., El Segundo, CA (US)

(72) Inventors: Adam J. Halstead, Amherst, NY (US); Kurt J. Huntsberger, Arcade, NY (US); Carl J. Kamph, Hamburg, NY (US)

(73) Assignee: MATTEL, INC., El Segundo, CA (US)

( * ) Notice: Subject to any disclaimer, the term of this patent is extended or adjusted under 35 U.S.C. 154(b) by 0 days.

(21) Appl. No.: 18/121,684

(22) Filed: Mar. 15, 2023

Related U.S. Application Data

(63) Continuation of application No. 18/093,231, filed on Jan. 4, 2023.

(51) Int. Cl.
| | |
|---|---|
| *H04M 1/02* | (2006.01) |
| *A63F 13/87* | (2014.01) |
| *H04M 1/72427* | (2021.01) |
| *H04M 1/72412* | (2021.01) |
| *H04M 1/72469* | (2021.01) |

(52) U.S. Cl.
CPC ........... *H04M 1/0202* (2013.01); *A63F 13/87* (2014.09); *H04M 1/72412* (2021.01); *H04M 1/72427* (2021.01); *H04M 1/72469* (2021.01)

(58) Field of Classification Search
CPC ........... H04M 1/0202; H04M 1/72412; H04M 1/72427; H04M 1/72469; A63F 13/87
See application file for complete search history.

(56) References Cited

U.S. PATENT DOCUMENTS

| | | | |
|---|---|---|---|
| 7,174,187 B1* | 2/2007 | Ngan | H04M 1/72403 455/552.1 |
| 8,554,140 B2* | 10/2013 | Klemmensen | H04N 21/43637 455/458 |
| 10,063,990 B1 | 8/2018 | Lyren | |
| 10,080,111 B2 | 9/2018 | Poosala | |
| 10,251,014 B1 | 4/2019 | Lyren | |
| 10,496,360 B2 | 12/2019 | Lyren | |
| 10,499,179 B1 | 12/2019 | Lyren | |
| 10,499,184 B2 | 12/2019 | Lyren | |
| 10,520,782 B2 | 12/2019 | Busch | |
| 10,587,542 B2 | 3/2020 | Ihara | |
| 10,587,980 B2 | 3/2020 | Lyren | |
| 10,757,523 B2 | 8/2020 | Lyren | |
| 10,848,898 B2 | 11/2020 | Lyren | |
| 10,904,168 B2 | 1/2021 | O'Driscoll | |
| 10,923,118 B2 | 2/2021 | Li | |
| 11,103,773 B2 | 8/2021 | Rathod | |
| 2009/0111378 A1* | 4/2009 | Sheynman | H04W 4/80 455/41.1 |

(Continued)

FOREIGN PATENT DOCUMENTS

| | | |
|---|---|---|
| WO | 2015042376 A1 | 3/2015 |
| WO | 2017031477 A1 | 2/2017 |
| WO | 2017152167 A1 | 9/2017 |

*Primary Examiner* — Marisol Figueroa
(74) *Attorney, Agent, or Firm* — Edell, Shapiro & Finnan, LLC

(57) ABSTRACT

A system including one or more communication devices that can be used by children to play games, send messages, and talk with each other. The communication devices contain all of the needed circuitry and do not rely upon a separate communication network or system, thereby simplifying communications between the devices.

20 Claims, 32 Drawing Sheets

(56) References Cited

U.S. PATENT DOCUMENTS

| | | | |
|---|---|---|---|
| 2010/0125811 A1* | 5/2010 | Moore | G06F 3/04817 |
| | | | 715/846 |
| 2012/0295510 A1 | 11/2012 | Boeckle | |
| 2013/0316649 A1* | 11/2013 | Newham | H04W 88/04 |
| | | | 455/39 |
| 2014/0056417 A1* | 2/2014 | Wildman | G16H 40/20 |
| | | | 379/67.1 |
| 2014/0187292 A1 | 7/2014 | Poole | |
| 2015/0133025 A1 | 5/2015 | Ponomarev | |
| 2015/0251102 A1 | 9/2015 | Kuo | |
| 2015/0360139 A1 | 12/2015 | Watry | |
| 2016/0277903 A1 | 9/2016 | Poosala | |
| 2018/0130459 A1 | 5/2018 | Paradiso | |
| 2018/0143965 A1 | 5/2018 | Willson | |
| 2018/0302478 A1 | 10/2018 | Clediere | |
| 2018/0314409 A1* | 11/2018 | Adilipour | H04L 51/10 |
| 2019/0130874 A1 | 5/2019 | Wafford | |
| 2020/0221293 A1* | 7/2020 | Kim | H04W 12/084 |

* cited by examiner

Game 1 - Emoji Smash! (1p only)

Game 2 - Create-a-Moji! (1p or 2p)

Game 3 - Emoji Catch! (2p only)

COMMUNICATION DEVICE FOR CHILDREN

FIELD OF THE INVENTION

The present invention relates to a communication device for children, and in particular, to a communication device that can be paired with another similar communication device to provide a controlled environment for communications.

BACKGROUND

Conventional communication devices, such as phones, are utilized by users to communicate with each other. Often, such communication devices enable users to send messages back and forth and facilitate conversations between them. Such communication devices often can be used to access the Internet, which can be problematic for children.

There is a need for a communication device for children that operates in a controlled environment, which provides safety and avoids unintended operations. There is also a need for a communication device for children that facilitates easy and fun messaging between devices, whether the messages are voice messages or emoji messages.

SUMMARY

The present invention relates to a communication system that includes a first communication device including a first display configured to display a first user interface, and a first wireless communications interface, and a second communication device including a second display configured to display a second user interface, and a second wireless communications interface, wherein the first communication device and the second communication device are pairable to allow the first communication device and the second communication device to communicate over a short-range wireless network via the first and second wireless communications interfaces, and each of the first and second user interfaces s includes a plurality of function buttons associated with calling and messaging functions, and a plurality of emoji buttons associated with building emoji-based messages and playing emoji-based games.

In one embodiment, the short-range wireless network is a closed access network in which the first communication device and the second communication device can communicate only with each other and cannot communicate with any non-paired external devices. In another embodiment, the plurality of function buttons for each of the first and second user interfaces includes a call button that is selectable to send and receive live two-way voice calls, a send message button that is selectable to transmit voice messages and emoji messages, a record voice button that is selectable to record the voice messages, and a check message button that is selectable to play an available voice message or view an available emoji message. In addition, each of the first and second user interfaces further includes an interactive view window including a toolbar configured to display notification icons, an animation corresponding to a current emoji selected by a first user or a second user, and an emoji tracker. Also, wherein each emoji tracker is a visual indicator that is configured to indicate a predetermined number of emoji slots allowed in an emoji message, to identify which of the emoji slots are filled and empty as the user presses emoji buttons to build a sequence of emojis, and to track a position of the current emoji that is displayed in the interactive view window within the sequence of emojis.

In one embodiment, the plurality of function buttons of the first and second user interfaces further includes a play games button, and in response to receiving user input pressing the play games button, the first and second communication devices are configured to automatically display a single player emoji-based game if the user input pressing the play games button is received while the other one of the first and second communication devices is powered off/asleep or outside a threshold distance, display single player and multi-player emoji-based games if the user input pressing the play games button is received while both the first and second communication devices are powered on/awake and within the threshold distance from each other, or automatically display a multi-player emoji-based game if the user input pressing the play games button is received while the first and second communication devices are currently connected on a voice call.

In another embodiment, when the first communication device and the second communication device are both powered on/awake and within a threshold distance from each other, and a first user of the first communication device and a second user of the second communication device are both present/currently active the first communication device transmits an emoji message to the second communication device, displays a sequence of animated emojis from the emoji message in the first user interface on the first display, and displays a notification indicating that the emoji message was delivered successfully to the second communication device, and the second communication device receives the emoji message from the first communication device, and displays a prompt indicating that the second user can view the received emoji message in the second user interface on the second display.

In one embodiment, when the first communication device and the second communication device are both powered on/awake and within a threshold distance from each other, and a first user of the first communication device and a second user of the second communication device are both present/currently active the first communication device places a voice call to the second communication device, displays a notification that the voice call is connected for live two-way interaction if the second user accepts the voice call via the second communication device, or outputs a prompt to leave a voicemail if the second user did not answer the voice call, and the second communication device displays a prompt to accept the voice call incoming from the first communication device, displays a notification indicating a missed call if the second user did not answer the voice.

In one embodiment, when the first communication device and the second communication device are both powered on/awake and within a threshold distance from each other, and a first user of the first communication device is present/currently active but a second user of the second communication device is absent/inactive the first communication device transmits an emoji message to the second communication device, displays a sequence of animated emojis from the emoji message in the first user interface on the first display, and displays a notification indicating that the emoji message was delivered successfully to the second communication device, and the second device receives the emoji message from the first communication device, stores the received emoji message in a memory of the second communication device, and displays a notification indicating that the emoji message has been received in the second user interface on the second display.

In one embodiment, when the first communication device and the second communication device are both powered on/awake and within a threshold distance from each other, and a first user of the first communication device is present/currently active but a second user of the second communication device is absent/inactive the first communication device places a voice call to the second communication device, and outputs a prompt to leave a voicemail if the second user did not answer the voice call via the second communication device, and the second communication device displays a prompt to accept the voice call incoming from the first communication device, displays a notification indicating a missed call if the second user did not answer the voice call.

In another embodiment, when the first communication device is powered on/awake but the second communication device is powered off/asleep or outside a threshold distance the first communication device attempts to transmit an emoji message to the second communication device, displays a sequence of emojis from the emoji message in the first user interface on the first display, and displays an error message indicating that delivery of the emoji message to the second communication device failed, wherein the error message includes a warning that the second communication device must be powered on/awake and within a threshold distance from the first communication device to allow the first communication device to communicate with the second device over the short-range wireless network, and the second communication device cannot receive and store the emoji message while the second communication device is powered off/asleep or outside a threshold distance, and does not display any notification relating to the emoji message once the second communication device is powered on/awake.

In yet another embodiment, when the first communication device is powered on/awake but the second device is powered off/asleep or outside a threshold distance the first communication device attempts to place a voice call to the second communication device, and displays an error message indicating that the voice call cannot be connected with the second device, wherein the error message includes a warning that the second communication device must be powered on/awake and within a threshold distance from the first communication device to communicate with the second communication device over the short-range wireless network, and the second communication device cannot receive the voice call from the first communication device while the second communication device is powered off/asleep or outside a threshold distance, and does not display any notification relating to the voice call once the second communication device is powered on/awake.

In an alternative embodiment, the communication system includes a third communication device including a third display configured to display a third user interface, and a third wireless communications interface, wherein the third communication device is configured to perform a secure pairing process to allow the third communication device to communicate with the first communication device, the second communication device, or both over the short-range wireless network via the third wireless communications interface.

The present invention also includes another embodiment of a communication system that includes a first communication device including a first set of buttons and a first wireless communications interface, and a second communication device including a second set of buttons and a second wireless communications interface, wherein the first communication device and the second communication device are paired in advance to allow the first communication device and the second communication device to communicate exclusively over a short-range wireless network via the first and second wireless communications interfaces, each of the first and second sets of buttons includes a plurality of function buttons associated with calling and messaging functions, and a plurality of emoji buttons associated with building emoji-based messages and playing emoji-based games.

In one embodiment, the first communication device of a first user can transmit a remote input directed to the second communication device of the second user over a short-range wireless network via the first wireless communications interface, and the second wireless communication interface receives the remote input when the second communication device is powered on/awake and within a threshold distance from the first communication device.

In an alternative embodiment, the short-range wireless network is a private peer-to-peer network in which the first communication device and the second communication device can communicate only with each other.

In yet another embodiment, the first communication interface and the second communication interface enable live two-way interaction between the user of the first communication device and the second user of the second communication device when the second communication device is powered on/awake and within the threshold distance from the first communication device, and the second user is present/currently active.

In another embodiment, the first communication device and the second communication device disable communications between the second communication device of the second user and the first communication device of the first user when the second communication device is powered off/asleep or outside the threshold distance from the first communication device.

The present invention also relates to an embodiment of a communication system that includes a first communication device having a display including a first set of buttons and a first wireless communications interface, and a second communication device having a display including a second set of buttons and a second wireless communications interface, wherein the first communication device and the second communication device are paired in advance to allow the first communication device and the second communication device to communicate exclusively over a short-range wireless network via the first and second wireless communications interfaces, each of the first and second sets of buttons includes a plurality of function buttons associated with calling and messaging functions, and a plurality of emoji buttons associated with building emoji-based messages and playing emoji-based games, and the first communication device displays one or more prompts or notifications on the display of the first communication device when the second communication device is powered on/awake and within the threshold distance from the first communication device, and the second user is present/currently active.

In an alternative embodiment, the display of the second communication device displays a prompt to receive a remote input from the first communication device when the second communication device is powered on/awake and within the threshold distance from the first communication device, and the second user is present/currently active.

The present invention also relates to an embodiment of a method of communication that includes the steps of transmitting remote input from a first communication device of a first user, wherein the remote input is directed to a second communication device of a second user, over a short-range wireless network via a first wireless communications interface of the first communication device, and when the second communication device is powered on/awake and within a threshold distance from the first communication device, receiving the remote input at the second communication device over the short-range wireless network via a second wireless communications interface of the first communication device, the first communication device and the second communication device are paired in advance to allow the first communication device and the second communication device to communicate exclusively with each other over a short-range wireless network via the first and second wireless communications interfaces, and the first communication device including a user interface or graphic user interface (GUI), the second communication device including a second GUI, wherein each of the GUIs includes a plurality of function buttons associated with voice calling and messaging functions, and a plurality of emoji buttons.

In one embodiment, the short-range wireless network is a private peer-to-peer network in which the first communication device and the second communication device can communicate only with each other. In addition, the method includes enabling live two-way interaction between the user of the first communication device and the second user of the second communication device when the second communication device is powered on/awake and within the threshold distance from the first communication device, and the second user is present/currently active.

Also, the method includes displaying one or more prompts or notifications on the display of the first communication device or the second communication device when the second communication device is powered on/awake and within the threshold distance, but the second user is absent/currently inactive. The method may also include disabling communications between the second communication device of the second user and the first communication device of the first user when the second communication device is powered off/asleep or outside the threshold distance from the first communication device.

The method may also include displaying one or more prompts or notifications on the display of the first communication device when the second communication device is powered on/awake and within the threshold distance from the first communication device, and the second user is present/currently active, and displaying a notification on the display of the first communication device indicating that delivery of the remote input from the first communication device to the second communication device was successful if the remote input is an emoji message, or outputting a prompt for the first user of the first communication device to leave a voicemail for the second user on the second communication device if the remote input is a voice call, when the second communication device is powered on/awake but the second user is absent/currently inactive, or displaying an error message indicating that delivery of the remote input from the first communication device to the second communication device failed when the second communication device is powered off/asleep or outside the threshold distance from the first communication device, wherein the error message includes a warning that the second communication device must be powered on/awake and within the threshold distance from the first communication device to allow the first communication device to communicate with the second communication device over the short-range wireless network.

In another embodiment, the method may include displaying a prompt on the display of the second communication device to receive the remote input from the first communication device when the second communication device is powered on/awake and within the threshold distance from the first communication device, and the second user is present/currently active, and storing the remote input from the first communication device on a memory of the second communication device, and displaying a notification on the display of the second communication device indicating that the remote input has been received from the first communication device, when the second communication device is powered on/awake and within the threshold distance from the first communication device, but the second user has been absent/currently inactive for a first period of time, or causing the second communication device to turn off/enter a sleep state when the second user has been absent/inactive for a second period of time, wherein the second communication device turns off the second wireless communications interface when entering the sleep state such that the second communication device can no longer receive and track any remote input from the first communication device while the second communication device is in the sleep state.

DETAILED DESCRIPTION

Figure 1:
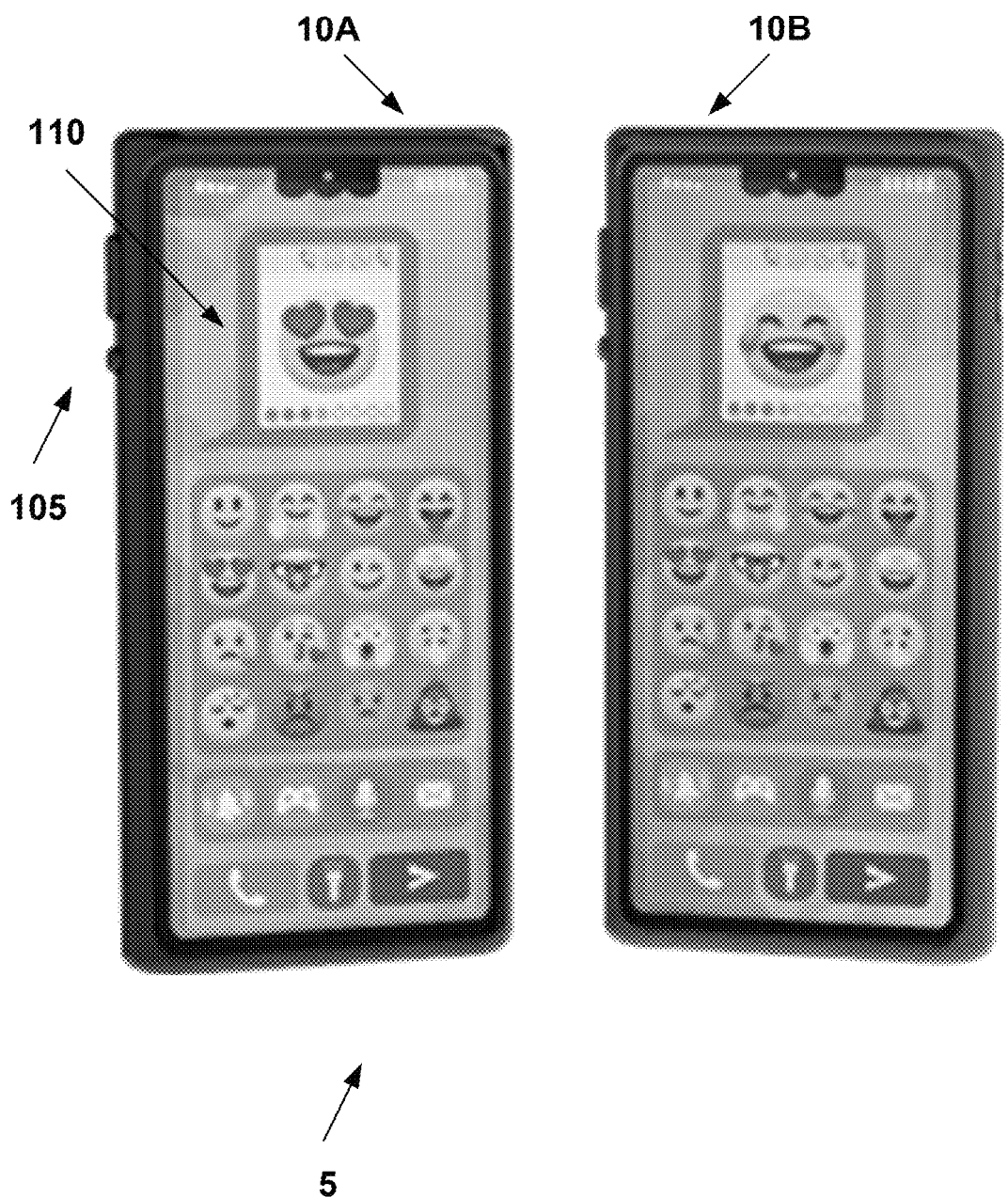
FIG. 1 is a diagram showing a system including two communication devices or phones, according to an example embodiment.

The present disclosure relates to a functional short-range communication device that enables several types of communications between that communication device and a similar communication device that is paired to it. Some types of communications include voice, message, and game communications. The communication device is referred to alternatively herein as a phone or an emoji phone. In one embodiment, the communication device or emoji phone is part of a system that includes two child appropriate devices.

In one embodiment, each communication device features a 1.77" color LCD display with a large panel with several emoji buttons and other functional buttons. In an exemplary embodiment, the communication device includes 16 emoji buttons and at least 4-6 other buttons. The communication device includes at least one physical button on a side of the device. Multiple communication devices connect to each other wirelessly using a short-range wireless communications interface, which in one embodiment is ESP-Now (2.4 GHz). Children can utilize the communication devices to send messages to each other, play games, and talk to each other in a manner that resembles a real mobile phone. In one embodiment, the communication device includes a microphone that enables children to talk and also record messages to send to each other.

Core functional features include live two-way calling (simultaneous live voice chat without needing to press/release a button to speak/listen, like a Walkie Talkie, or hearing chirps indicating a message was sent or received), creating, sending, and receiving emoji messages and voice messages, and playing single or multiplayer games. The phones will be sold in sets of two that will be paired for wireless communication right out of the box. In some embodiments, additional phones may be purchased and paired and added to the same network. A pairing method may enable separately purchased phones be added to the network. All of the communications are accomplished via internal circuitry in the communication devices or phones. There is no setup to a Wi-Fi network or no cellular plan needed. The devices are very portable, can take to a park or to a beach, and can be used anywhere provided that the paired devices are within the communication range. These features as well as the other ones described herein make the devices easy to use and kid-friendly.

Kids can play with the communication devices without the potential dangers associated with playing with a parent's cell phone. Some of those dangers include dropping and damaging the phone, accessing content intended for older audiences, and communicating with other older users using the phone. The communication devices of the present invention enable children to play games, talk to friends, and send kid-appropriate messages and communications to each other. In addition, the devices are durable and resilient to damage from dropping.

According to the invention, the communication devices are functional right off the shelf due to an initial wired connection that pairs two of the devices to each other. Kids can take a set of communication devices that are paired together and use them right away without performing any set up activities, such as accessing a data plan, or connecting to Wi-Fi or cellular services.

One or more communication devices can be added to the network of a paired set of communication devices. In one embodiment, a third device can be paired to a paired set including a first device and a second device. In one embodiment, the system does not include a bump off or bump out feature when pairing a new communication device. In other words, when a first device is paired to a second device, and then the first device is paired with a third device, the second device is not unpaired automatically. As a result, the network will have three paired devices. Additional communication devices can be connected to any paired communication devices, namely, a fourth, a fifth, etc. can be paired.

Once the first two communication devices are paired initially through a wired connection, to pair a third communication device, one of the first two devices and the third device each has to be put into a special pairing mode. This special pairing mode enables those devices to "see" each other and share their addresses with each other to facilitate communication therebetween.

In a basic mode of operation, the first device and the second device that are initially paired can be used by children without pairing to a third device. However, the present invention contemplates using different characteristics to identify different communication devices that are paired together. In various embodiments, the communication devices may automatically associate or assign an indicator with the different devices and their users. Indicators may include a number, a letter, a color, a role, a name or other information that can be easily remembered by a child. For example, a user of the first device can select a first ringtone and a first color, such as blue, for one of the communication devices to which it is paired, and a second ringtone and a second color, such as green, for another communication device to which it is paired. Thus, when the child using the first device wants to send a message or talk to a parent or guardian of the child, the child can remember that the color blue is for the parent's or guardian's communication device. In different embodiments, the colors that can be associated with different devices can include any color, including blue, green, yellow, and red. By using a color as an indicator for a particular user, the play and use of the communication is simplified for children. In an alternative embodiment, the indicator may be selectable by a user.

In one example, when the user wants to send a message to one of the paired communication devices, the user is asked by the user's device whether the user wants to send the message to the blue device or the yellow device. The user can pick the color for the particular other user to whom the communication should be delivered.

In one embodiment, a user can select the same color to represent different devices that are paired to the user's device. For example, the user can select blue for one sibling of the user and blue for another sibling of the user. When the user wants to send a message and the user's device asks whether the message should go to the blue device or the blue device, the message may be sent to either of the blue devices. In an alternative embodiment, when there are paired devices that are assigned the same color, such as both paired devices assigned blue, the message could be sent to the blue device that has the strongest signal, meaning that blue device is closer to the user than the other blue device. In another alternative embodiment, when there are paired devices that are assigned the same color, such as both paired devices assigned blue, the message could be sent to the blue device with which the user's device most recently communicated.

These various modes of operating when there is a color conflict eliminates the need for the child to rename or to reassign colors to the other communication devices. In other words, any potential confusion or conflict with paired devices is overcome by the programming in the user's communication device, thereby simplifying the skills needed to play with the device. There is no repeat pairing to communication devices. The user's communication device looks to see what other devices are in the communication area and determines what colors have been assigned to those found devices.

To de-pair from another communication device, a user may perform a factory reset on the user's communication device. In one embodiment, the factory reset involves pressing and holding a combination of buttons simultaneously for a period of time. The buttons to be pressed can vary based on the programming. The factory reset of a device will result in all of the pairings with other devices being erased. To subsequently re-pair to one or more communication devices, the user must either use the initial wired connection or follow the pairing protocol of putting both devices to be paired in a special pairing mode and connecting them electronically.

Content, art/animations, user audio recordings may be stored on a flash chip (storage may be persistent for some aspects or temporary for some other aspects). Two-channel audio allows for simultaneous speech/sound effects and music (or equivalent). Examples of the audio include silly/fun emoji audible sound effects (e.g., giggles, farts, vocalizations, etc.), functional phone sound effects (e.g., ringing, sending, receiving, notification feedback, musical ringtones and notifications, startup jingle, etc.), and gameplay sound effects (e.g., in-game noises, background music, intro/outro music, gameplay reward, error feedback, etc.).

FIG. 1 is a diagram showing a system 5 that includes two communication devices or emoji phones 10A and 10B according to an example embodiment of the invention. As shown, each phone 10A and 10B has a physical power button 105 and a display 110, among other possible components and circuitry. Various components of phones 10A and 10B area illustrated in FIG. and discussed below.

The power button 105 can be used to power the phone on and off, and is not a hard state switch. The power button 105 may be a tactile switch on the side of the phones 10A and 10B. The power button 105 may be used to turn the phones off to an idle mode. In one embodiment, the phone may still turn on or wake with the pressing of another button. This feature lets a user shut off the phone or put it into sleep mode.

In the illustrated embodiment, the display 110 provides a screen display area where most content visuals are displayed (e.g., animating emojis, interactive games, action prompt alerts, etc.). In some example embodiments, the display 110 may be implemented via a 1.77" color LCD screen. However, in other embodiments of the invention, the display may have a different type of display and/or be a different screen size. There may also be state-dependent displays at top (e.g., toolbar icons for connectivity states, inbox messages, etc.) and bottom (e.g., emoji message tracker used for emoji messaging) on the display.

Figure 1A:
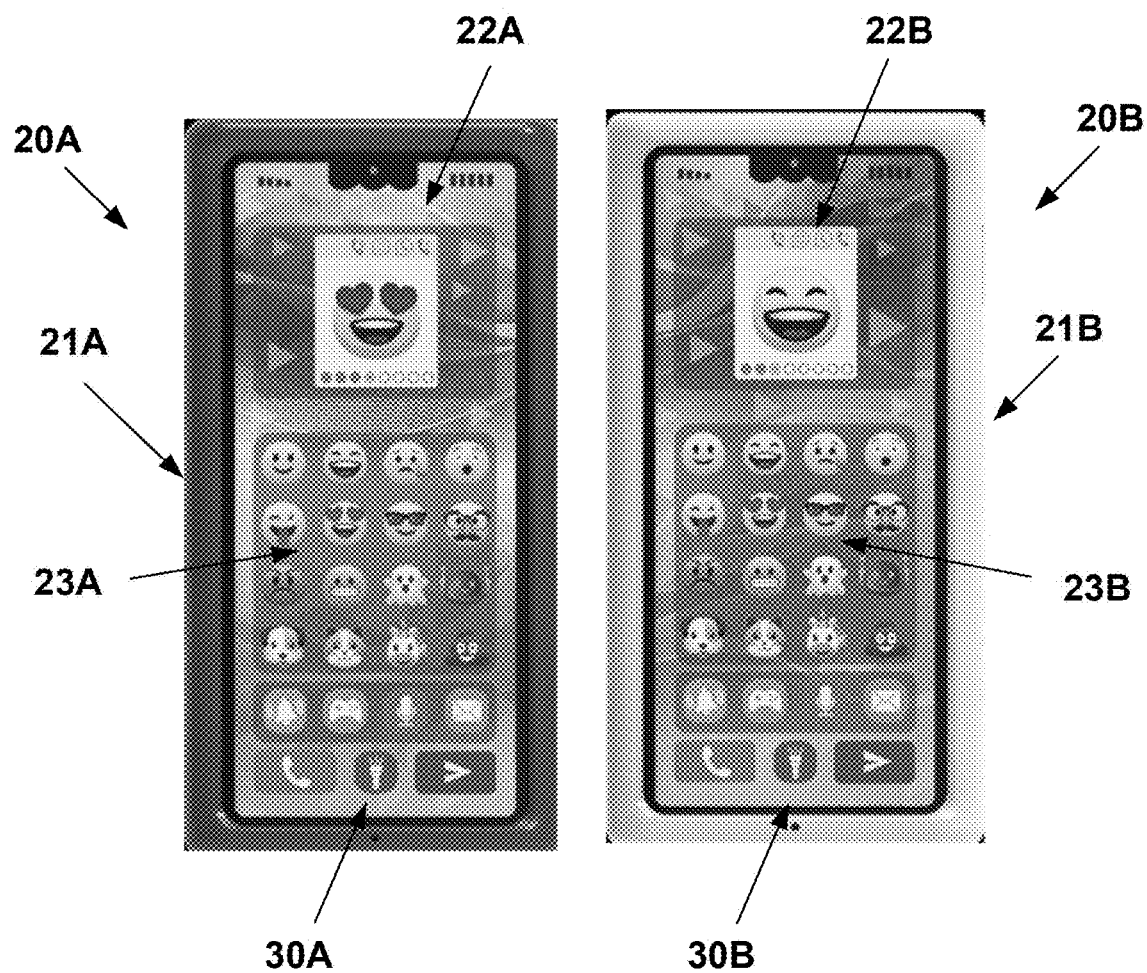
FIG. 1A is a front view of alternative embodiments of electronic devices according to the present invention.
Figure 1B:
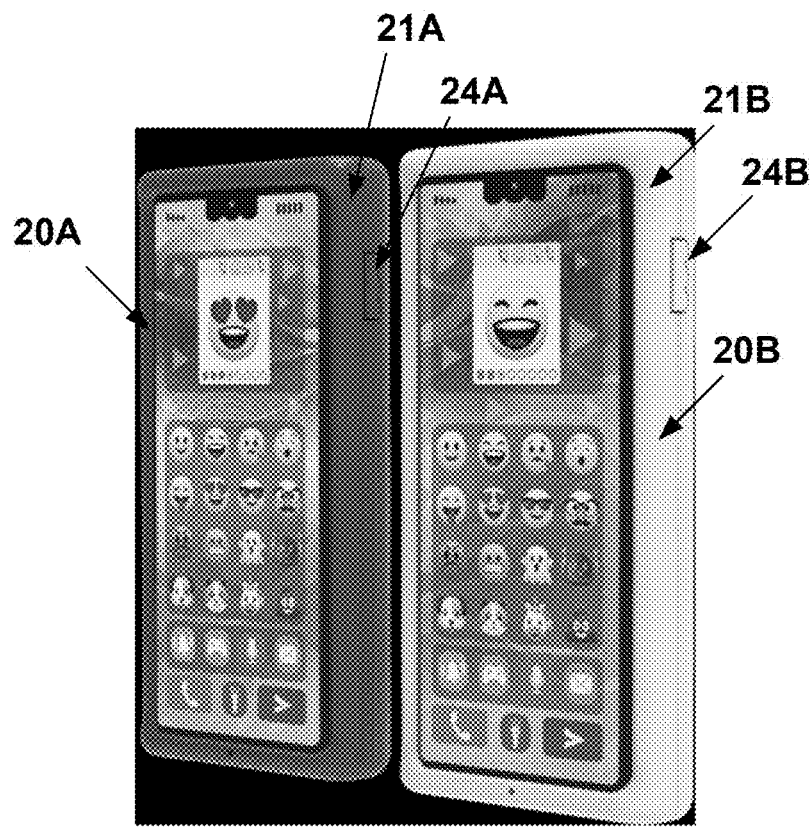
FIGS. 1B and 1C are left and right perspective views of the electronic devices illustrated in FIG. 1A.
Figure 1C:
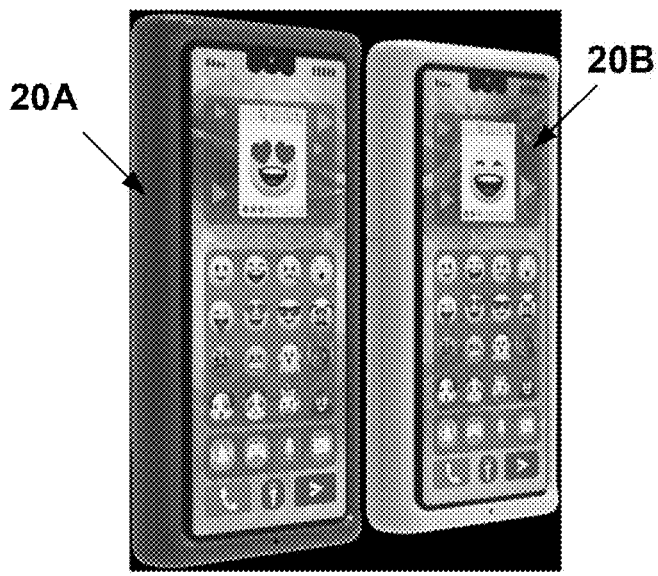

In particular, alternative embodiments of communication devices or emoji phones are illustrated in FIGS. 1A-1C. Referring to FIG. 1A, communication devices 20A and 20B have housings 21A and 21B with displays 22A and 22B, respectively. The housings 21A and 21B include mylar overlays or pads 23A and 23B, respectively. Each of the mylar overlays or pads 23A and 23B includes one or more raised buttons that can be pressed by a user to provide an input to the particular communication device. In an alternative embodiment, a capacitive touch screen can be used instead of a mylar overlay or touch pad.

Referring to FIGS. 1B and 1C, in this embodiment, the housings 21A and 21B of communication devices 20A and 20B have a single input and/or power button 24A and 24B, respectively, on one side of the housing 21A and 21B, and no buttons on the opposite side of the housing 21A and 21B. The programming of the communication devices can be such that any pressing of the input and/or button 24A and 24B can result in any desired operation.

Detailed descriptions of the various emoji buttons and functional buttons shown in FIG. 1, which is only an exemplary embodiment of various buttons, are provided below. In addition, a more detailed description of various components of the phones 10A and 10B, such as a processor, a memory with logic, communications interfaces, input/output devices (e.g., display, microphone, speaker, buttons), etc. is provided as well. It is to be understood that in different embodiments, the particular emoji buttons can vary, such as in FIGS. 1A-1C.

Figure 2A:
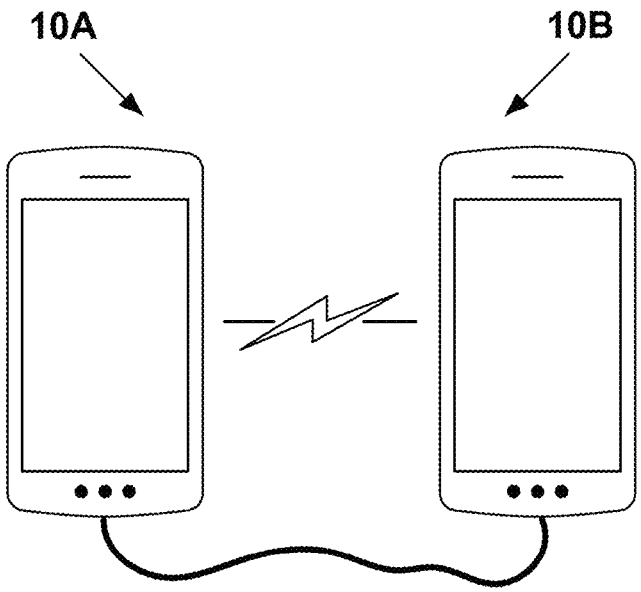
FIG. 2A is a diagram showing a pair of communication devices that have a wired connection according to an example embodiment.
Figure 2B:
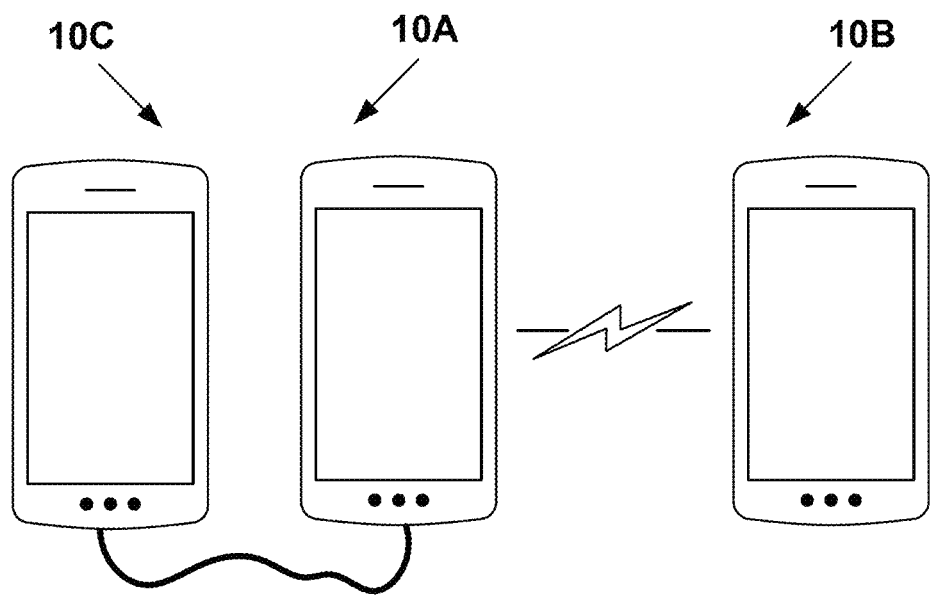
FIG. 2B is a diagram showing a pair of communication device that have a wired connection, and one of those communication devices having a wireless connection with another communication device.

Turning to FIG. 2A, an exemplary connection between a first phone 10A and a second phone 10B is illustrated. Phones 10A and 10B are pairable and/or may be paired in advance. Phones 10A and 10B may communicate through a wired connection (e.g., in the try-me state) or through a wireless connection (e.g., during normal operation). FIG. 2B shows that a third phone 10C can be paired with the first phone, or alternatively with the second phone 10B, in order to be added to the network formed between phones 10A and 10B.

Figure 3A:
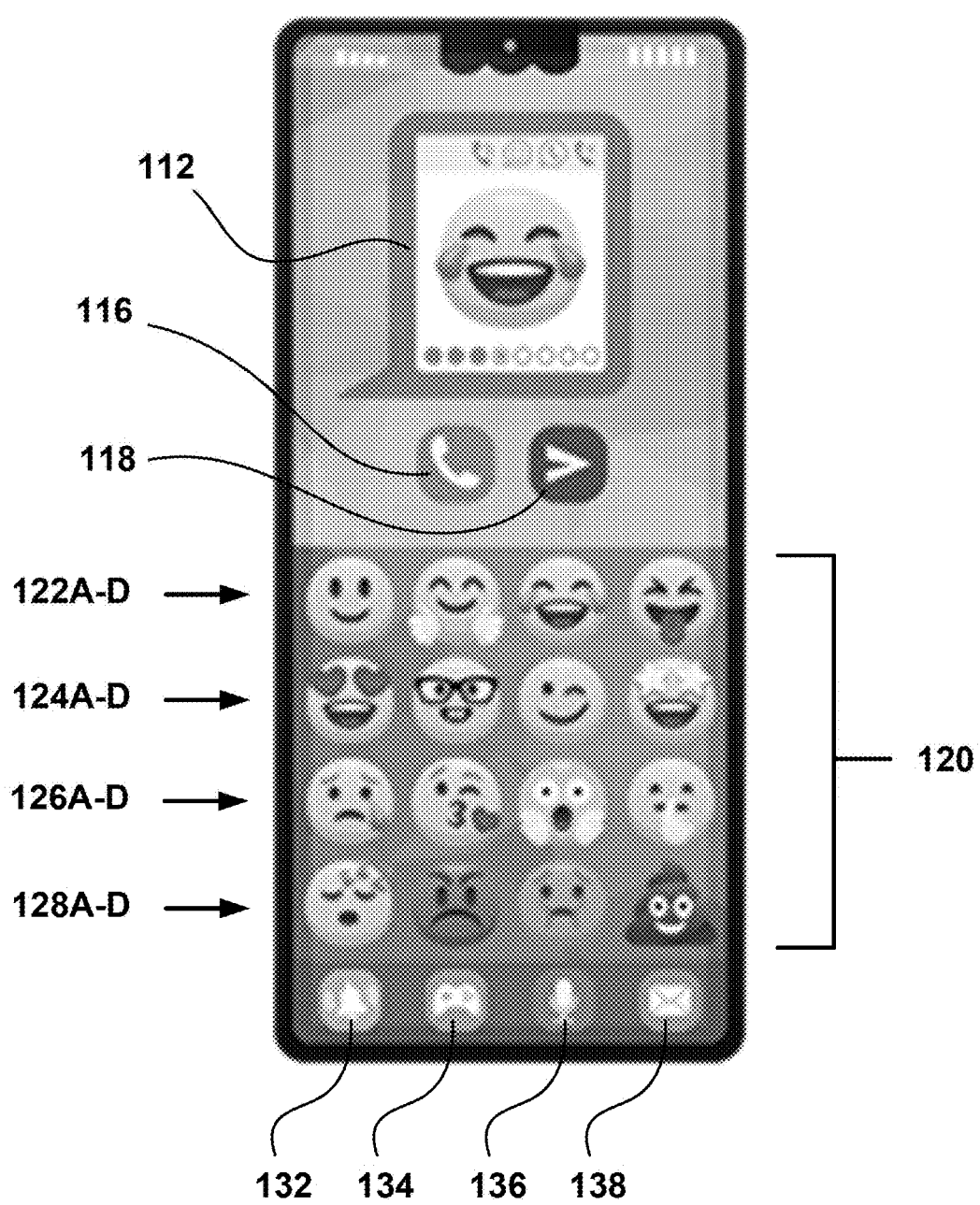
FIG. 3A is a front view of an embodiment of a communication device according to an example embodiment.

FIG. 3A shows an example graphical user interface (GUI) 112 and various function buttons and emoji buttons of the phones 10A and 10B of FIGS. 1 and 2A-2B. In FIG. 3A, a set of emoji buttons or icons 120 is shown. In one embodiment, each phone 10A and 10B may have sixteen emoji icons or buttons 120 in rows/columns of four each on the face of the phone. In this embodiment, a first row of emoji buttons 120 includes emojis 122A, 122B, 122C and 122D, a second row of emoji buttons 120 includes emojis 124A, 124B, 124C and 124D, a third row of emoji buttons includes emojis 126A, 126B, 126C and 126D, and a fourth row of emoji buttons 120 includes emojis 128A, 128B, 128C and 128D. In other embodiments, other quantities and types of emojis are possible. Pressing one of the emoji icons will cause the phone to show an emoji animation and start to fill up a queue of emojis in a tracker. If a send or send message button 118 is then pressed, that sequence of emojis is sent to the other paired phone. The emoji buttons are raised or domed buttons on a mylar overlay or pad. In an alternative embodiment, the emoji buttons can be provided via a capacitive touch screen.

It should be appreciated that the drawings (e.g., FIGS. 1 and 3A) are intended to be illustrative in nature, and that example embodiments are not limited the quantity of emojis (or rows/columns) and the specific emojis presented therein. Utilizing more or fewer emojis, and/or different types of emojis, are possible, although it may be desirable to include several emojis with various different "faces" depicted. It is also noted that the emojis should be fun. For example, in one embodiment, when the user presses an emoji button, the user will see the emoji animate and the phone will generate a corresponding noise. Pressing an emoji button automatically shows the emoji and begins to build a new series (or further contribute to an existing series). Additional information relating to an emoji message tracker 115 is discussed in detail below.

FIG. 3A also shows various function buttons on the phone 10A. In this embodiment, there are six functional buttons on the front face of the phone 10A. These buttons include a call phone button 116, a send message button 118, a set ringtone button 132, a play games button 134, a record voice button 136, and a check messages button 138.

The "call phone" (make a call) button 116 is operable to call another paired phone on the network. Each phone has a call button. When a first child presses the call button, the transmitting phone will attempt to call the other phone (the other phone must be awake to receive the call). When the receiving phone accepts the call, the first child and the second child can talk with each other. This assumes a 1:1 live call without needing to push any "I'm talking now" button (like with a traditional Walkie Talkie). In some example embodiments, it is assumed that for each user, there will only be one other person to call (in the case of two paired phones). However, like with games, if there are any additional phones added/linked to the system (e.g., three or four paired phones), there can be a subsequent choice between the other users if needed.

The "send message" button 118 is operable to send the "on deck" message (voice or emoji). The send button is used to send a current message to the other phone. The transmitting phone can only send messages to other phones that are already awake. The transmitting phone and the receiving phone can send and receive emoji messages and recorded audio messages. For example, if the user presses the send current message button 118 while working on emojis, the phone will send the "on deck" emoji message. This feature applies similarly for voice messages, as discussed below with reference to the record voice button 136.

The "set ringtone" button 132 is operable to listen to and change the phone's ringtone. The ringtone button allows the child to pick a ringtone that plays whenever they receive a call. Also, with this feature, the user may be able to set the sound effects state, where the phone allows the user to toggle between silly sounds, tone sounds, or vibrate only, for example.

The "play games" button 134 is operable to start a game (1-player or 2-player). The games button allows the child to pick a game to play. If the user presses the start game button 134 while on a call with another user, the user can play a multiplayer game with the other user on their paired phones. Otherwise, pressing this button may begin a single player game by default in some example embodiments.

The "record voice" or microphone button 136 is operable to record and listen to a voice message. The record voice button 136 allows the child to record a short message (e.g., 5-10 seconds). Once a message is recorded, the child can send the recorded audio message to the other paired phone with the send button. When the child presses the record voice button 136, the phone will record and play back the user's recording automatically (e.g., only once, or perhaps repeating on a loop if desired). This configuration makes the voice recording "on deck", similar to the case of an emoji message. If the user presses the send current message button 118 after capturing a voice recording, the phone will send the "on deck" voice message.

The "check messages" or receive mail button 138 is operable to view or listen to one or more inbox messages. When the child presses the check messages button 138, the phone will display any emojis or play any recorded audio messages that have been received from another paired phone, but that the child has not viewed or listened to yet.

Example embodiments are not limited to the specific locations of the function buttons shown in the drawings, and other arrangements are also possible. For example, FIG. 1 shows that the call phone button 116 and the send message button 118 may be located at the bottom of the front face of the phone, below the other function buttons (132, 134, 136, 138). In some other example embodiments, the layout could be changed to allow for a second function button row, such as another horizontal or vertical row of function buttons.

Additionally, it is noted that buttons 116, 118, 136, and 138 (relating to calls and messages) may be considered primary features related to core functionality of the phones, whereas buttons 132 and 134 (relating to ringtones and games) may be considered secondary features that are less critical and may be optional in different example embodiments.

Optionally, although not shown in the drawings, some other buttons may also be included on the phones, such as a physical volume switch or up/down buttons to raise and lower volume (possibly used to switch between default volume to sound-based "vibrate"), and/or physical up/down ringtone buttons to cycle up/down through a list to choose from available ringtones (may also be used in sub-selection states, such as selecting other users/phones in the case of more than two paired phones, and/or selecting games, for example).

The use of the power button 105, the display screen 110, the emoji buttons 120, and each of these function buttons (e.g., buttons 116, 118, 132, 134, 136, 138) during normal play operation will be described in further detail below.

Referring back to FIGS. 1A-1C, the various emoji buttons and the location of the functional buttons on the front face can vary. As shown, the particular locations of the call phone button, send message button, set ringtone button, play games button, record voice button, and check messages button vary relative to the embodiment illustrated in FIG. 3A. Also, devices 20A and 20B include flashlight function buttons 30A and 30B, respectively, that can be pressed by a user to turn on a light source on the device 20A or 20B. In addition, the emojis may include animal emojis and other emojis as well.

Figure 3B:
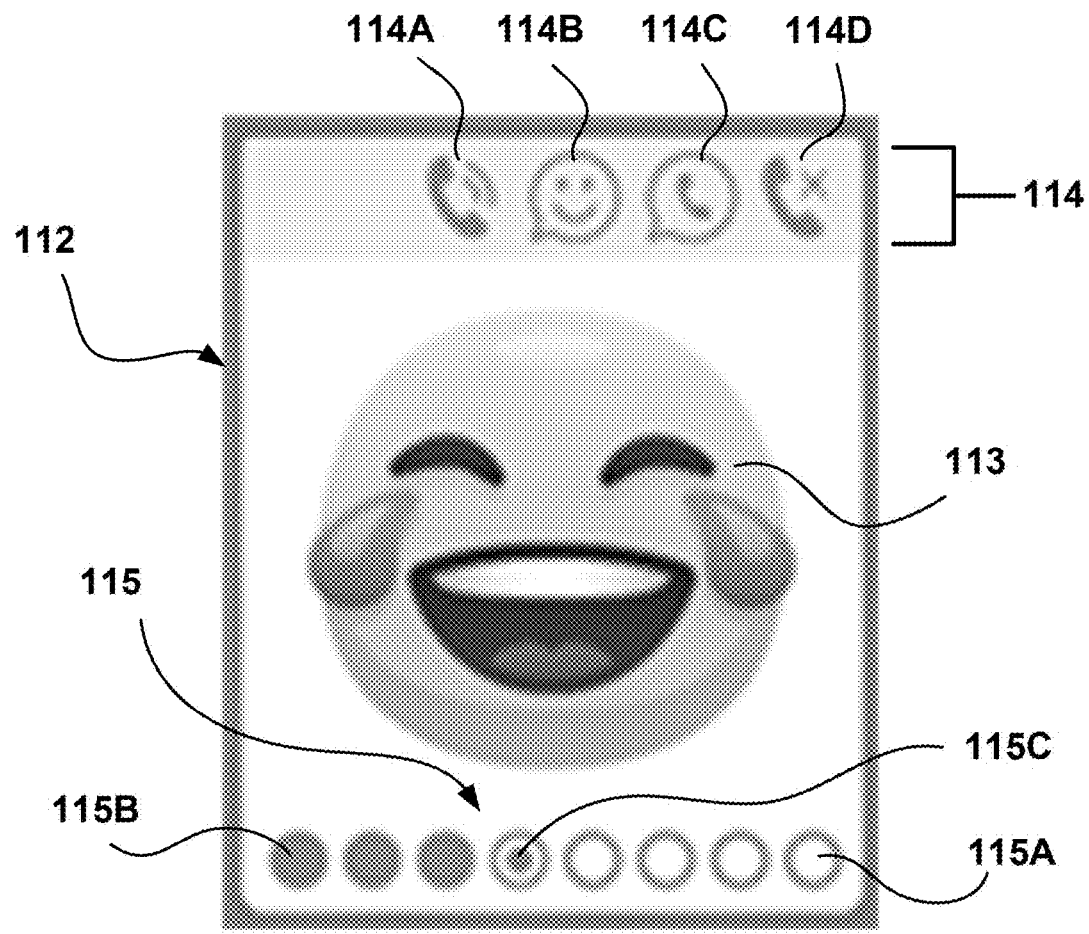
FIG. 3B is a front view of an embodiment of a graphic user interface of a communication device according to an example embodiment.

FIG. 3B shows a detailed view of an embodiment of the GUI 112, which may include a notification toolbar 114 and an emoji 113. The toolbar 114 may include various toolbar notification icons, including but not limited to, an incoming call icon 114A, a call in progress icon (not shown in FIG. 3B), an emoji message received icon 114B, a voice message received icon 114C, and a missed call icon 114D. In some example embodiments, multiple messages or calls can be tracked, with a corresponding number displayed adjacent to the respective notification icon 114B, 114C, and/or 114D.

Notifications in the toolbar 114 will often be paired with images on the main screen. For example, when there is an incoming call, the toolbar will display the incoming call icon, and the main display will show a pulsing image of the button that the user needs to press to answer the call. Some notifications may not need to be on the toolbar 114, and would only be displayed in the main screen space. For example, if a first user or sender tries to make a call, or send an emoji message or voice message, and the second user or recipient does not answer or the recipient's phone is off, such that the second user cannot receive the message, the first user will get a notification in the moment. For example, the notifications may include a "no answer" or a "message not received" animated display. FIG. 3B also shows an embodiment of an emoji 113 and a message tracker 115.

Figure 3C:
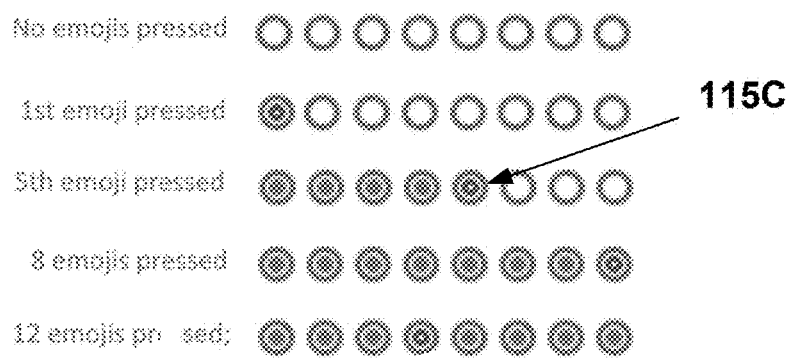
FIG. 3C is a schematic view of an emoji message tracker according to an example embodiment.

FIG. 3C is a diagram showing operation of the emoji message tracker 115 of FIG. 3B. Referring to FIGS. 3B and 3C, as the user selects emojis, circles or slots in the tracker are automatically filled in. The first row of circles illustrated in FIG. 3C includes eight empty circles 115A. As the user selects emojis, the circles are filled in from left to right (such as 115B). The current circle 115C corresponds to the emoji shown on-screen, and either blinks or has a distinction to show the current position (e.g., the white dot inside the filled and colored circle in FIG. 3C). After a user fills the tracker bar, the cursor then either cycles around to start replacing emojis in the tracker from the start (left side), or else continues to add to the chain (in which case, the previous first emoji may be deleted). In this example, a fixed maximum number of eight emojis per message is assumed, although some other example embodiments are not so limited and may have a different number of circles corresponding to the maximum emojis threshold (e.g., six, ten, or other quantity).

In the second row, the user has pressed a first emoji. In the third row, the user has pressed a fifth emoji. In the fourth row, the user has pressed an eighth emoji (filling the last circle). In the fifth row of the example shown in FIG. 3C, the user has written over the first four circles again, and currently sits in the fourth position. The current circle or position can be identified with a visual indicator in the GUI. For example, this visual indicator may be a dot, can be a different color, or could be blinking, or some combination thereof, in order to distinguish the current circle/position 115C from the other circles/positions. Other visual indicators are also possible.

When the user presses the "send message" button 118, the phone will attempt to send all of the emojis tracked in the emoji message tracker 115 to the recipient, cycling through the sender's screen for viewing as they are sent. In some example embodiments, the emoji tracker dots blink along as the corresponding emojis are shown.

More specific details associated with the functionality of the phones and various operations that occur in response to different button presses and statuses are described below.

Figure 4A:
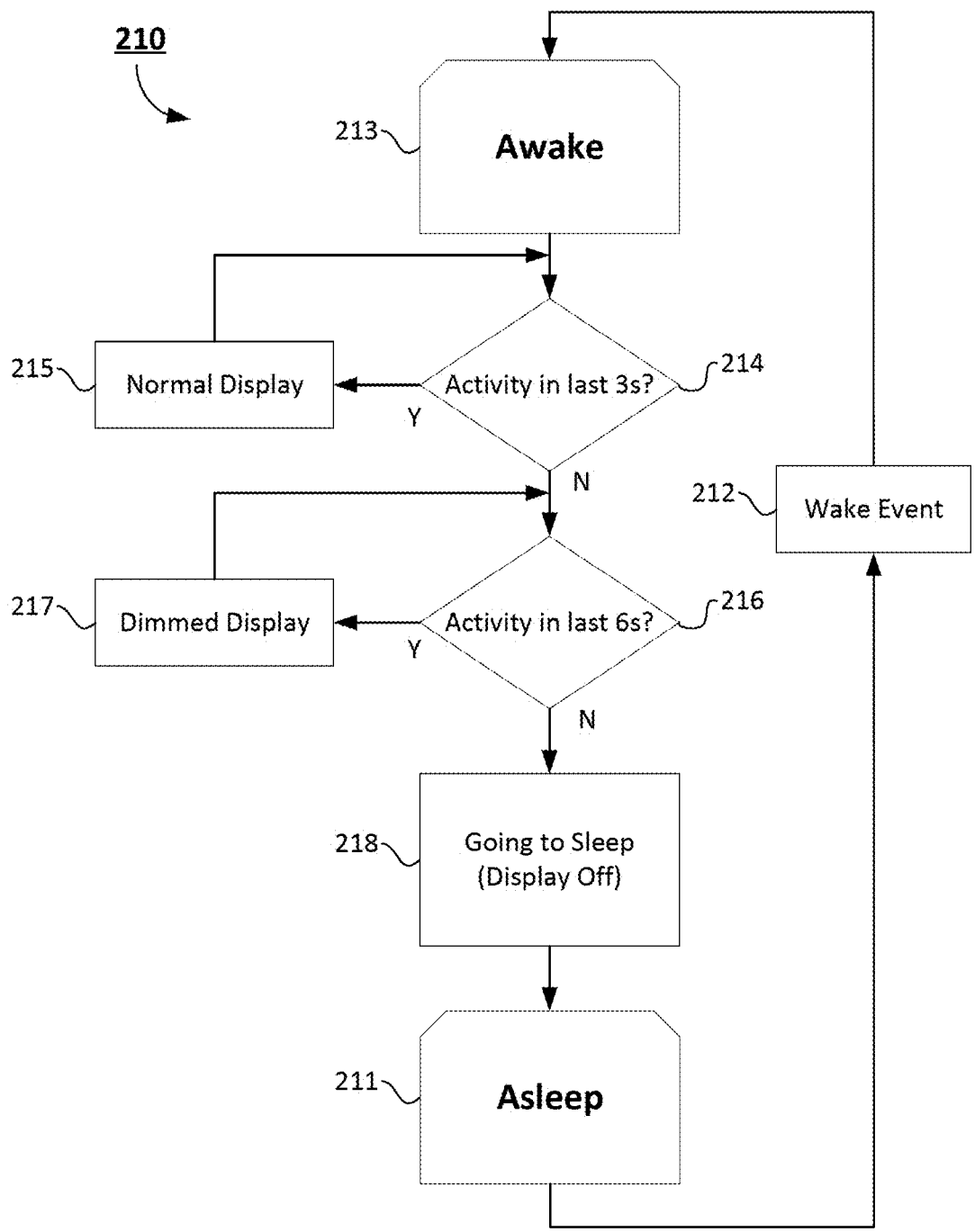
FIG. 4A is a flowchart of an exemplary try me state process according to the present invention.

One exemplary process of a phone according to the present invention is illustrated in FIG. 4A. This process 210 can be referred to as a try me sleep flow play design. In some embodiments, the phone may include a physical or keyed switch that can be used to toggle to and from a try me state of operation. While the phones are in their packaging, they are connected via a wire or cable. This wired connection allows the phones to communicate with each other to demonstrate their operation and functions while still achieving desired battery life. When one phone is activated in its try-me mode, that phone will send a signal to wake up the other connected phone via the wired connection. Each try-me activation will be short in length (e.g., about 6 seconds). Wireless connections are turned off in the try-me operation process and all communications between the phones occurs through the cable. When a button is pressed on one phone, it may also wake up the other phone via the cable. In addition, the wireless connection between two paired phones in a package can also be tested. This pairing of two phones can be performed at the time of manufacturing (e.g., at the factory on the production line).

Various data can be gathered and stored on memory (e.g., Flash), including but not limited to, the number of times buttons are pressed in try-me, how many emoji messages are sent (and which emojis were used), how many games played (and which games), how many phone calls started, how long were phone calls, and the like. This stored data can be accessed and viewed on the LCD screen of the phone. For example, a defined button sequence (e.g., a certain pattern/order/combination of buttons) could be used to display this information on the LCD of the phone.

Referring to FIG. 4A, a try me state process or method 210 according to one embodiment is illustrated. Initially, both phones are asleep in a sleep state with displays off at step 211. When a wake event occurs (e.g., a button press on either phone) at step 212, both phones wake simultaneously at step 213, with their displays turning on in an awake state. Both phones will keep each other awake in the try me state while activity is occurring. At step 214, a determination is made regarding whether there has been any phone activity (such as a button press) within a first threshold period of time, which in one embodiment is in the last three seconds. If so (Yes at step 214), the display will remain on with normal brightness at step 215, and the phone process loops back to step 214. If not (No at step 214), a determination is made regarding whether there has been any phone activity within a second threshold period of time, which in this embodiment is in the last six seconds, at step 216. If so (Yes at step 216), the display will be dimmed at step 217, and loop back to step 216. If not (No at step 216), both phones will then go to sleep (displays turn off) at step 218, and return to their sleep states (step 211). The try me state is intended to be as close to actual phone use as possible, but with a much shorter activity cycle and a shorter time until the sleep mode is entered. Certain features (such as placing and receiving a live call) may be restricted in try me mode.

A user can interact with one phone, or with a second user through remote interaction between two paired phones. For two phones to interact remotely, both need to be within range of one another and powered on and awake, which means they are within the timing of at least five minutes since the last local input. In one embodiment, the desired range or distance between communication devices in an open air setting up to approximately 100 meters. However, in a different setting, such as inside a home or other structure, the signals between devices can be blocked out, resulting in an inside communication distance of approximately 50 feet. Users may also be able to purchase and pair additional phones, which would allow for interaction between any two phones at a time on the same paired network.

A user presses the power button 105 to power on/wake the user's phone. In some example embodiments, other buttons may be used to wake the phone. The phone remains awake while the user is interacting with it, which is referred to as the user providing local inputs. Without receiving a local input, the phone will remain awake for approximately five minutes, during which time it can receive remote calls, messages, and game content from other phones on the network. Such received calls, messages and game content being referred to as remote inputs. After approximately one minute without receiving a local input, the phone's screen will dim to conserve the phone's battery. After approximately five minutes without local input, the screen will turn off as the phone enters its sleep state.

Figure 4B:
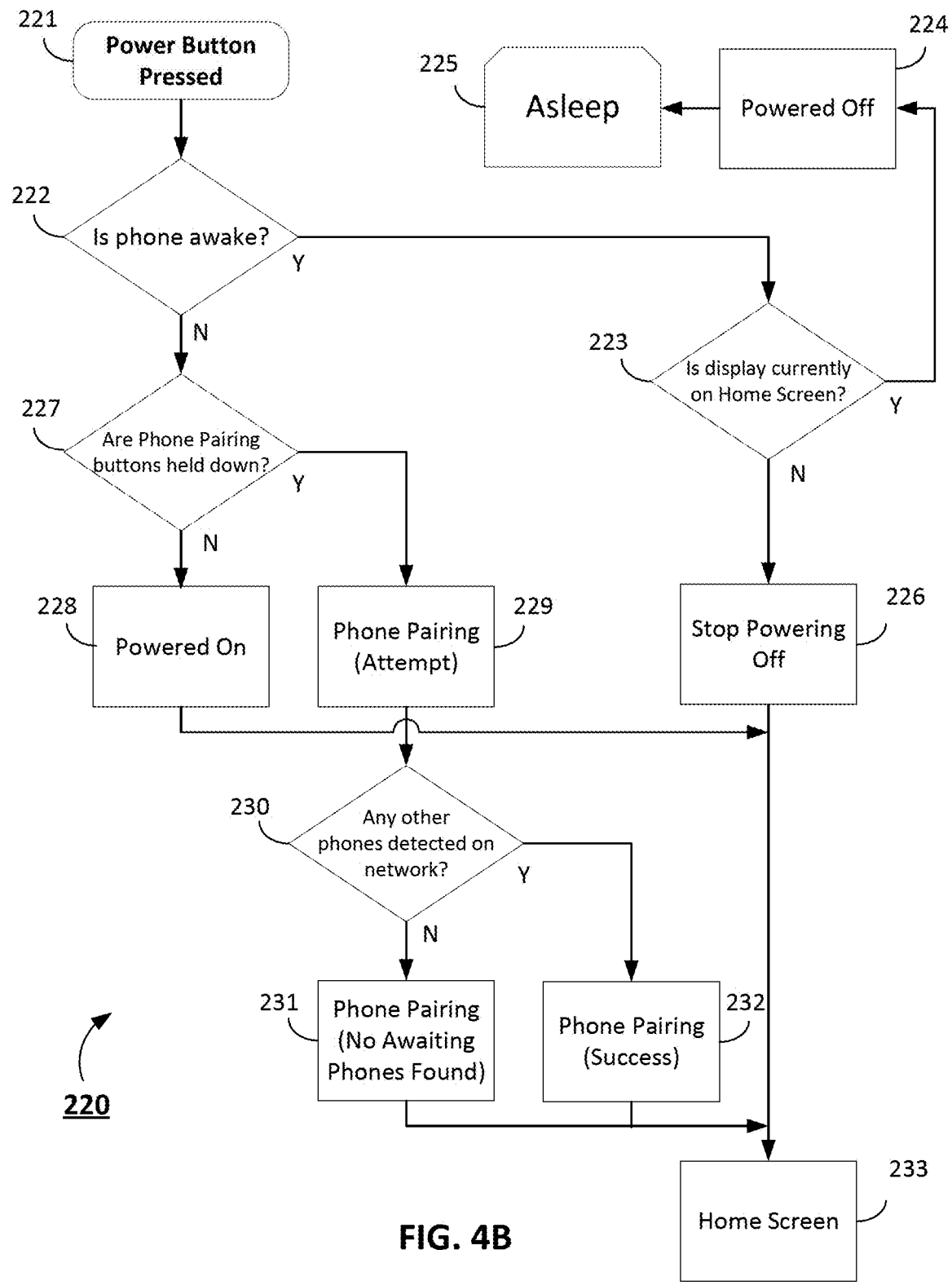
FIG. 4B is a flowchart of an exemplary power button pressed process according to the present invention.

FIG. 4B shows a flow or process of operations during normal operation of the phone when a power button is pressed, according to an example embodiment. This process 220 shows various operations of the communication device or phone once it is out of the try me state, when a user presses the power button 105.

At step 221, when the power button 105 is pressed, a determination is made regarding whether the phone is awake at step 222. If the phone is not currently awake when the power button 105 is pressed (No at step 222), a determination is made regarding whether the phone pairing buttons are being held down at step 227. For example, if the user presses a particular combination of buttons on the phone (e.g., pressing power button while also pressing one or more other buttons (e.g., send message button, etc.)), the phone will enter a pairing mode and attempt to detect other phones on the network. In one embodiment, the phone pairing buttons are the flashlight button and the send message button.

If the phone pairing buttons are being held down (Yes at step 227), then a phone pairing operation will be attempted at step 229. At step 230, a determination is made regarding whether any other phones are detected on the network. If so (Yes at step 230), the phone pairing operation occurs at step 232. In some example embodiments, the phone may automatically pair with the first new found phone. Some other example embodiments may involve manual confirmation to pair with a new found phone. If no awaiting phones are found (No at step 230), the phone pairing operation will timeout at step 231 (e.g., the phone will only look for other phones on the network to pair with for a limited time). In some example embodiments, an already-paired phone may be ignored for purposes of the pairing operation. In either case (upon successful pairing, or after the timeout period expires), the phone will then display the home screen (described below) at step 233.

If the phone pairing buttons are not being held down (e.g., the power button was pressed, but not in combination with the other designated pairing buttons) (No at step 227), then the phone will be powered on at step 228. Once powered on, the phone will display the home screen at step 233.

Returning to step 222, if the phone is already awake when the power button is pressed (Yes at step 222), a determination is made regarding whether the display is currently on the home screen at step 223. If so (Yes at step 223), then the phone will be powered off at step 224, and will enter the sleep state at step 225. If the display is not currently on the home screen (No at step 223), the phone will stop powering off the phone at step 226, and will display the home screen at step 233. Thus, when the phone is already powered on and is currently awake, the power button can be used to exit any sub-state (e.g., games, emojis, voice recording, etc.) and return to the main screen, instead of powering off the phone and entering the sleep state. After arriving at the home screen, pressing the power button again will proceed to power off the phone, thereby allowing it to go to sleep.

The home screen referred to above is a main screen that provides access to various features of the emoji phone, such as emoji message (inbox), voice message (inbox), missed call, missed game invite, etc. The home screen may have a persistent toolbar display at the top of the screen that shows this information. The toolbar may be present on some screens, but not all screens (the toolbar may be hidden for games, record voice, incoming messages, and sending message replays, for example). The home screen's background uses the user-defined ringtone appearance in terms of color, pattern, etc.

In one embodiment, in a normal play design, whenever a phone is activated, the LCD will turn on with backlight. The wireless receiver should turn on so that the phone can receive emojis, messages, and/or calls. If the phone is inactive for a first period of time T1 (a short duration, e.g., one minute, etc.), the backlight should turn off, whereas the wireless receiver should remain on. If the phone remains inactive for a second period of time T2 (a slightly longer duration, e.g., four minutes, etc.), then the wireless receiver should turn off (e.g., in order to save battery). After the second period of time T2 has elapsed, the phone will need to be turned back on to once again be able to receive emojis, audio messages, and/or calls from other phones.

Thus, both phones (the transmitting phone and the receiving phone) need to be awake to send emojis, messages, or calls to each other. If a phone is inactive for a threshold period of time (e.g., threshold=T1+T2, or five minutes in the above example), that phone will go to sleep and can no longer receive emojis, messages, or calls from other phones.

Missed call notifications and messages received before a phone falls asleep are stored and can be seen or accessed when the phone gets woken up again. A sleeping phone will not receive or track any content sent to it from another phone when it is not awake; this is primarily to conserve battery life. If a user attempts to call or message another phone when the recipient phone is not awake, the sending phone will receive an indication that the call or message did not go through successfully and display a visual indicator that the recipient phone must be powered on for 2-way communication.

Figure 4C:
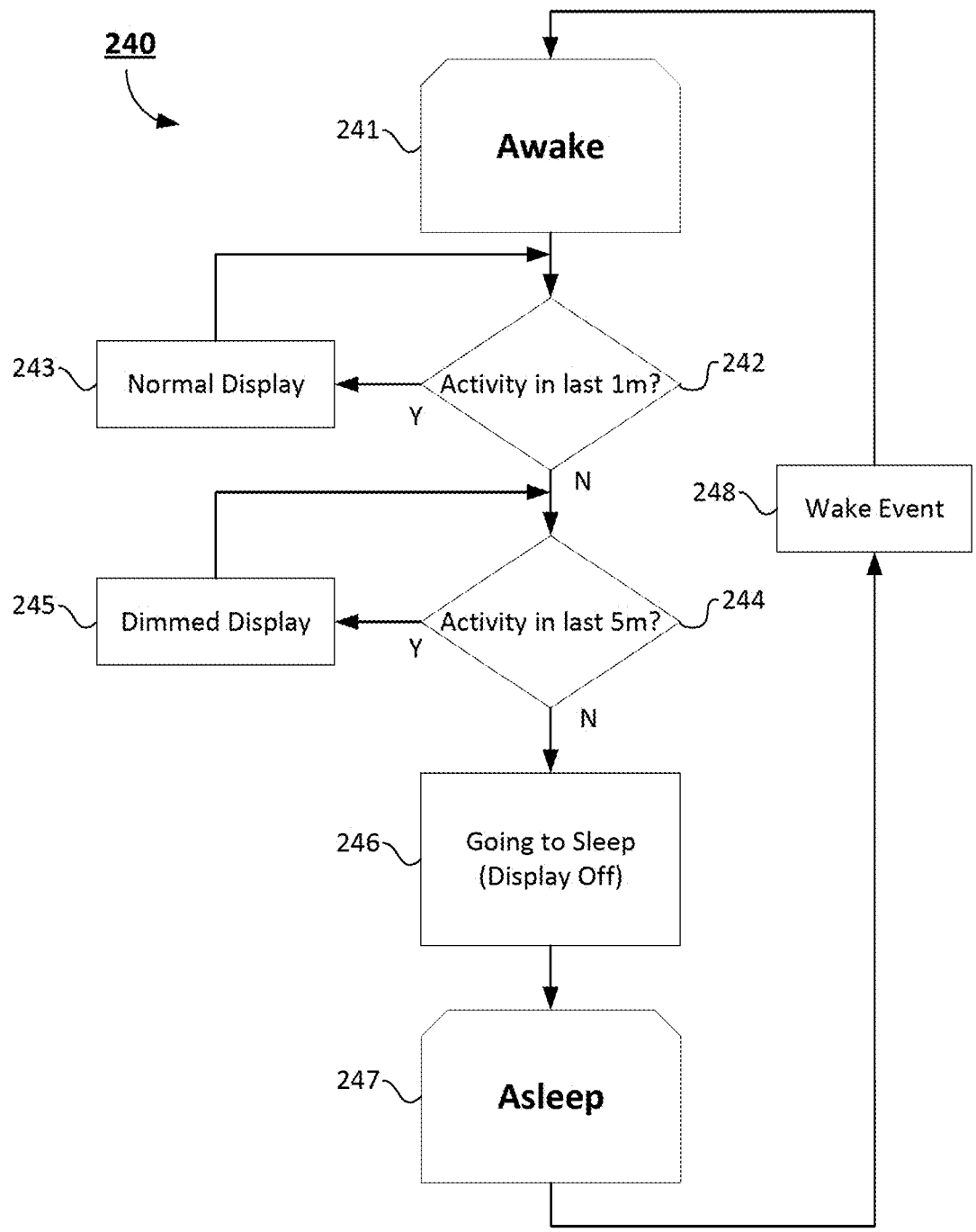
FIG. 4C is a flowchart of an exemplary sleep process according to the present invention.

Referring to FIG. 4C, an exemplary sleep flow process 240 out of a live connection state (e.g., call, game, etc.) for a communication device according to an example embodiment is illustrated. Here, the phone is currently awake (display is on in wake state), at step 241. The phone stays awake during normal operation while activity is occurring (similar to the try me state described above, but with a longer sleep cycle), where activity implies a local input or a live connection. At step 242, a determination is made regarding whether there has been any phone activity within a first threshold period of time (in one embodiment, this period of time is one minute). If so (Yes at step 242), the display will remain on with normal brightness at step 243, and loop back to step 242. If not (No at step 242), a determination is made regarding whether there has been any phone activity within a second threshold period of time (in one embodiment, this period of time is five minutes), at step 244. If so (Yes at step 244), the display will be dimmed at step 245, and loop back to step 244. If not (No at step 244), the phone will then go to sleep (display turns off) at step 246 and at step 247. If a wake event occurs (e.g., button press) at step 248, the phone will then return to the wake state (display turns on) at step 241.

In the illustrated embodiment, the phone comes with a variety of ringtones that can be heard and set by pressing the set ringtone button 132. Ringtones include a range of traditional and fun sounding "rings" from things like classic telephone rings to more modern melodies and nature sounds, etc. Pressing this button allows a user to hear a short sample of the currently set ringtone. Ringtones are likely one or more small loops that comprise a longer form ringtone, so these should be reasonably short, approximately two to four seconds. Subsequent presses within a short window of time, such as one second, will step through a linear list of the phone's available ringtones, looping back to the start in the same linear sequence. When a user hears a ringtone they like, they stops pressing the button to establish that particular as their phone's new ringtone.

Figure 5A:
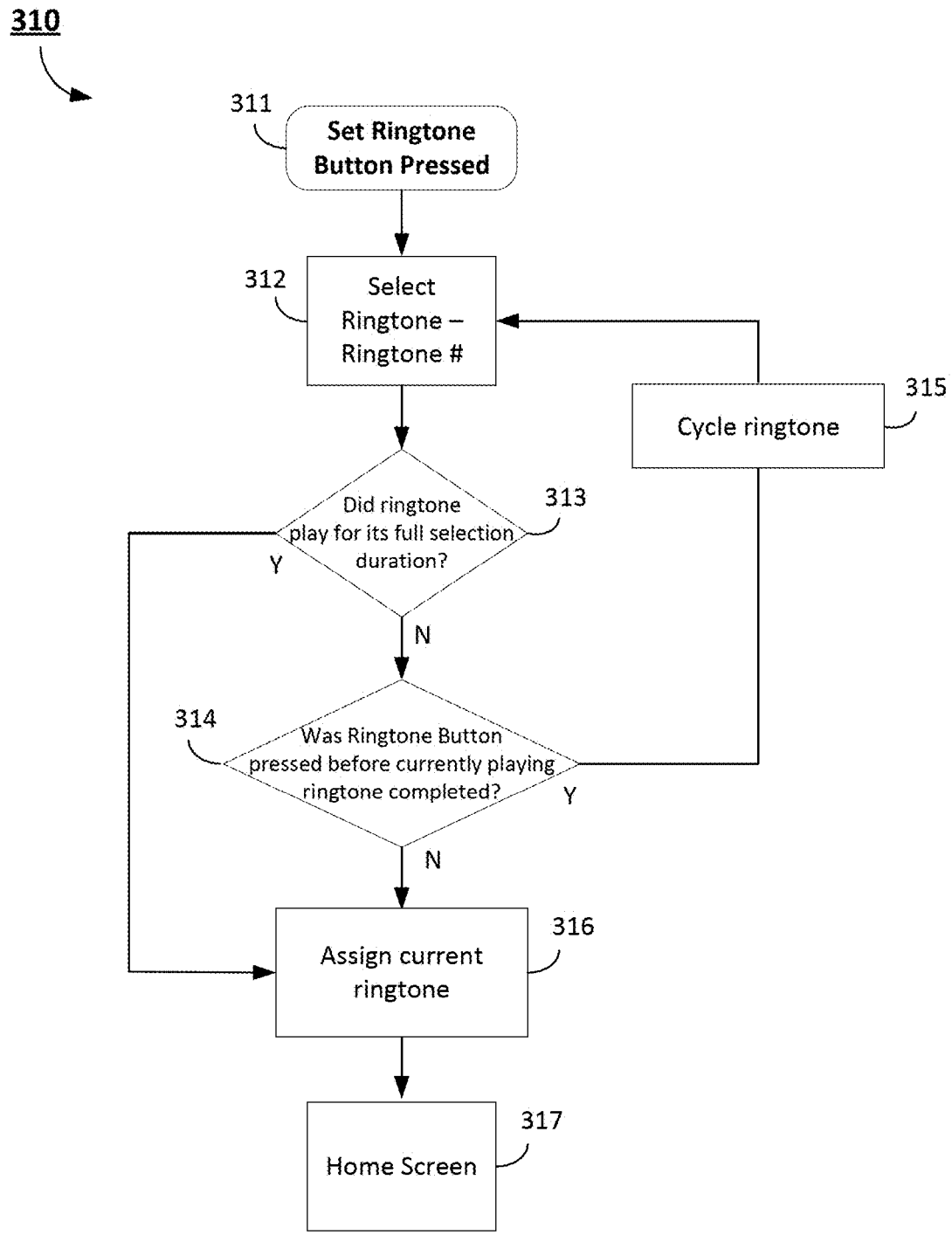
FIG. 5A is a flowchart of an exemplary set ringtone button process according to the present invention.

FIG. 5A shows a flow 310 of operations when a set ringtone button is pressed, according to an example embodiment. Users set their phone's ringtone using the set ringtone button 132. This action may also establish an associated icon to be used for the phone for identification amongst multiple possible recipients.

When the set ringtone button is pressed at step 311, the first ringtone that plays is the ringtone currently assigned to the phone. In addition, the visual identity (color/pattern) unique to this particular ringtone is displayed. During ringtone selection, at step 312, each ringtone only plays for a short defined duration, such as three to five seconds. At step 313, a determination is made regarding whether the ringtone played for its full selection duration. If not (No at step 313), and the ringtone button is pressed before the currently playing ringtone completed (Yes at step 314), then the phone will cycle the ringtone at step 315, and loop back to step 312. Thus, subsequent presses of the ringtone button cycle through the ringtone playlist linearly.

If the ringtone plays for its full duration (Yes at step 313), and/or if the ringtone button was not pressed again before the currently playing ringtone completed (No at step 314), then the ringtone will be assigned as the current ringtone of the phone at step 316. In some example embodiments, the phone will then return to the home screen (step 317) once a ringtone has been assigned, or when the user presses the power button, for example.

Figure 5B:
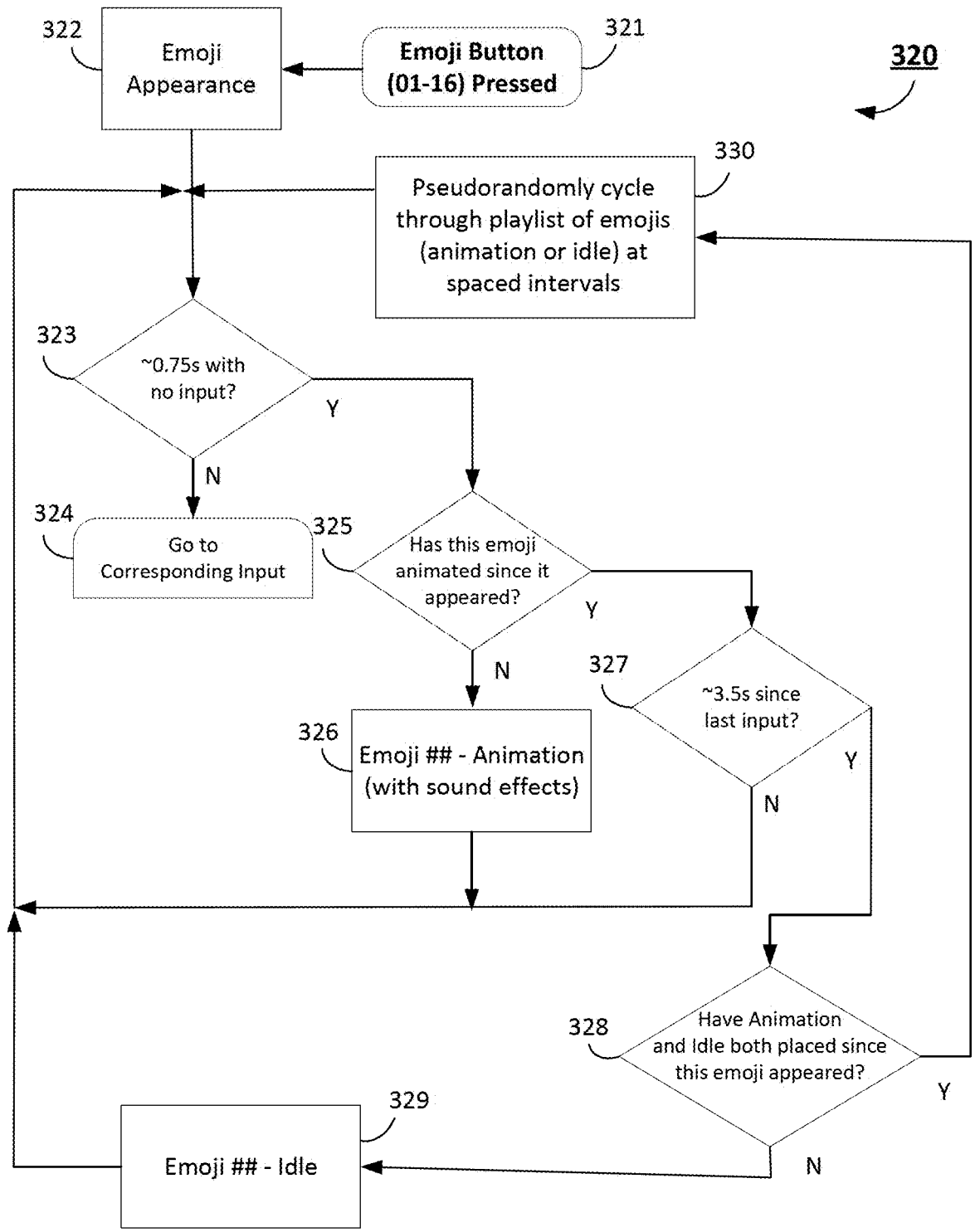
FIG. 5B is a flowchart of an exemplary emoji message creation process according to the present invention.

Turning to FIG. 5B, the creation of an emoji message using the communication device is discussed. Users can entertain themselves playing with emojis (i.e., building emoji messages) by pressing any of the sixteen emoji buttons 120. Pressing an emoji button displays a full screen animated version of the selected emoji with its accompanying sound effects (such as a laughing emoji with an animating mouth and giggle sound effects). Pressing multiple emoji buttons in a sequence will present emoji after emoji in the full screen display area, each emoji replacing the previous emoji with a simple transition, as they showcase their individual animations and accompanying sound effects. Users do not need to send these emojis to anyone; they can do this for as long as they like on their device. However, if users wish to send emojis, the following description relates to how they build their message according to the invention.

FIG. 5B shows a flow 320 of operations when an emoji button is pressed, and creation of an emoji message, according to an example embodiment. Users can play around with the emoji buttons 120. This activates the emoji tracker 115 (refer to FIGS. 3B-3C), which functions as an overlay. Users can also use the send message button 118 to try and send an emoji message to another phone.

When one or more of the emoji buttons (e.g., 01-16) is/are pressed at step 321, the emoji or emojis will appear on the display in various ways (step 322). If a first period of time (e.g., approximately 0.75 seconds) has elapsed with no input (Yes at step 323), then a determination is made at step 325 whether this emoji has been animated since it appeared. If an input is received during the first period of time at step 323 (No at step 323), then the device proceeds to the corresponding input in step 324.

Returning to step 325, if this emoji has not yet been animated (No at step 325), then the animated emoji will be displayed (animated "showboat" image with corresponding sound effects) (step 326) and the process returns to step 323. If this emoji has already been animated before (Yes at step 325), and a second period of time (e.g., approximately 3.5 seconds) has elapsed since the last input (Yes at step 327), then a determination is made whether the animated (showboat) emoji and a corresponding still (idle) emoji have both played since this emoji appeared at step 328. If the still (idle) emoji has not yet played since this emoji appeared (No at step 328), then the still (idle) emoji will be displayed (still "idle" image, with or without sound effects) at step 329 and the process returns to step 323.

In some example embodiments, after both the animated/showboat emoji and the still/idle emoji have played/been displayed since this emoji appeared (Yes at step 328), the phone will then pseudo randomly select a starting point in the playlist of emojis and cycle through this list linearly, playing each animated/showboat emoji and sound effects and/or displaying each still/idle emoji at spaced intervals of a short defined duration (e.g., 2.5 to 7 seconds) until user input is received (step 330) and the process returns to step 323. Shuffling the display in "random" time intervals in this manner helps to make the emoji message feel "alive" as the user interacts with the phone. Returning to step 327, if the process determines No at step 327, then it returns to step 323.

As emoji buttons 120 are pressed, an emoji message tracker 115 is displayed along the bottom of the screen. The emoji message tracker 115 is a visual indicator that represents the series of emojis being created, which is useful if the user intends to send them as a message. This tracker indicates (1) the number of emoji slots allowed in a message, (2) which slots are filled, and (3) the currently displayed emoji's location within the sequence. In this illustrated embodiment, there is not the scenario where the user presses an emoji button and the screen won't display that emoji because the slots are full. Instead, if the user has reached the maximum amount of emojis for the message and presses an emoji button, the tracker's "current location" can either (A) loop around to first position to begin overwriting previously created emojis from the beginning, or (B) remain at the ending location and begin erasing the emojis at the start of the sequence as each additional emoji gets added. This may call for an additional graphic on the tracker, i.e. (4) the deletion of the first emoji in the series as each new one gets created.

Figure 5C:
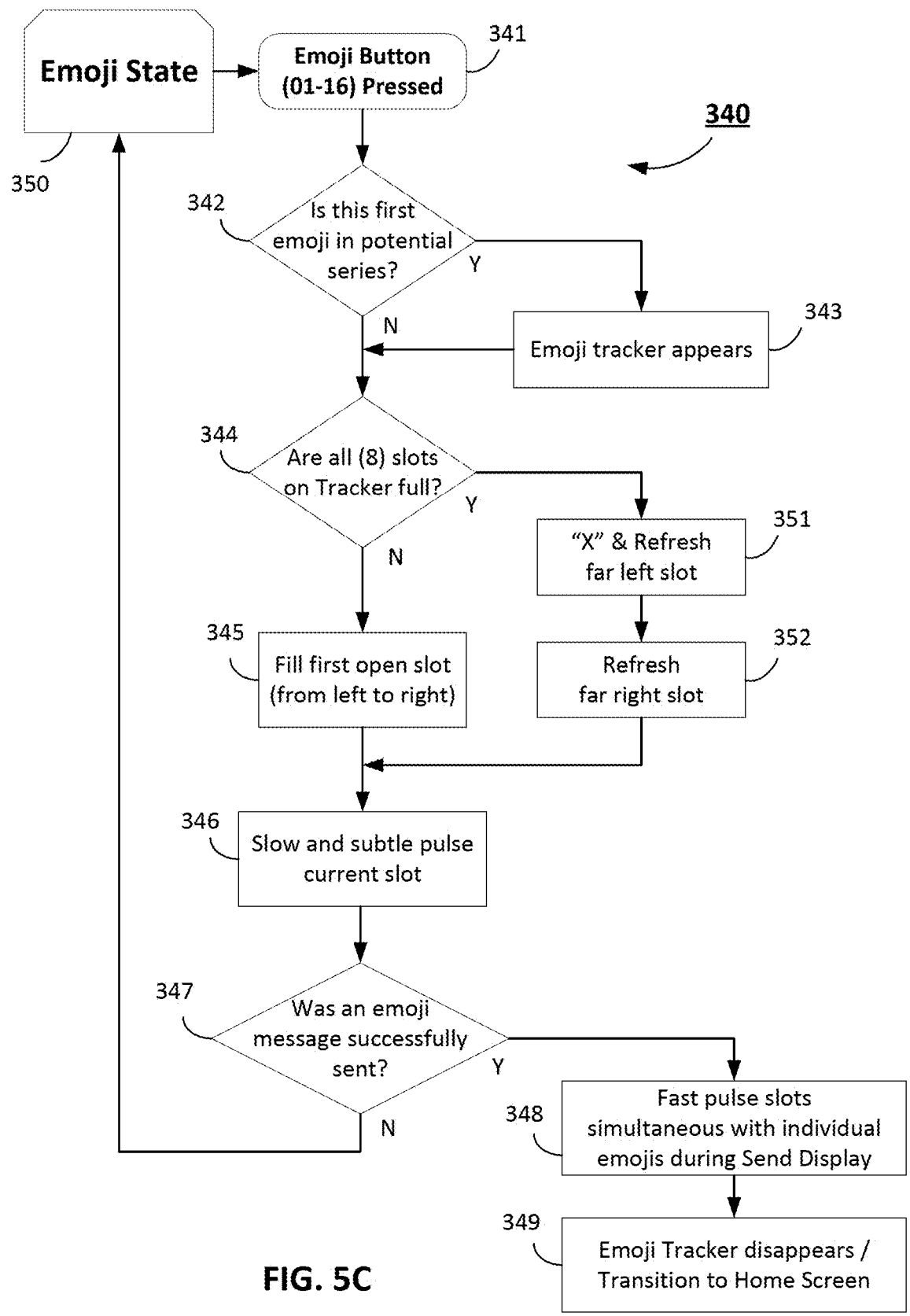
FIG. 5C is a flowchart of an exemplary emoji tracker process according to the present invention.

FIG. 5C shows an exemplary emoji tracker flow 340 when one or more emojis are placed, according to an example embodiment. When one or more of the emoji buttons (e.g., 01-16) is/are pressed at step 341, a determination is made in step 342 whether this is the first emoji in this potential series. If so (Yes at step 342), the emoji tracker 115 appears in the display (step 343). If this is not the first emoji (in other words, adding another emoji to an existing series) (No at step 342), a determination is made whether all slots on the tracker 115 are full at step 344. While in this embodiment the tracker 115 includes eight slots or circles, the tracker 115 can have a different quantity of circles in other embodiments. If the tracker 115 is not full (No at step 344), the first open slot will be filled with the current emoji (fills from left to right) at step 345. If the Tracker is full (Yes at step 344), the phone will remove the far left emoji in the tracker 115 and refresh the far left slot at step 351, and refresh the far right slot at step 352. In some example embodiments, the current slot be identified on the display with a visual indicator, such as a slow and subtle pulse, at step 346.

In some example embodiments, when the phone attempts to send an emoji message in response to a user input, a determination is made whether the emoji message was successfully sent at step 347. If so (Yes at step 347), then the phone displays a visual indicator (e.g., fast pulse slots) simultaneous with individual emojis during send display at step 348. After this replay of the emoji message, the emoji tracker disappears from the display and the phone transitions back to the home screen at step 349.

Returning to step 347, if the attempt to send the emoji message was unsuccessful (No at step 347), then the phone will display an "unsuccessful send" notification. In some example embodiments, the emoji state 350 and its tracker are reset when the state 350 is abandoned and after a message is successfully sent, whereas unsuccessful sends will retain the emoji state and its tracker and return to the populated state after displaying the "unsuccessful send" notification.

Another operation of the communication device is now discussed. Users can record and listen to their voice recording, and then send it as a voice message. In the illustrated embodiment, to create and send voice messages, the user can press the record voice button 136 to record a five-second audio recording. The length of the recording can vary in different embodiments. Pressing button 136 begins a recording function of the device, which includes displaying a full screen metered recording animation with audible sound effects, such as a beep, at the start and the end of the recording period to demonstrate the recording's duration. After a recording takes place, it plays back automatically with a metered playback visual so the user can listen to what was recorded. Like playing with the emoji buttons, users can simply have fun making recordings and listening to their recordings played back, without sending them to anyone.

Figure 5D:
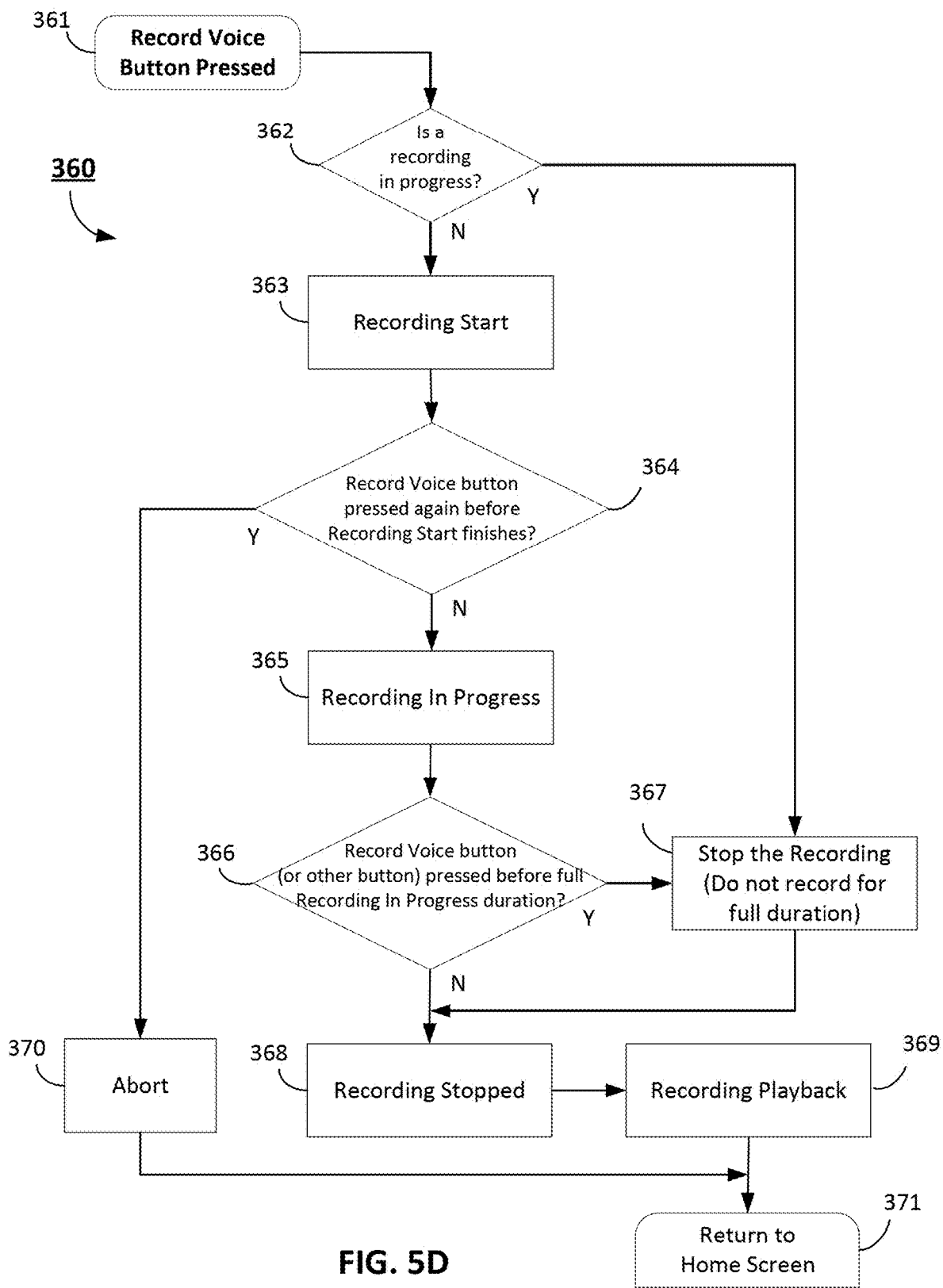
FIG. 5D is a flowchart of an exemplary record voice button process according to the present invention.

FIG. 5D shows a flow 360 of operations when a record voice button is pressed, and voice message creation, according to an example embodiment. Users can record their voice and listen to their voice recording using the record voice button 136 (step 361). Users can also send their voice recording as a voice message.

If there is no recording currently in progress (No at step 362), and the record voice button is pressed at step 361, the phone will start recording at step 363. In some example embodiments, if the record voice button is pressed again before recording start finishes (Yes at step 364), then the phone will abort the voice recording at step 370, and return to the home screen at step 371. Returning to step 364, if the record voice button is not pressed again, the recording continues (step 365).

In some other example embodiments, at step 366 if the record voice button (or call phone button, or send message button) is pressed while recording is in progress before the full recording in progress duration (Yes at step 366), the phone will stop the recording at step 367. Likewise, if there is a recording currently in progress when the record voice button is pressed (Yes at step 362), then the phone stops the recording (do not record for full duration) at step 367. Alternatively, if the record voice button is not pressed (No at step 366), then the recording stops at the predetermined length of time.

After the phone stops recording (upon completion of the full recording in progress duration, or in response to the user pressing the record voice button or another button to end the recording) (step 368), the phone will playback the voice recording (step 369). In some example embodiments, voice recordings may be limited to a defined short duration (e.g., five seconds, ten seconds) to conserve memory resources and battery. After this replay of the voice recording, the phone may transition back to the home screen at step 371 (automatically, or in response to user pressing power button, for example).

Turning to another exemplary process of the communication device, the process relating to the send message button and the step of sending an "on deck" emoji or voice message is now described with reference to FIG. 5E. To send a voice message or an emoji message to a paired phone, a user creates a voice message or an emoji message and presses the send message button 118. Functional details about voice and emoji messages are described herein. As noted above, with just two phones on the network, the phone will automatically send the created message to the only other phone with which it is paired, with a sub-selection method required when there are three or more phones in a paired network.

Once an emoji button has been pressed, it is considered a potential emoji message that is "on deck" and ready to be sent. To send the "on deck" emoji message to a recipient's phone, a user simply presses the send message button 118. There is no special step required to turn "just playing with emojis" into an "emoji message" beyond pressing this send button. Note that if there are more than one other possible recipient phones on the network, an additional sub-selection method will be required to determine which phone is to receive a message. An emoji message will have a finite amount of emojis that can be sent at a time. A user can play with emojis all they want and is not restricted to how many emojis get can be displayed while they are playing with them, but when the emojis get sent, only up to eight will be transmitted. In other embodiment, this quantity can vary.

When a user sends an emoji message, the series of emojis being sent will be displayed in sequence along with their animations and sound effects; and this is the same message that will be received by the recipient's phone. If both phones are awake and in range of one another, the sending phone will indicate that the message was sent successfully. If the recipient's phone was not in range or awake at the time the message was sent, the sending phone will receive an indicator that the message was not delivered successfully.

In a similar manner, after a voice recording has been made, it is considered a potential voice message that is "on deck" and ready to be sent. To send the "on deck" voice message to a recipient's phone, a user simply presses the send message button 118. This works the same way as emoji messages. Again, if there are more than one other possible recipient phones on the network, an additional sub-selection method will be required to determine which phone is being messaged.

When a user sends a voice message, the message will replay with a metered playback visual as it gets sent; this is the same message that will be received by the recipient's phone. If both phones are awake and in range of one another, the sending phone will indicate that the message was sent successfully. If the recipient's phone was not in range or awake at the time the message was sent, the sending phone will receive an indicator that the message was not delivered successfully.

Figure 5E:
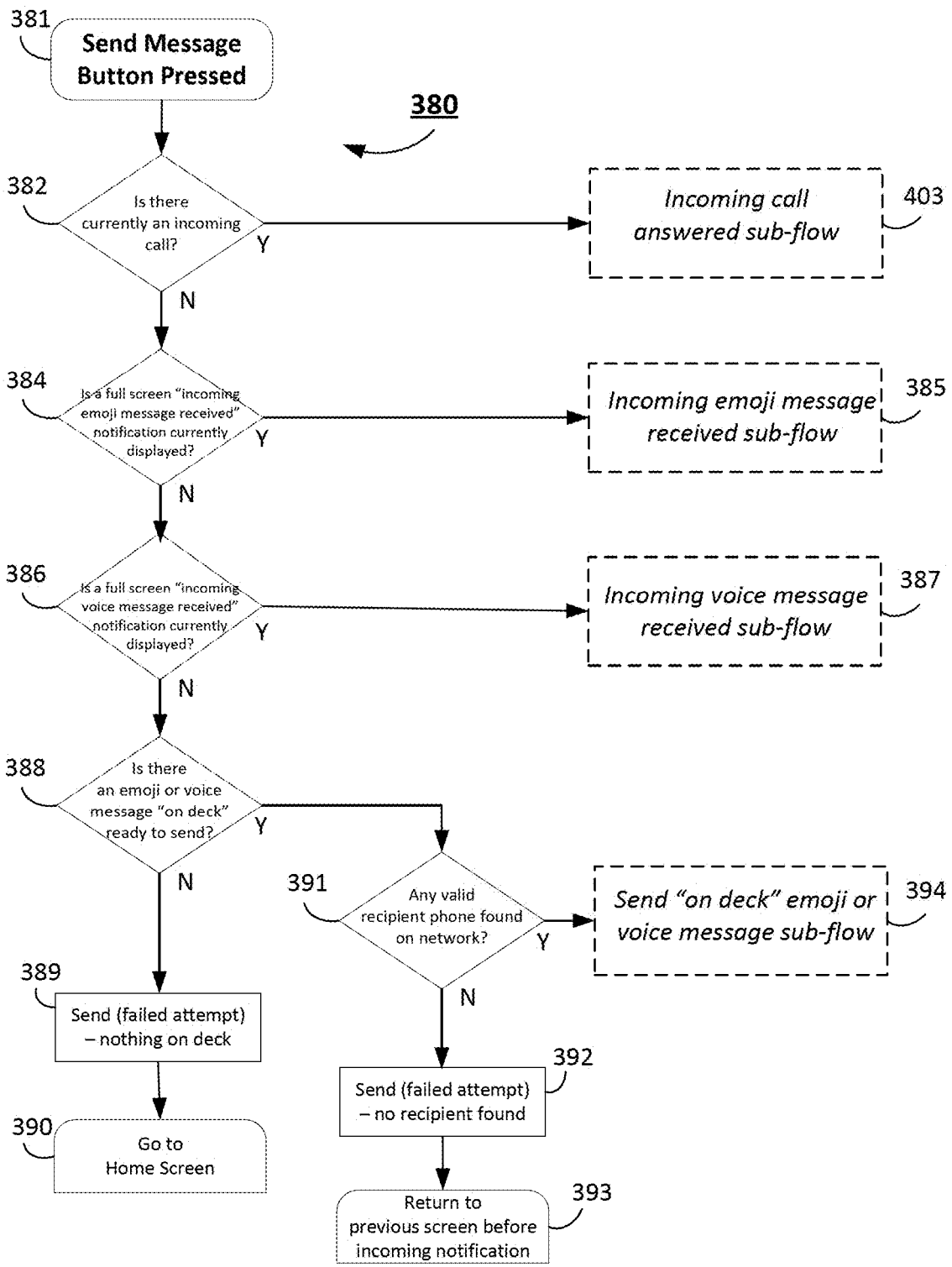
FIG. 5E is a flowchart of an exemplary send message button process according to the present invention.

Referring to FIG. 5E, a flow 380 of operations when a send message button is pressed, and sending an "on deck" emoji message or voice message, according to an example embodiment. Users can attempt to send a created emoji message or voice message by pressing the send message button 118 (step 381). Only one message can be "on deck" at a time. The send message button also shares some notable functionalities in the context of current phone activity.

When the user presses the send message button 118 at step 381, the phone will first determine if there is currently an incoming call at step 382. If so (Yes at step 382), the phone will answer the incoming call and perform an incoming call answered sub-flow (step 403), see FIG. 5G and the associated description below.

In FIG. 5E, if there is currently no incoming call (No at step 382) when the user presses the send message button (step 381), the phone will determine if a full screen "incoming emoji message received" notification is currently displayed at step 384. If so (Yes at step 384), the phone will proceed to an incoming emoji message received sub-flow 385. An exemplary embodiment of an incoming emoji message received sub-flow 385 is illustrated in FIG. 5H.

Figure 5F:
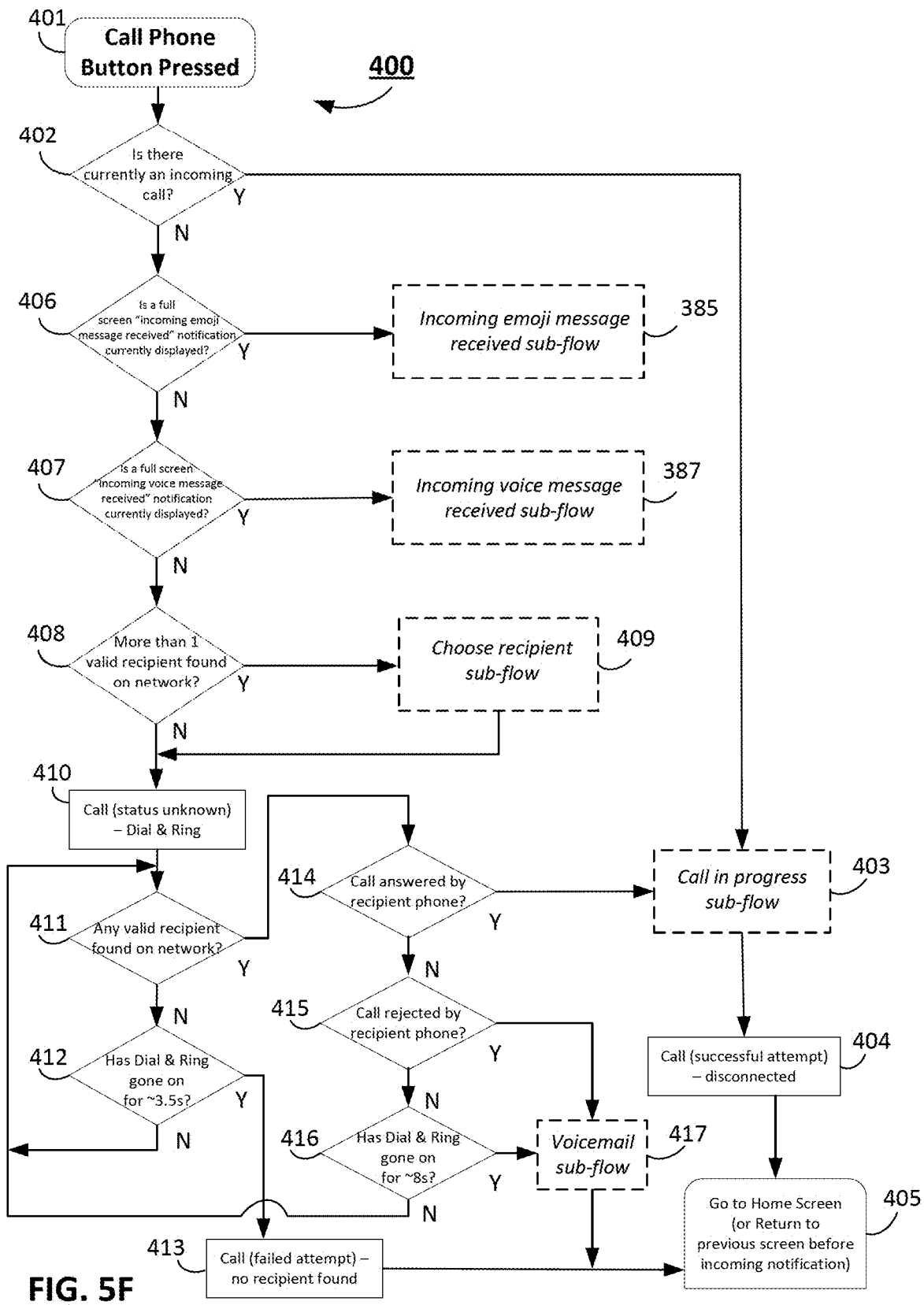
FIG. 5F is a flowchart of an exemplary call phone button process according to the present invention.
Figure 5G:
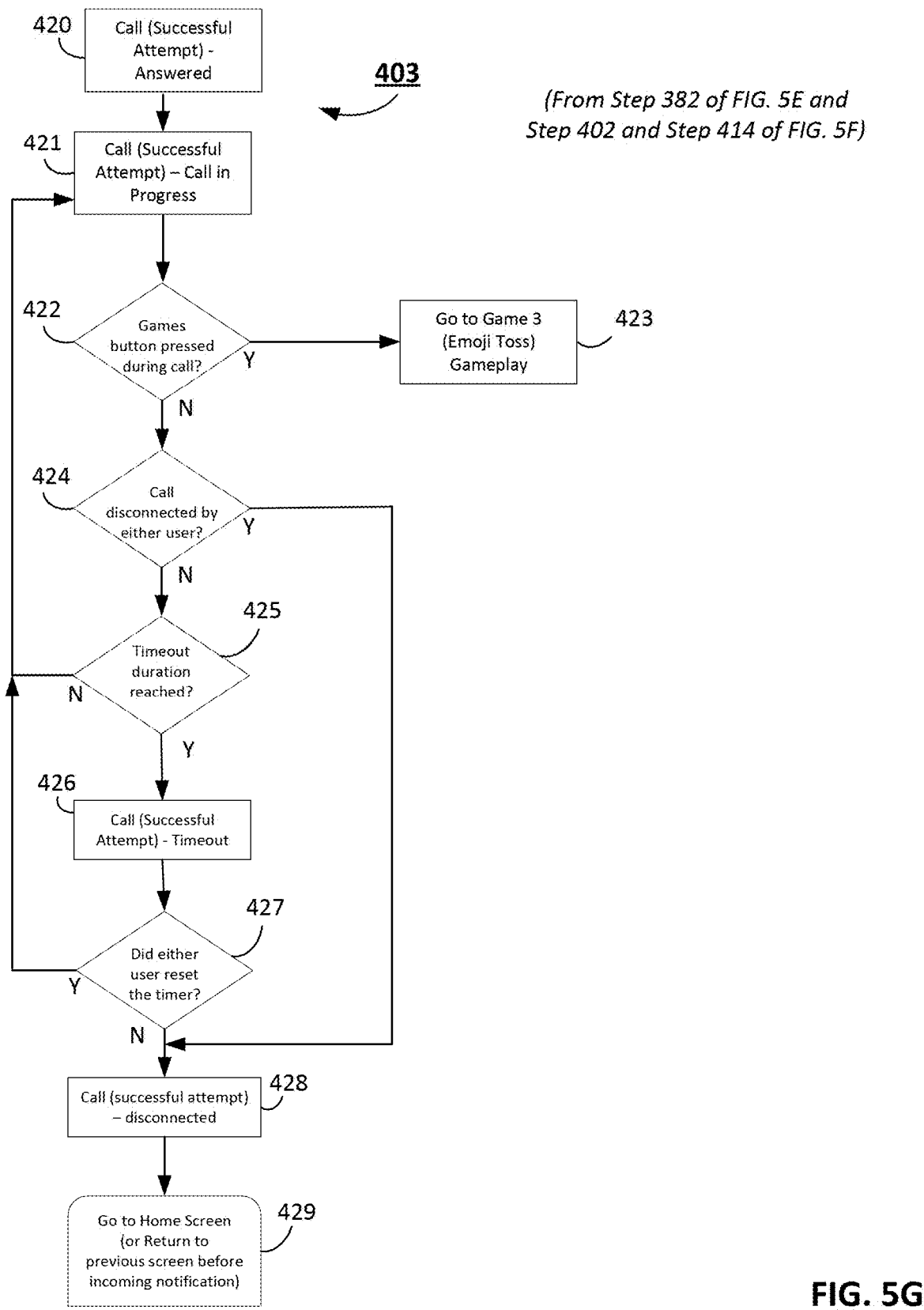
FIG. 5G is a flowchart of an exemplary incoming call answered or call in progress process according to the present invention.
Figure 5H:
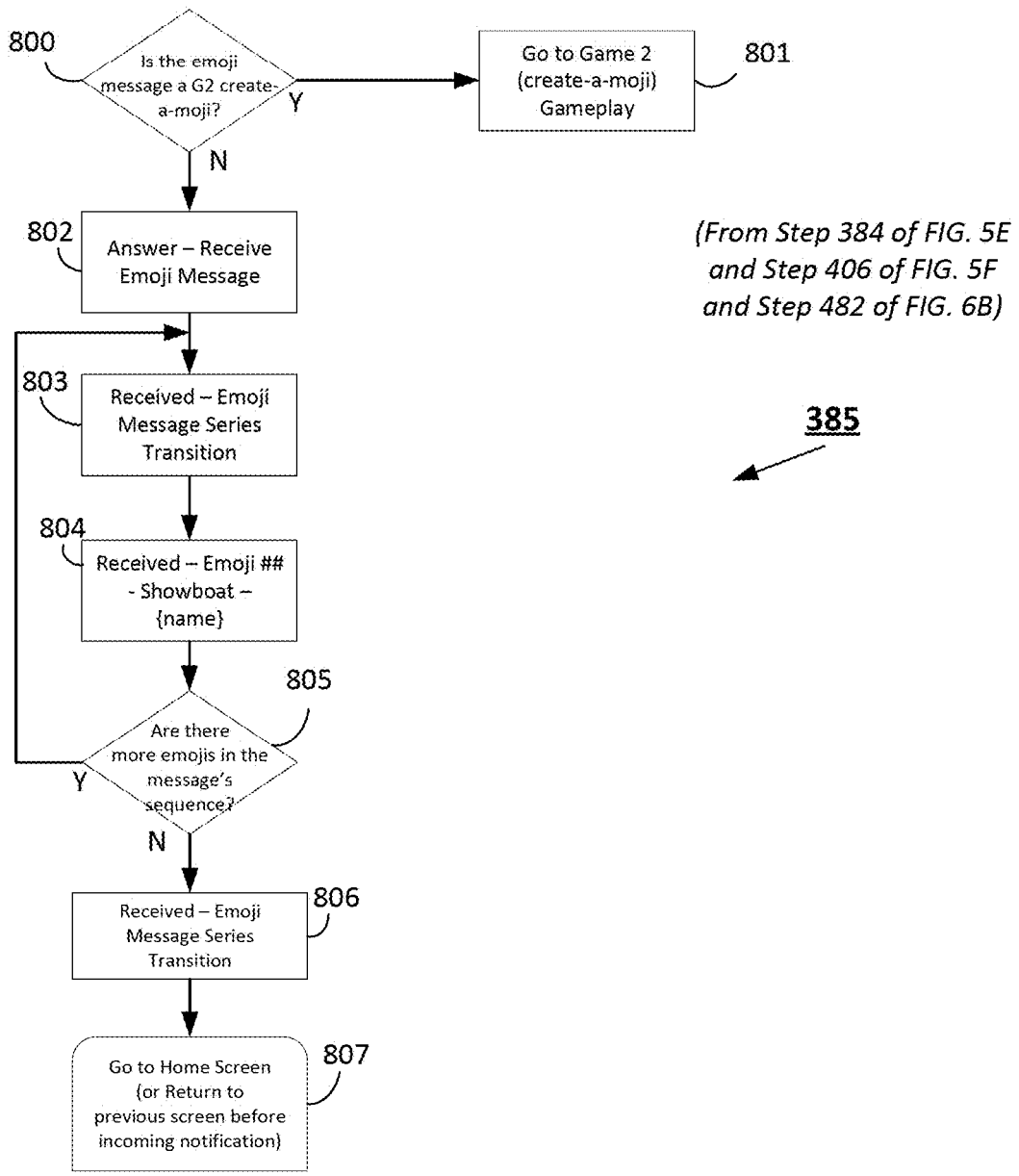
FIG. 5H is a flowchart of an exemplary incoming emoji message received process according to the present invention.

Turning to FIG. 5H, the incoming emoji message received sub-flow 385 includes several steps, the first of which is to determine whether the emoji message is a game 2 create-a-moji emoji message (step 800). If so (Yes at step 800), the phone will go to game 2 (create-a-moji) gameplay (step 801). Opening a game 2 create-a-moji emoji message loads directly into game 2 gameplay, with the content of the received emoji message as the starting template.

If the incoming emoji message is not a game 2 create-a-moji emoji message, but rather a regular emoji message (No at step 800), the phone will receive the emoji message at step 802, and display one or more emojis included in the emoji message (step 803). In some example embodiments, the phone displays an animation corresponding to the emoji and also plays a corresponding sound effect (step 804). Next, the phone will determine whether there are any more emojis in the message's sequence (step 805). If the emoji message includes a sequence of multiple emojis (Yes at step 805), the phone will display the animations and corresponding sound effects for each respective emoji in the sequence one at a time (repeating through steps 803 and 804 for each emoji). If there is only one emoji in the message, or once there are no additional emojis remaining in the message's sequence (No at step 805), the phone will transition at step 806 and return to the previous screen before the "incoming emoji message received" notification at step 807.

Returning back to FIG. 5E at step 384, if a full screen "incoming emoji message received" notification is not currently displayed (No at step 384), the phone will determine if a full screen "incoming voice message received" notification is currently displayed at step 386. If so (Yes at step 386), the phone will proceed to an incoming voice message received sub-flow 387, which in this embodiment includes receiving the incoming voice message, and playing the received voice message. Once the voice message has finished playing, the phone will return to the previous screen before the "incoming voice message received" notification.

Otherwise, if there is currently no incoming call and no full screen incoming emoji or voice message received notification currently displayed (No at step 386), then the phone will determine whether there is currently an emoji message or voice message "on deck" and ready to send at step 388. This means that the user has just created an emoji message by pressing one or more emoji buttons, or a voice message using the record button. If there is currently no "on deck" emoji message or voice message ready to send (No at step 388), this will be considered a failed send attempt (because there is nothing on deck ready to send) (step 389). The phone may also display a "send (failed attempt)—nothing on deck" notification at step 389, before returning to the home screen at step 390.

If there is currently an "on deck" emoji message or voice message ready to send (Yes at step 388), the phone will determine whether any valid recipient phone is found on the network at step 391. A valid recipient phone is any phone that is paired with the sending phone that is awake and within range. If no valid recipient phone is found on the network (No at step 391), this will be considered a failed send attempt (because there is no recipient on the network currently), and the phone may also display a "send (failed attempt)—no recipient found" notification at step 392 and return to the previous screen (e.g., emoji creation or voice record) at step 393.

If a valid recipient phone is found on the network (Yes at step 391), the phone will proceed with a send "on-deck" emoji or voice message sub-flow process at step 394. In the illustrated embodiment, an exemplary send "on-deck" emoji or voice message sub-flow process 394 is illustrated in FIG. 5I.

Figure 5I:
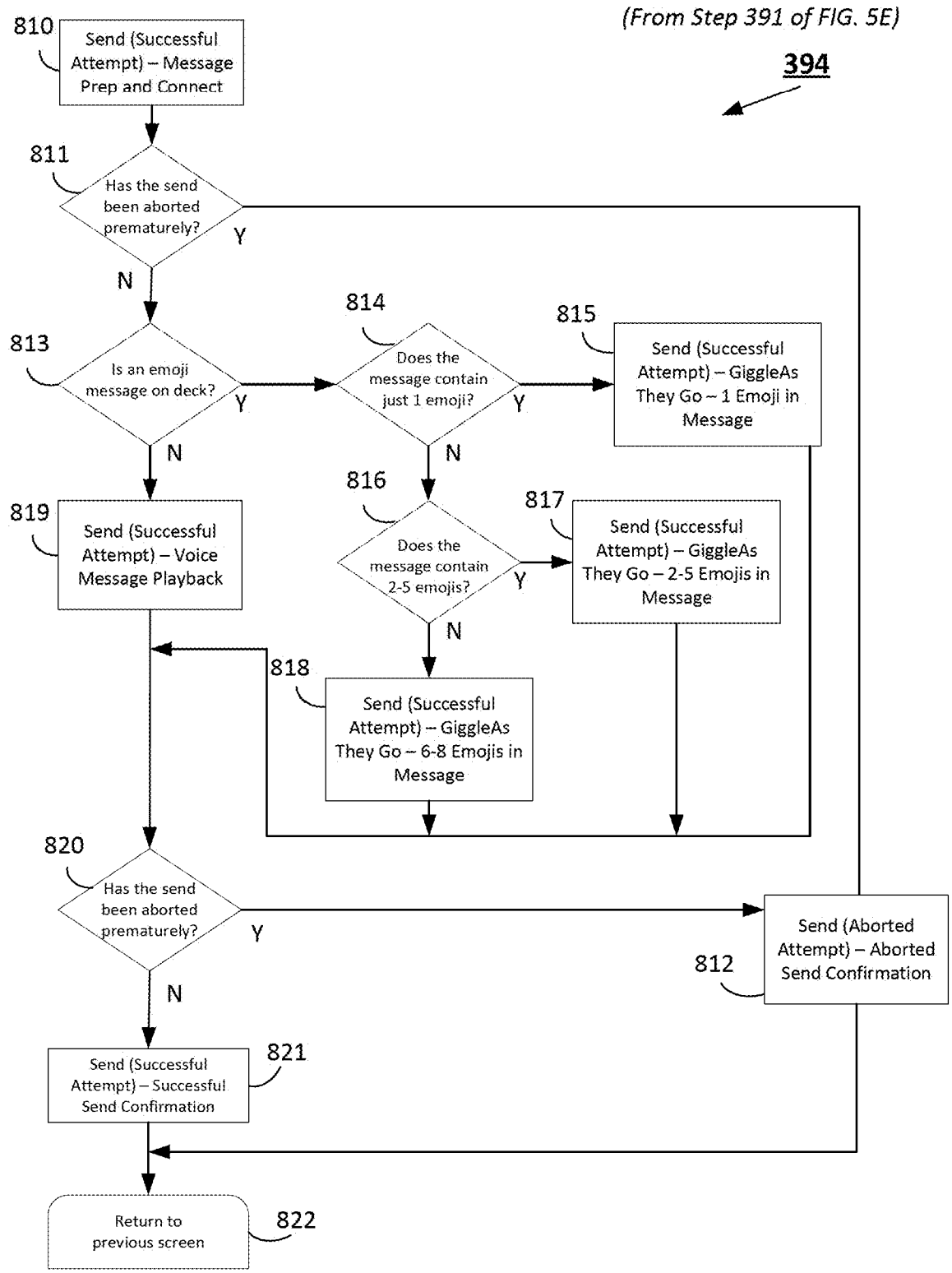
FIG. 5I is a flowchart of an exemplary send on deck emoji or voicemail process according to the present invention.
Figure 5J:
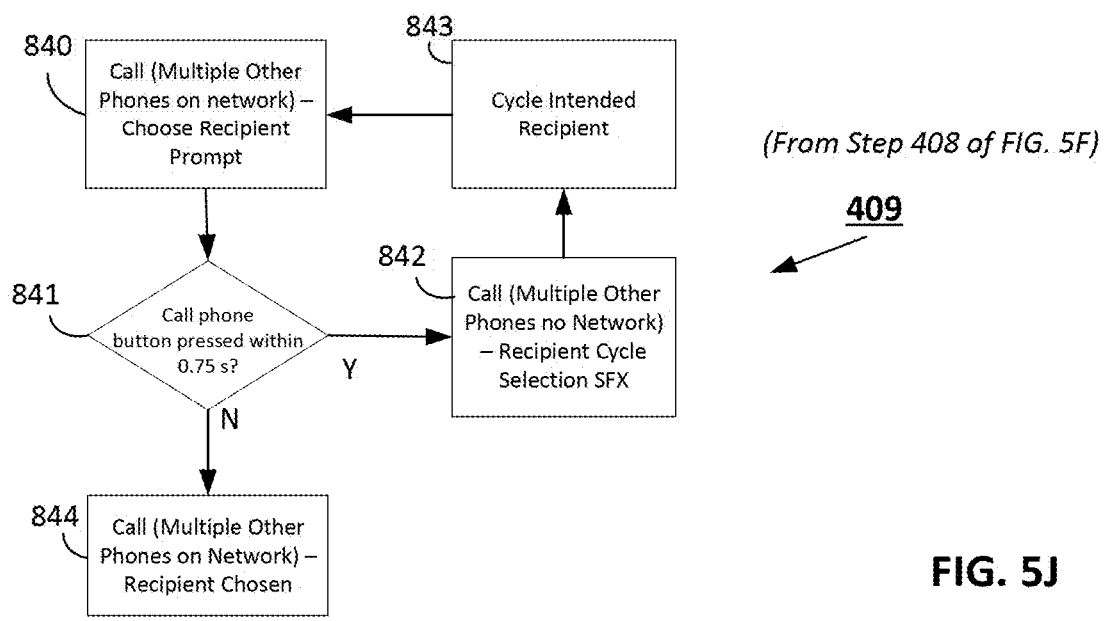
FIG. 5J is a flowchart of an exemplary choose recipient process according to the present invention.

Turning to FIG. 5I, the send "on-deck" emoji or voice message sub-flow process 394 involves the phone determining whether more than one valid recipient is found on the network. If so (Yes), the phone will display a "choose recipient" prompt and will follow the choose recipient sub-flow 409 that is illustrated in FIG. 5J and described below. Returning to FIG. 5I, if there is only one valid recipient found on the network, or after the intended recipient is chosen in the case of multiple valid recipients being found on the network, the phone will prepare the message to send and connect with the recipient phone (step 810).

At step 811, the phone may determine whether the send message has been aborted prematurely. A user can abort a sending message in progress at any step before the final confirmation by pressing the power button (and possibly one or more other button(s)), or if a valid phone becomes an invalid phone (e.g., went to sleep or moved out of range) before the message can be received. If the send message has been aborted prematurely (Yes at step 811), the phone will display an aborted send confirmation at step 812, and return to the previous screen at step 822.

If the user has not prematurely aborted the send message (No at step 811), then the phone will determine whether the "on deck" message is an emoji message (step 813). If so (Yes at step 813), the phone will replay the emoji message as it is being sent to the recipient phone. In some example embodiments, this cycle presents a fast version of the "on deck" emoji sequence being sent, alternating between transitions and the user-defined emojis until the entire sequence has been presented. If the user is sending a game 2 create-a-moji created emoji, the emoji message should include all of the created content as the user has created it (e.g., halves, audio, animations, background).

In another embodiment, as shown in FIG. 5I, if the emoji message is on deck (step 813), then the device determines whether the "on deck" message contains just one emoji (step 814). If it does (Yes at step 814), then the device sends a Giggle As They Go message that has a single emoji in the message (step 815). If it has more than one emoji (No at step 814), then the device determines whether the "on deck" message contains between two and five emojis (step 816). If it does (Yes at step 816), then the device sends a particular Giggle As They Go message that has between two and five emojis (step 817). If the message does not contain between two and five emojis (No at step 816), then the device sends a particular Giggle As They Go message that has between six and eight emojis in the message (step 818). The device then determines whether the send operation was aborted prematurely at step 820. If yes, then the process goes to step 812 in which an aborted send confirmation is displayed.

Once all of the emojis in the sequence of the emoji message have been presented (No at step 820), the phone will display a successful send confirmation (step 821), and return to the previous screen (step 822). Otherwise, if the "on deck" message is not an emoji message, but rather is a voice message (No at step 813), the phone will replay the voice message as it is being sent to the recipient phone (step 819). Once the voice message has finished being replayed, and the user has not prematurely aborted the send message (step 820), the phone will display a successful send confirmation at step 821, and return to the previous screen at step 822.

Turning to a different flow or process of the communication device, the "call phone" button flow is now described. Referring to FIG. 5F, an exemplary call phone button flow 400 is illustrated. To call another paired phone, a user presses the call phone button 116. With just two phones on the network, this will automatically attempt to call the only other phone it sees. If more than two phones are allowed to be paired together, a method of choosing which phone to call will be presented. Pressing this button again disconnects the call.

Voicemail is a subtly different form of voice messages that functions very similarly: when a user calls another user's phone that is awake and within range, but the recipient does not answer, the calling user is able to leave a voicemail message. When a call is not answered, after several "rings" the calling user's phone displays a notification that the call went unanswered, and automatically advances to begin and record a voicemail message (the user is not required to press the record voice button). Like a regular voice recording, it displays a full screen metered recording animation with beep sound effects at the start and the end of the recording period to demonstrate the recording's five second duration. Unlike a regular voice recording, it does not replay the recording for the user, and simply disconnects the call after the message has been recorded on the recipient phone, notifying the sender's phone that the message has been successfully left.

FIG. 5F shows a flow 400 of operations when a call phone button 401 is pressed, according to an example embodiment. Users can attempt to call another phone through the call phone button 116. This button shares some notable functionalities in the context of phone activity.

When the user presses the call phone button at step 401, the phone will first determine if there is currently an incoming call at step 402. If so (Yes at step 402), the phone will answer the incoming call at step 402 and go to a call in progress sub-flow 403, which is illustrated in FIG. 5G.

Referring to FIG. 5G, an exemplary call in progress sub-flow process 403 is illustrated. This sub-flow is referred to alternatively as an incoming call answered sub-flow process. In this embodiment, the call in progress sub-flow process 403 includes the following steps. At step 420, the call was answered, and at step 421, the call is in progress. While the call is in progress, the phone will determine if the games button is pressed during the call (step 422). If so (Yes at step 422), the phone will go to game 3 (emoji toss) gameplay (see step 423). Pressing the games button during a call will proceed to launch game 3 (emoji toss) without interrupting the live call. In addition, while the call is in progress, if the games button has not been pressed during the call (No at step 422), the phone will determine whether the call has been disconnected by either user (step 424). If so (Yes at step 424), the phone will disconnect the call at step 428, and return to the previous screen before the incoming call notification at step 429.

Otherwise (No at step 424), the phone will determine whether a timeout duration is reached (step 425). If neither user presses the games button or disconnects the call, the call may continue until a particular period of time has expired (returning back to step 421). If the phone determines that the timeout duration has been reached (Yes at step 425), a timeout sequence will begin at step 426. During the timeout sequence, the phone will determine whether either user has reset the timer at step 427. After the timeout sequence begins, a user can stop the phone from disconnecting by pressing any button to reset the timer, ending the timeout sequence immediately and allowing the call to continue. If either user resets the timer (Yes at step 427), the process will loop back to step 421 and continue the call. Otherwise, if neither user resets the timer (No at step 427), the phone will disconnect the call at step 428, and return to the previous screen before the incoming call notification at step 429.

Returning to FIG. 5F and step 402, if there is currently no incoming call (No at step 402) when the user presses the call phone button (step 401), the phone will determine if a full screen "incoming emoji message received" notification is currently displayed at step 406. If so (Yes at step 406), the phone proceeds to the incoming emoji message received sub-flow 385, described above relative to FIG. H. If not (No at step 406), the phone proceeds to step 407.

At step 407, if a full screen "incoming voice message received" notification is currently displayed (Yes at step 407), the phone proceeds to the incoming voice message received sub-flow 387, which is described above.

Otherwise, if there is currently no incoming call and no full screen incoming emoji or voice message received notification currently displayed (No at step 407), then the phone will determine whether two or more valid recipient phones are found on the network at step 408. A valid recipient phone is any phone that is paired with the sending phone that is awake and within range. If there are multiple valid phones found on the network (Yes at step 408), the phone proceeds with a choose recipient sub-flow process 409.

An exemplary embodiment of a choose recipient sub-flow process 409 is illustrated in FIG. 5J. Referring to FIG. 5J, at step 840, the device displays a "choose recipient" prompt. If the user presses the call phone button within a short period of time (~0.75s) (Yes at step 841), the phone will play a recipient cycle selection sound effect at step 842, cycle the intended recipient at step 843, and return to step 840 in which the prompt is displayed. If the user does not press the call phone button within the short period of time (No at step 841), the phone will determine that the user has chosen the intended recipient at step 844.

Returning to FIG. 5F and in particular to step 408, if there are not two or more valid recipients found on the network (No at step 408), or after the intended recipient is chosen in the case of multiple valid recipient phones being found on the network, the phone will dial and ring while attempting to connect with another phone on the network (e.g., a previously paired phone, or the chosen intended recipient) (step 410).

If no valid recipient phone is found on the network (No at step 411), the phone will continue dialing and ringing for a first threshold period of time (~3.5 seconds) at step 412. If there is still no valid recipient phone found on the network after the first threshold period of time has elapsed (Yes at step 412), this will be considered a failed call attempt (step 413) (because there is no valid recipient phone on the network currently), and the phone will return to the previous screen or the home screen at step 405. The phone may also display a "call (failed attempt)—no recipient found" notification before returning to the previous screen or home screen.

Returning to step 411, if a valid recipient phone is found on the network (Yes at step 411), the phone will determine whether the call was answered by the recipient phone at step 414. If the call is answered by the recipient phone (Yes at step 414), then the phone will connect with the recipient phone, enabling the respective users to exchange live communications while the call is in progress via the call in progress sub-flow process at step 403 (see FIG. 5G). After that process, the call continues until it is disconnected at step 404 and then the phone returns to the home screen at step 405.

If the call was not answered at step 414 (No at step 414) and the recipient phone rejected the call (Yes at step 415), or if the recipient phone has still not answered or rejected the call after the second threshold period of time has elapsed (Yes at step 416), the phone will determine that there is no answer and forward the user to leave a voicemail for the user of the recipient phone. In particular, the recipient phone follows the voicemail sub-flow at step 417.

Figure 5K:
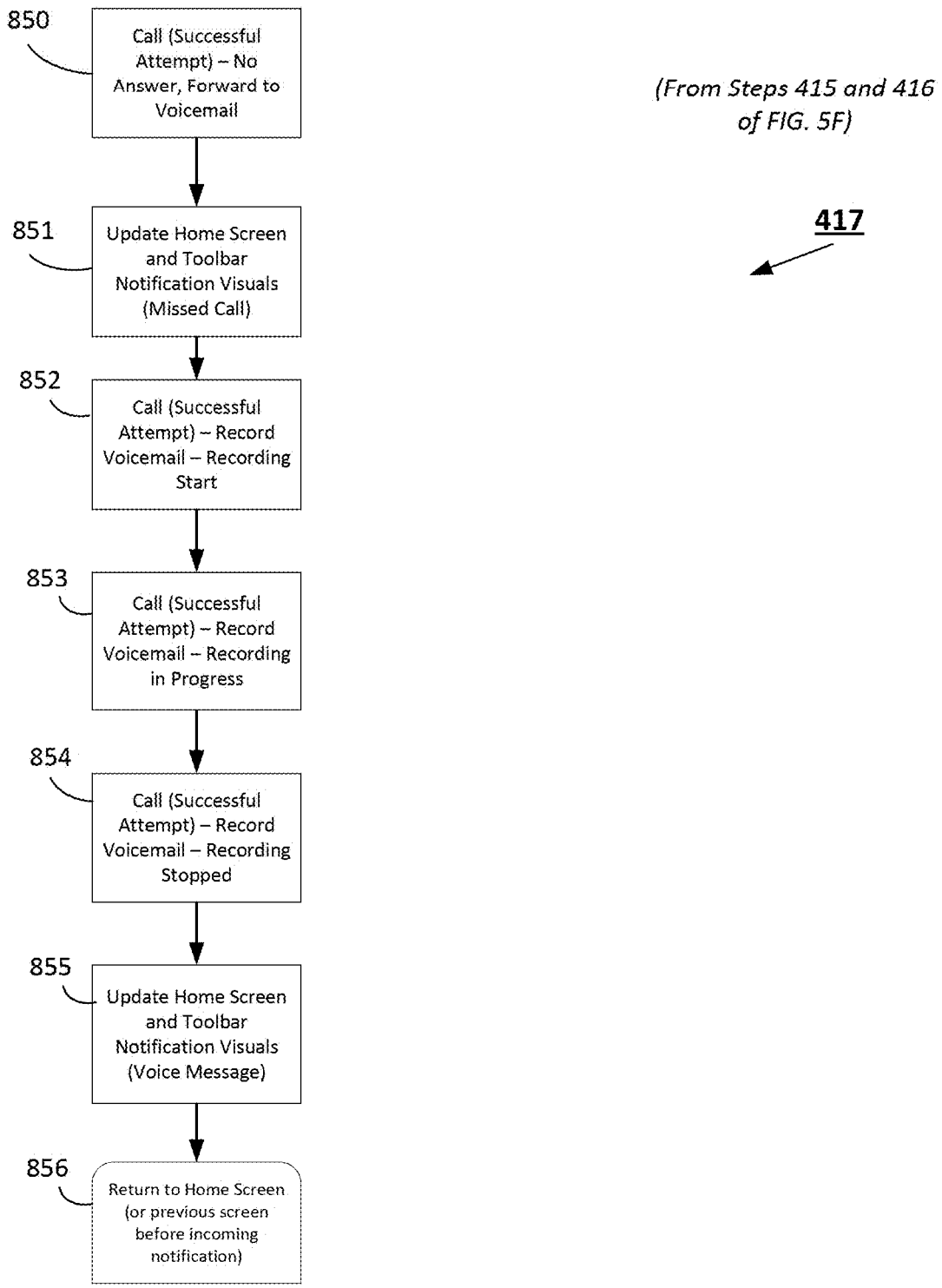
FIG. 5K is a flowchart of an exemplary voicemail process according to the present invention.

An exemplary voicemail sub-flow 417 is illustrated in FIG. 5K. As shown, the process begins at step 850 where there was no answer at the recipient phone and the calling phone is forwarded to voicemail. In step 851, the recipient phone will update the home screen and toolbar notification visuals/icons (to indicate the missed call). At step 852, the phone will start recording. While recording is in progress (step 853), the phone will determine whether the user has stopped the recording at step 854. A user can stop a recording before it runs its full duration by pressing the power button, the record voice button, the call phone button, or the send message button, for example. If the user has pressed a button to stop the recording, or once the recording has run its full duration, the phone will stop recording the voicemail at step 854. The recipient phone will update the home screen and toolbar notification visuals/icons (to indicate the voicemail) at step 855, and return to the previous screen or home screen at step 856. Referring to FIG. 5F, at step 416, if the call has not rung for eight seconds (No at step 416), the process returns to step 411.

Another exemplary process of the communication device is discussed. This exemplary process involves the use of the games button on the communication device. Users will have the ability to access and play various different games, including single-player games and two-player games. For example, three games are currently defined as: (1) emoji smash/emoji drop (single-player), (2) create-a-moji (single-player & two-player), and (3) emoji toss/emoji catch (two-player), which are each described in further detail below. To begin a game, a user presses the play games button 134. This presents the user with an opening splash screen for one of the available games, automatically starting that game. Additional games are displayed as small icons on the splash screen. Pressing the play games button while on this screen, or at any point during a game, will cycle to and present the next available game's splash screen; this allows a user to choose from all available games. Additionally, the default selection will cycle through all available games in a fixed sequence to ensure that users are presented with every game throughout play, even if they never actively change the default selected game. Repeated presses of this button will also cycle past all available games to end the game state and return to normal phone play. Playing a game to completion will also end this state. The roster of available games is dependent on the status of the recipient phone(s) on the network. A user cannot start a two-player game if their phone is the only recognized phone. If a user is on a live call when the play games button is pressed, the selection will always default to an available two-player game.

Figure 5L:
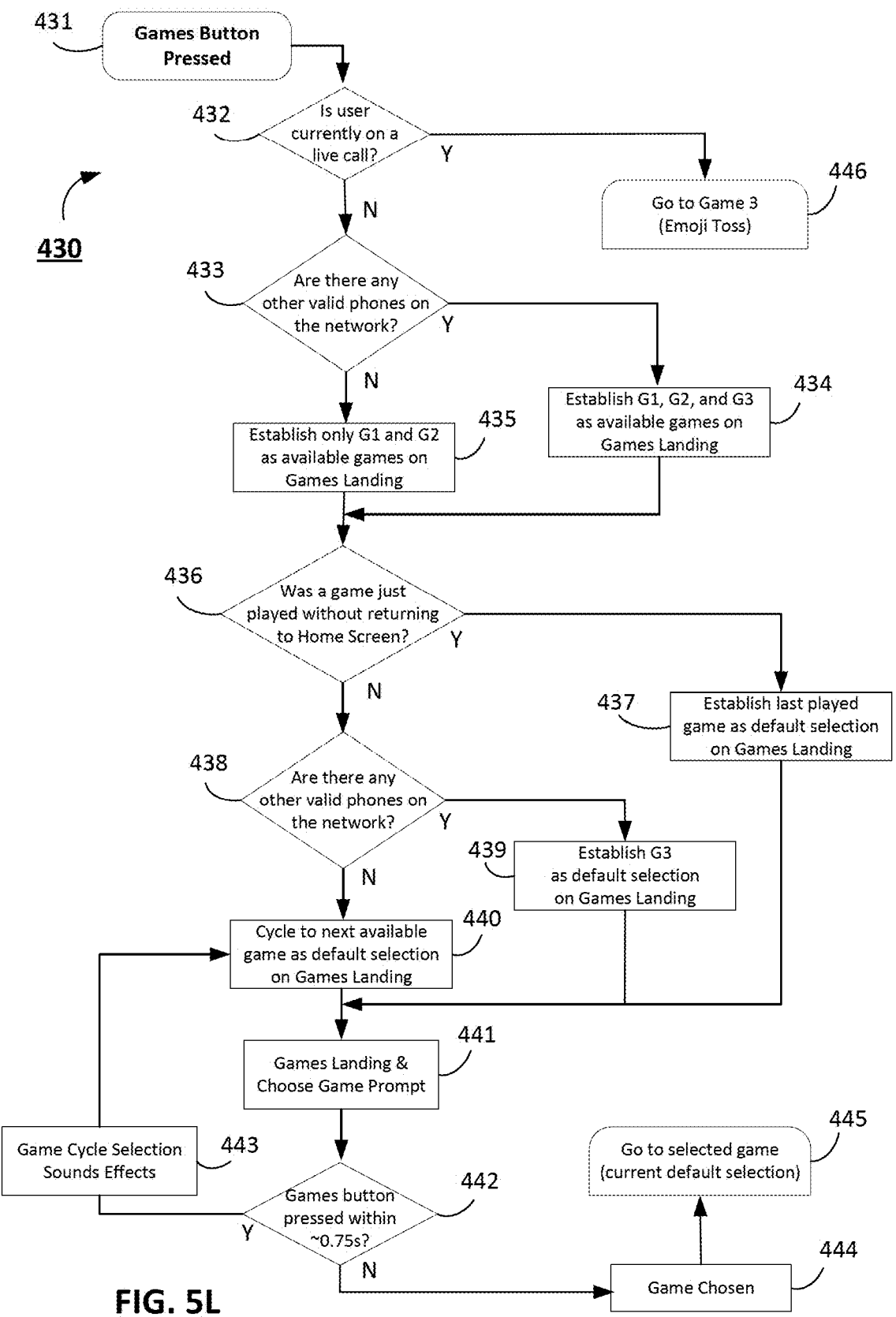
FIG. 5L is a flowchart of an exemplary games button process according to the present invention.

FIG. 5L shows a flow or process 430 of operations when a games button is pressed (step 431), according to an example embodiment. Users can access available games through the games button 134. Availability of optional 2-player gameplay (game 2—create-a-moji) and dedicated 2-player gameplay (game 3—emoji toss) is contingent upon the status of other phones on the network.

If the user is not currently on a live call when the games button is pressed (No at step 432), then a determination is made whether there are any other valid phones on the network at step 433. A valid recipient phone is any phone that is paired with the sending phone that is awake and within range. If there is another valid phone on the network (Yes at step 433), then the phone will establish game 1, game 2, and game 3 as available games in the games landing at step 434. If there are no other valid phones on the network (No at step 433), then the phone will establish only game 1 and game 2 as available games in the games landing at step 435.

In some example embodiments, if there was a game just played without returning to the home screen (Yes at step 436), the phone will establish the last played game as the default selection on the games landing at step 437. If no game was just played without returning to the home screen (No at step 436), the flow continues to step 438. In some example embodiments, if there is another valid phone on the network (Yes at step 438), the phone will establish game 3 as the default selection in the games landing (step 439). If there are no other valid phones on the network (No at step 438), the phone will cycle to the next available game as the default selection on the games landing at step 440. When no other valid phones are on the network, after the user has exited the games state and returned, the default game should cycle to the next in line to avoid the default being the same as the last game played.

At step 441, the phone will display the games landing and choose game prompt. If the user presses the games button within a short period of time (approximately 0.75 seconds) (Yes at step 442), the phone will play a game cycle selection sound effect at step 443, and loop back to cycle to the next available game in the games landing at step 440. If the user does not press the games button again within the short period of time (No at step 442), then the phone will determine the game chosen at step 444, and go to the selected game (current default selection) at step 445. In some example embodiments, when game 3 is selected at step 445, the recipient phone receives a game invite notification, in which case the sending phone may wait on this screen before proceeding to the game 3 intro at step 445.

Returning back to step 432, if the user is currently on a live call when the games button is pressed (Yes at step 432), then the phone will automatically go to game 3 (emoji toss) at step 446. In some example embodiments, pressing the games button during a call will proceed to launch game 3 (emoji toss) without interrupting the live call, if the phone enables this gameplay at the same time as talking. Otherwise, pressing the games button during a live call may interrupt the call in favor of game 3 if simultaneous operation is not enabled (in which case, the phone may optionally display a notification or confirmation request to end the call).

Next, the three example games mentioned above will each be described in further detail with reference to FIGS. 5M, 5N, and 5), respectively. These example embodiments of the games feature of the emoji phones are intended to be illustrative and non-limiting in nature. Different games and/or numbers of available games are also contemplated within the scope of the present disclosure. At any point during gameplay, pressing the games button again will return the user to the games landing.

Figure 5M:
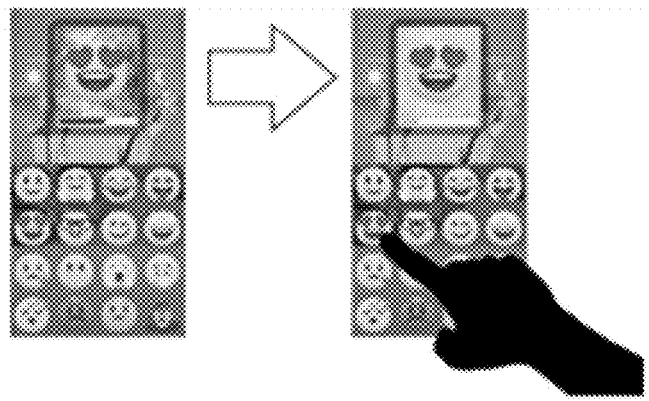
FIGS. 5M, 5N, and 5O are example representations of games that can be played on the communication devices according to the present invention.

Referring to FIG. 5M, game 1 (emoji smash/emoji drop) is a 1-player game that can only be accessed through the games button, and is always available regardless of how many other phones may be available on the network. Emojis appear one at a time onscreen, with a fast-moving, fuse-like countdown timer. user must quickly find and press the displayed emoji before the timer expires. The timer gets incrementally faster based on user performance.

In one embodiment, game 1 gameplay has four difficulty tiers that change based on user performance within each higher tier. For example, the music will change, emojis drop at a faster rate/speed, emoji variety increases, and/or more emojis are onscreen simultaneously (staggered drop times). The phone can tally and display scores and different celebration animations upon completion of gameplay.

In more detail, emojis are presented one at a time in a random order along with their familiar animations and sound effects. Each emoji is accompanied by a fuse-like visual timer, and a user must press the corresponding emoji button to match each displayed emoji before its timer expires. Users that match an emoji before the time runs out are presented with reward feedback and a new emoji to match. Users that don't match an emoji in time will receive error feedback (such as a "3 strikes" indication) and the game ends. The timer's speed can accelerate over time based on successful matches to increase the challenge. When the game ends, the user can receive a numerical score on a victory screen, with fancier versions for higher scoring players.

Figure 5N:
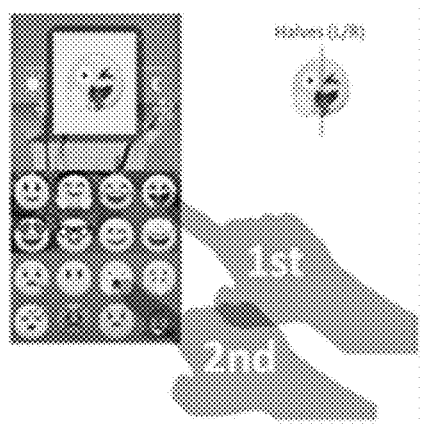

Referring to FIG. 5N, game 2 (create-a-moji) is a 1-player game that can be accessed through the games button, or a 2-player game that can be accessed when receiving a create-a-moji emoji message from another paired phone on the network. This game is unique in that it can be played either as a single player experience or sent between two phones to make it into a multi-player game experience. It will always be available regardless of how many other phones may be available on the network. A user presses the emoji buttons to "mix and match" emoji halves to create their own "Frankenstein"-like emojis. Created emojis can be sent to other phones on the network, allowing users to "hot potato" their creations back and forth as special emoji messages.

Game 2 gameplay begins with a blank emoji template, and includes some or all of the following features: a) each emoji press adds half its face to the template, alternating left and right sides; b) background graphics change every other emoji button press; c) randomly assigned sound effects with emoji animations play when idle; d) the send message button sends a create-a-moji emoji message; and/or e) opening a create-a-moji brings the recipient phone directly to game 2 gameplay. In some example embodiments, audio pool selections can be determined pseudo randomly for the sound effects, and may be unrelated to the onscreen emoji halves. Some variations may play once while others may play twice. Once the user is satisfied with the emoji creation and presses the send message button, the create-a-moji emoji is ready to be sent as an emoji message (including the different halves, animations, background and sound effects). Thus, after an emoji has been added to the creation during gameplay of game 2, pressing the send message button will attempt to send the creation to a recipient phone, and this is treated like sending an emoji message. Opening a create-a-moji emoji message will bypass the game's intro and load the recipient phone directly into its own instance of the create-a-moji game, using the received content as their starting template.

In more detail, a default (or random) emoji is displayed at the start of play to serve as the "mix and match" foundation. A user presses an emoji button to replace the left half of the displayed emoji with the pressed emoji, creating a "half and half" emoji. If the user presses the same emoji button again, the right half of the displayed emoji is also replaced with the pressed emoji, resulting in a fully replaced emoji. If the user presses a different emoji button, the left half of the displayed emoji is replaced with the pressed emoji, creating a different "half and half" emoji. When a user stops pressing buttons for a brief period (~2s), each half of the emoji will play its halved animation, and a random emoji animation sound effects will be paired with the creation. When a user is happy with the created emoji, they can press the send message button to send their work to another phone on the network. This message will be sent like any other emoji message. If no phone is available, they will receive an indicator that the message could not be sent and return to their place in the game. When a recipient phone's user receives the message, either immediately or from their mailbox, it behaves as if they opened the game, allowing them to edit that emoji in the same manner and send it back to the original sender, like a game of "hot potato" with their emoji creations.

Figure 5O:
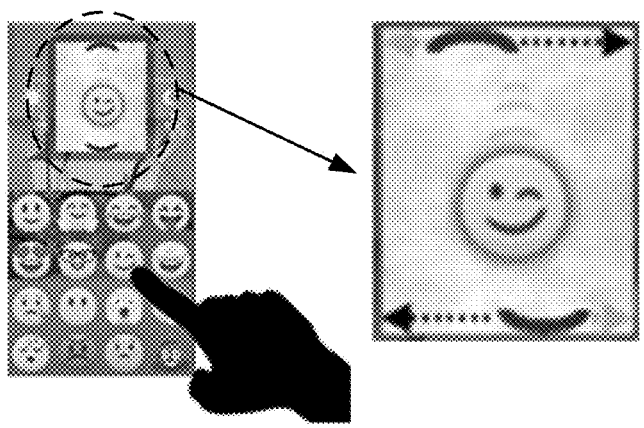

Referring to FIG. 5O, game 3 (emoji toss/emoji catch) is an exclusively 2-player game that can only be accessed through the games button, and can even be enabled during a live call. This game is only available if another phone is detected on the network. If no other phones are present on the network, game 3 is not selectable for play. Users pass an emoji back and forth across a play area, trying to catch it before it passes by them. To throw an emoji, a user presses any emoji button. To catch a thrown emoji, a user must press its matching emoji button. There are a few variations on how this could play, as discussed in further detail below.

Game 3 gameplay has two players "tossing" and "catching" emojis across the screen. Spin speed may be determined pseudo randomly. The player who sent the game invite serves first. In some example embodiments, the local player's side is always the bottom, and the remote player's side is always the top.

In more detail, the users take turns "throwing" and "catching" an emoji across a play area. The user holding the emoji in their "mitt" is the thrower and the other is the catcher. The throwing user presses any emoji buttons to throw that emoji to the other side. The pressed button determines the emoji that gets thrown, transforming the emoji in play as appropriate. The catching user must press the displayed emoji's corresponding button before it reaches the opposite side (or "mitt") to successfully catch it. If the user successfully catches the thrown emoji, that user becomes the thrower and the other user is now the catcher. If the user fails to catch the emoji before it passes their mitt, they miss (get a strike or game over, for example). Gameplay may benefit from variables like automated moving mitts (allowing users to be able to time their throws to increase the odds of missing) and shrinking mitts (making it harder to catch, possibly associated with misses) to scale up the challenge over time.

Separate from the games functionality, the communication device includes a flashlight function that is accessed by using the flashlight button. Upon a user pressing the flashlight button, the communication device determines whether the flashlight is on. If yes, then the device determines whether the flashlight is on the low brightness level. If yes, then the device turns the flashlight up to the medium brightness level. The device then determines whether any other button has been pressed. If yes, then the flashlight process is stopped and the device returns to the home screen and proceeds to the appropriate operation flow based on the particular button that was pressed. If no other button has been pressed, the device determines whether the flashlight button was pressed again.

Returning to the determination by the device if it is on the low level, if it is not, then the device determines whether it is on the medium level when the flashlight button was pressed. If yes, the device changes the brightness to the high brightness level. If the device is not on the medium level when the flashlight button is pressed, then the device determines whether it is on the high brightness level. If yes, then the flashlight is turned off. If no, then the device determines whether it has been turned off completely.

Figure 6A:
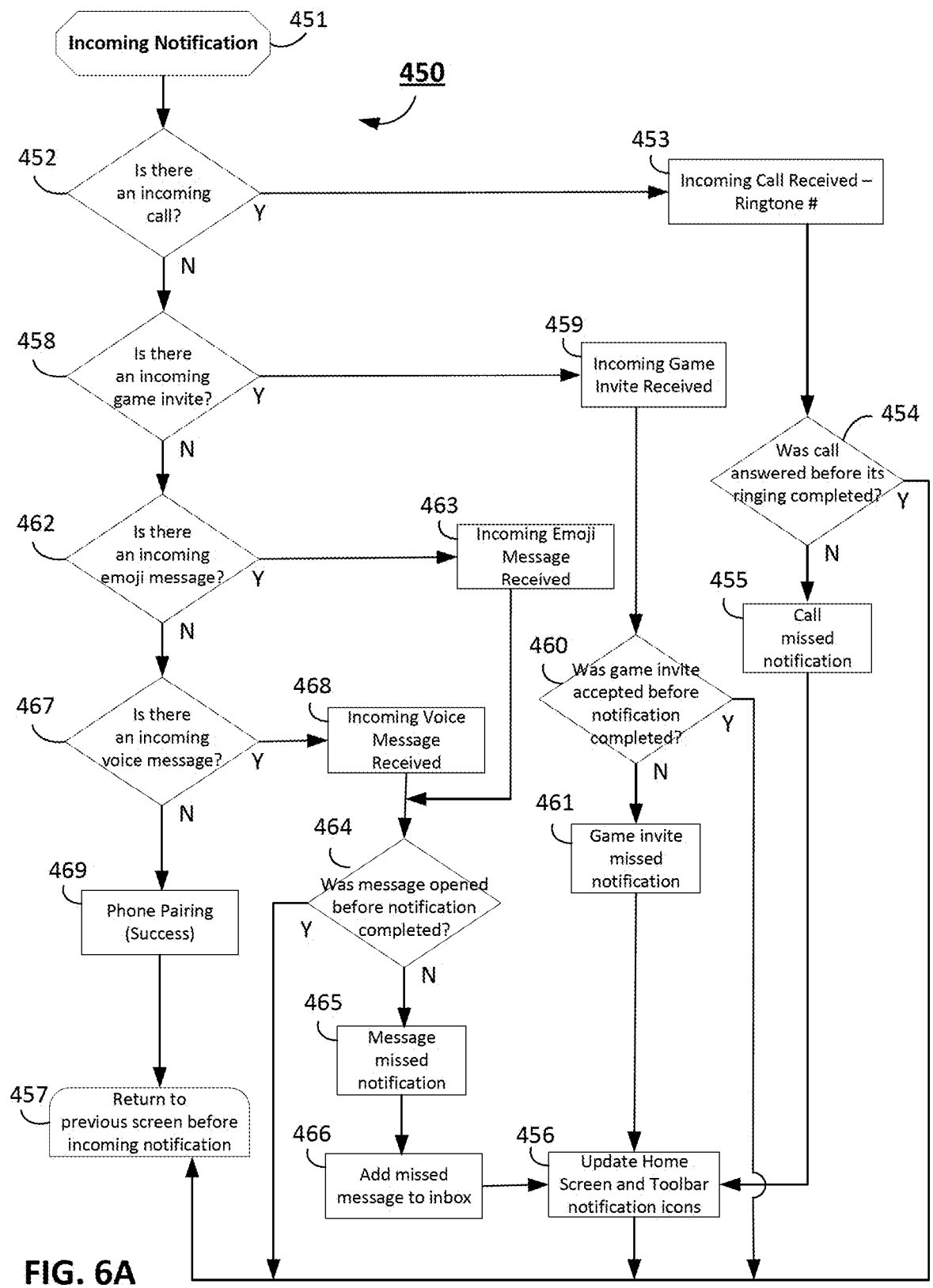
FIG. 6A is a flowchart of an exemplary remote input process according to the present invention.

Next, various functionality when a phone is the recipient phone will be described with reference to FIGS. 6A and 6B. Referring to FIG. 6A, an exemplary embodiment of a remote input flow for incoming notifications is illustrated. Referenced in example embodiments herein, the screen will display a variety of statuses, alerts and notifications about things like calls and messages as needed. They will have audio and graphics with animations as appropriate, and some will provide visual instructions (ex. make sure both phones are powered on and near one another), but no text or speech. These indicators will be presented as "full screen" displays and/or on the phone's toolbar 114 based on their nature (e.g., a full screen notification for a currently incoming call vs. a toolbar icon showing that there are messages sitting in the inbox).

Full screen notifications will be transient (up to a few seconds) while more persistent notifications will reside on the toolbar, allowing them to share the space onscreen during standard phone use. Sometimes a notification will begin full screen and then migrate to the toolbar (e.g., incoming message received message, or incoming call missed call). When the toolbar 114 and its notifications are not needed or relevant, they will be hidden to free up screen space, such as when the user is playing a game.

FIG. 6A shows a flow 450 of operations associated with remote input and incoming notifications when a recipient phone receives an incoming emoji message, voice message, call or game invite, according to an example embodiment.

If the remote input corresponding to the incoming notification 451 is an incoming call (Yes at step 452), the recipient phone will display an "incoming call received" notification at step 453. Incoming calls use the ringtone assigned to the recipient phone. If the user of the recipient phone answers the incoming call before its ringing completed (Yes at step 454), the call is connected and the recipient phone will return to the previous screen before receiving the incoming notification at step 457. If the user of the recipient phone does not answer the incoming call by the time its ringing completed (No at 454), then the recipient phone will display an incoming call missed notification at step 455. The recipient phone will also update the home screen and toolbar notification visuals/icons as step 456.

If the remote input corresponding to the incoming notification is not a call (No at step 452) and is an incoming game invite (Yes at step 458), the recipient phone will display an "incoming game invite received" notification at step 459. If the user of the recipient phone accepts the incoming game invite before this notification completed (Yes at step 460), the game is launched. If the user of the recipient phone does not accept the incoming game invite when this notification has completed (No at step 460), then the recipient phone will display an incoming game invite missed notification at step 461. The recipient phone will also update the home screen and toolbar notification visuals/icons at step 456.

Returning to step 458, if the incoming invite is not a game (No at step 458), and if the remote input corresponding to the incoming notification is an incoming emoji message (Yes at step 462), the recipient phone will display an "incoming emoji message received" notification at step 463. If the user of the recipient phone opens the emoji message before this notification has completed (Yes at step 464), the recipient phone will display the emoji message. If the user of the recipient phone has not opened the emoji message when this notification has completed (No at step 464), the recipient phone will display an incoming emoji message missed notification at step 465, and add the missed emoji message to the corresponding inbox at step 466. The recipient phone will then also update the home screen and toolbar notification visuals/icons at step 456.

Returning to step 462, if the incoming message is not an emoji message (no at step 462), the phone goes to step 467. If the remote input corresponding to the incoming notification is an incoming voice message (Yes at step 467), the recipient phone will display an "incoming voice message received" notification at step 468. If the user of the recipient phone opens the voice message before this notification has completed (Yes at step 464), the recipient phone will play the voice message. If the user of the recipient phone has not opened the voice message when this notification has completed (No at step 464), the recipient phone will display an incoming voice message missed notification at step 465, and add the missed voice message to the corresponding inbox at step 466. The recipient phone will then also update the home screen and toolbar notification visuals/icons at step 456.

Otherwise, in an example embodiment, a No at step 467 leads to step 469 where the remote input corresponding to the incoming notification may relate to phone pairing, in which case the phone will display a phone pairing (success) notification, and then return to the previous screen before the incoming notification at step 457. This last option for remote input notification appears if phones on its network are paired while this phone is active, pairing this phone as well, even if the phone was not actively attempting to pair.

Figure 6B:
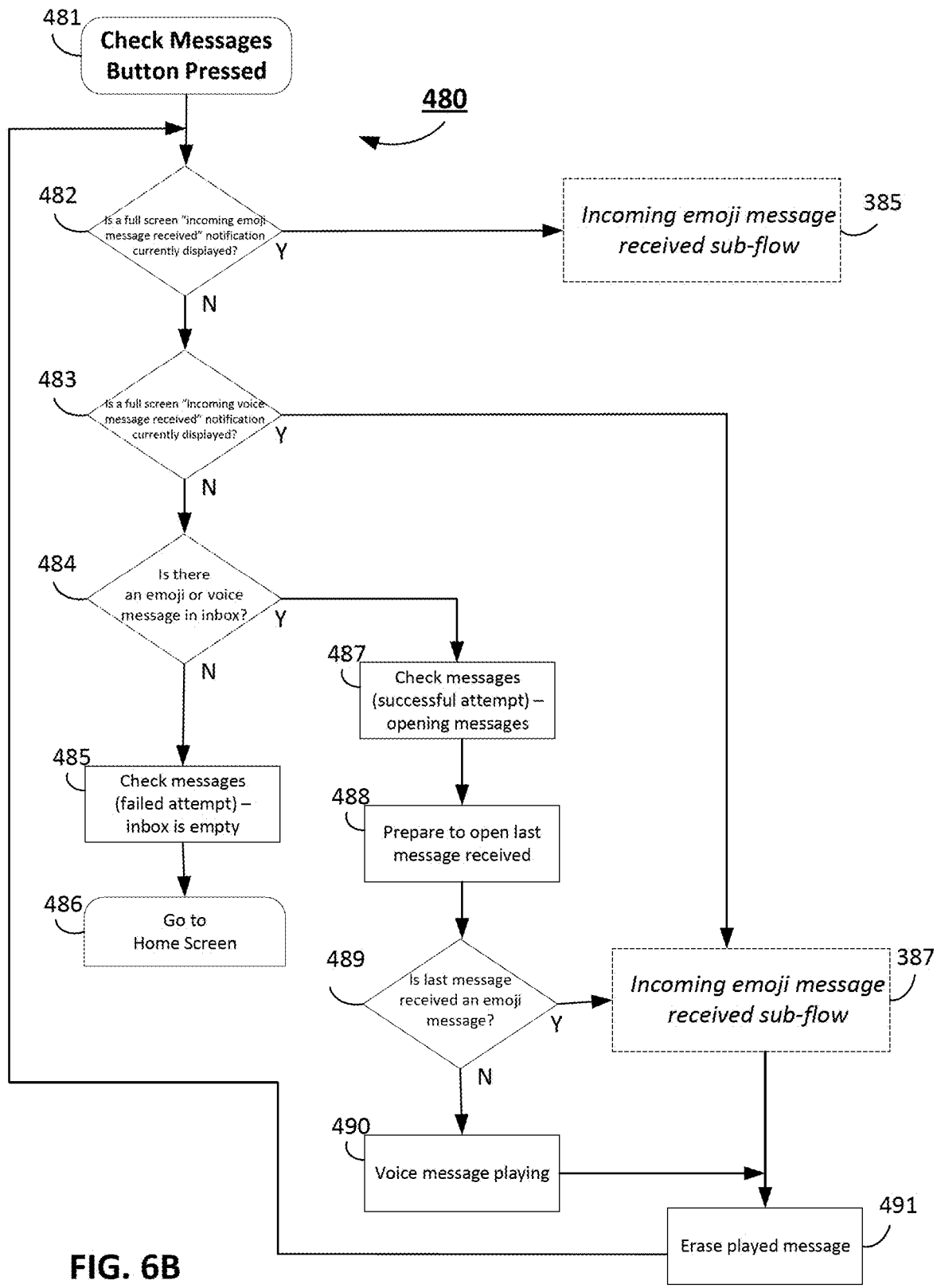
FIG. 6B is a flowchart of an exemplary check messages button process according to the present invention.

Another exemplary process of the communication device or phone is discussed relative to FIG. 6B. This exemplary process involves the operation of the phone upon actuation of the check messages button. When an emoji message is delivered, a full screen display will prompt the user to press the check messages button 138 to immediately receive the incoming message. If the user does not, the emoji message's notification icon will be displayed on their toolbar to notify them of its presence. When the user is ready, the user may access delivered messages by pressing this button. If users have multiple messages in their inbox, they are retrieved one at a time, with each subsequent press of the receive messages button. When the user receives an emoji message, the series of emojis that were sent are displayed in sequence along with their animations and sound effects, duplicating the sequence that was displayed on the sending phone's screen when the message was sent. After an emoji message is received, whether accepted immediately or pulled from the inbox, it is automatically deleted; once seen, emoji messages are not stored for future viewing.

Similarly, when a voice message is delivered, a full screen display will prompt the user to press the check messages button 138 to immediately receive the incoming message. If the user does not, the voice message's notification icon will be displayed on their toolbar to notify them of its presence. When they're ready, they may access delivered messages by pressing this button. If users have multiple messages in their inbox, they are retrieved one at a time, with each subsequent press of the receive messages button. (It is worth noting that the system does not care if the messages are emoji messages or voice messages, and will play them in the order they were received, one message per press). When the user receives a voice message, the phone will display a full screen metered visual as the message plays, duplicating the visual displayed on the sending phone's screen when the message was sent. After a voice message is received, whether accepted immediately or pulled from the inbox, it is automatically deleted; once heard, voice messages are not stored for future listening.

FIG. 6B shows a flow 480 of operations when a check messages button is pressed, and receiving remote input (e.g., incoming messages) according to an example embodiment. Users can attempt to open any emoji messages, voice messages or voicemail in their inbox through the check messages button 138. In some example embodiments, message types are treated in the same manner and are opened in reverse chronological order.

When the user presses the check messages button at step 481, the phone will determine if a full screen "incoming emoji message received" notification is currently displayed at step 482. If so (Yes at step 482), the phone will proceed with the incoming emoji message received sub-flow 385 (see FIG. 5H).

If a full screen "incoming emoji message received" notification is not currently displayed (No at step 482), the phone will determine if a full screen "incoming voice message received" notification is currently displayed at step 483. If so (Yes at step 483), the phone will proceed to an incoming voice message received sub-flow 387. In one embodiment of sub-flow 387, the phone will receive the incoming voice message, and play the received voice message. Once the voice message has finished playing, the phone will return to the previous screen before the "incoming voice message received" notification.

Otherwise, if there is no full screen incoming emoji or voice message received notification currently displayed (No at step 483), then the phone will determine whether there is currently an emoji message or a voice message (or voicemail left from a missed call) in the corresponding inbox of the phone at step 484. If not (No at step 484), this will be considered a check messages failed attempt (because the phone's inbox is currently empty), and the phone may also display a "check messages (failed attempt)—inbox is empty" notification at step 485, and will return to the home screen at step 486.

If there is currently an emoji message and/or voice message in the corresponding inbox of the phone (Yes at step 484), the phone will begin opening the emoji message or voice message at step 487. In some example embodiments, the phone will prepare to open the last message received at step 488. In this case, messages are opened in reverse chronological order, and are not organized by type. At step 489, the phone will determine if the last message received is an emoji message. If not (No at step 489), then the last received message is a voice message (or a voicemail) in this case, and the phone will play the voice message or voicemail at step 490. The phone will then erase the played voice message or voicemail at step 491, and return to step 482 to repeat the process for the next message in reverse chronological order (until the phone's inbox is empty (No at step 484)). If the last received message is an emoji message (Yes at step 489), then the phone will proceed to an incoming emoji message received sub-flow 387, either the same as or similar to that described herein.

Figure 7A:
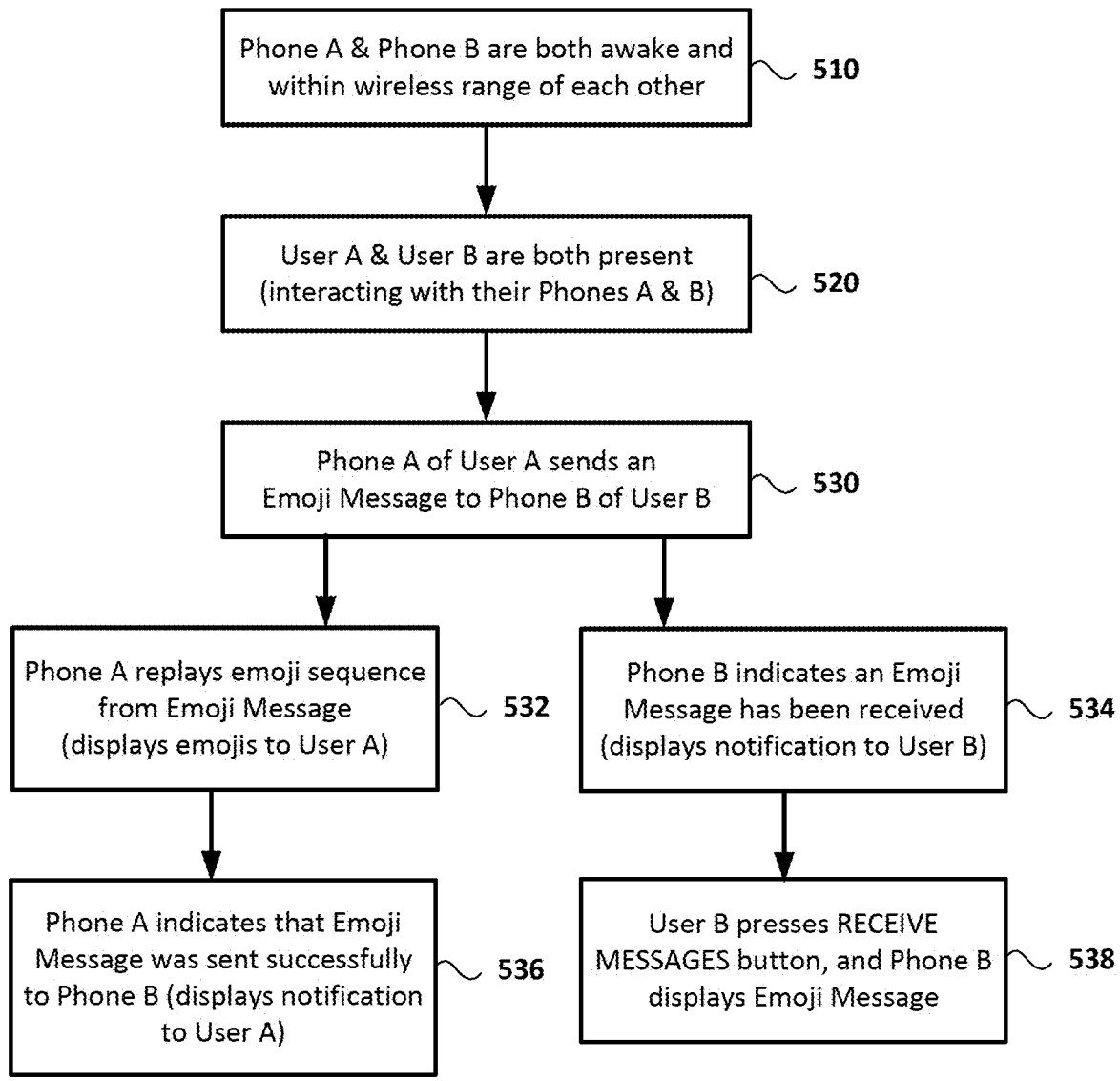
FIGS. 7A, 7B, and 7C are flowcharts forming an example of a remote interaction process according to the present invention.
Figure 7B:
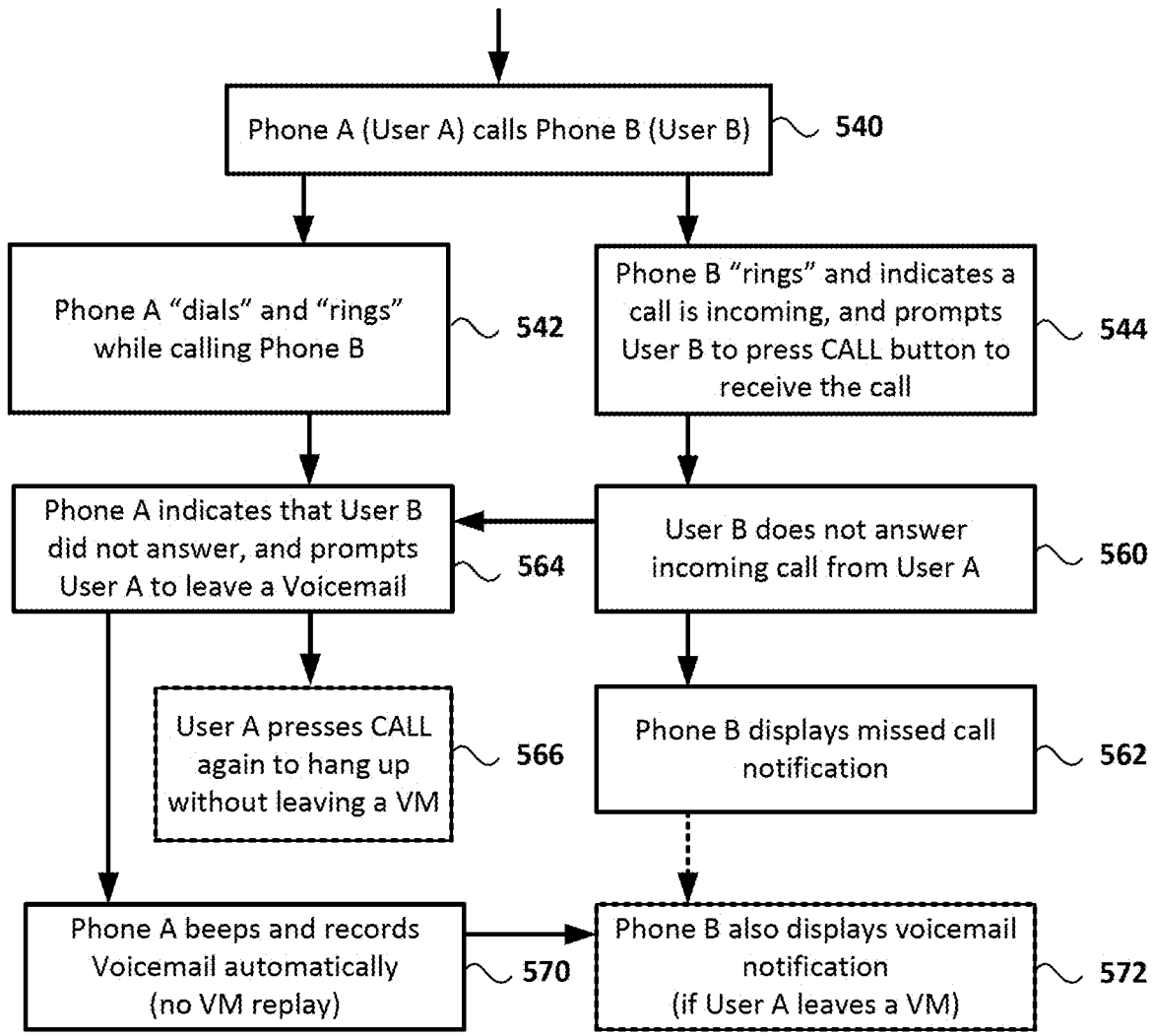
Figure 7C:
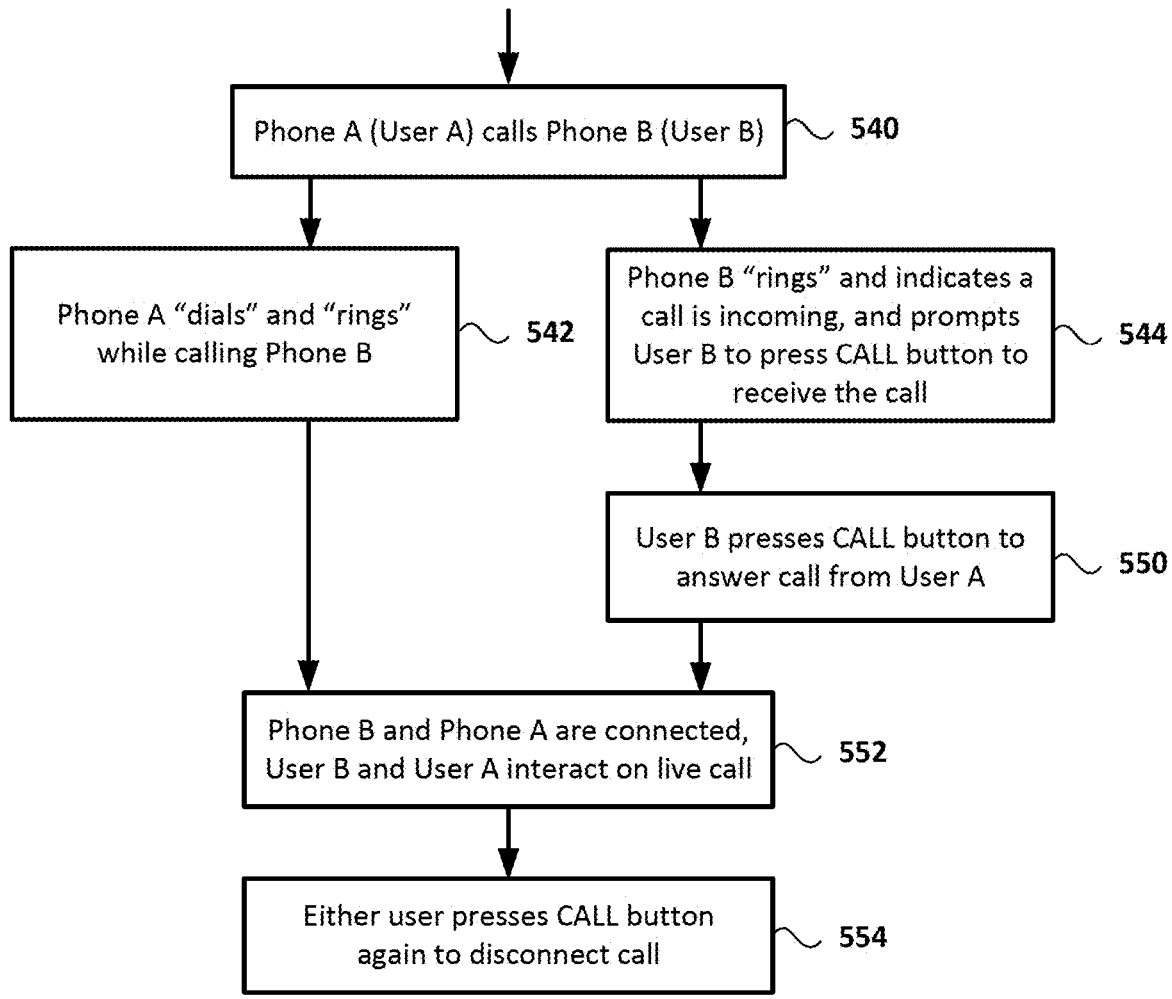

Turning to FIGS. 7A-7C, several examples of remote interaction flows or processes for the communication devices are illustrated. The following examples for remote interactions relate to phone logistics, including but not limited to sending and receiving emoji and voice messages. Referring to FIG. 7A, in this example, the flow 500A involves both phones A and B being awake, and both users being present. In other words, phones A and B are both awake and within operating range of one another (step 510). In step 520, users A and B are both present and are interacting with their respective phones A and B. In step 530, user A of phone A sends an emoji message to phone B of user B. From user A's and phone A's perspective, phone A replays the message's emoji sequence by displaying the emoji to user A in step 532. In step 536, phone A indicates that the emoji message was successfully sent to phone B. In this embodiment, such indication involves phone A displaying a notification to user A.

At approximately the same time, in step 534, phone B indicates that an emoji message was received by displaying an appropriate notification to user B. In Step 538, user B can press the receive messages button on phone B to see the emoji message.

Referring to FIG. 7B, a continued operation sub-flow 500B for phones A and B is illustrated. This flow 500B is a flow that is an option from step 520 of FIG. 7A. While FIG. 7A relates to an emoji message, this sub-flow 500B relates to a call between phones A and B.

At step 540, user A uses phone A to call user B of phone B. At step 542, phone A "dials" and "rings" as it calls phone B. Simultaneously, phone B "rings" and indicates that a call is incoming at step 544. In addition, phone B prompts its user to receive the call by displaying an image of the call button.

If user B does not use phone B to answer the incoming call at step 560, after several rings phone B will display a missed call notification at step 562. At this point in step 564, phone A indicates that user B did not answer, and prompts user A to leave a voicemail message and user A is allowed to leave a voicemail. Voicemail is like sending a voice message but with fewer steps. At step 570, phone A beeps, records a voicemail message automatically, and doesn't replay it. Alternatively, user A can press the call button again on phone A to hang up without leaving a voice message at step 566. If user A leaves a voicemail message, phone B will display a voicemail notification at step 572.

Referring to FIG. 7C, an alternative sub-flow is illustrated. In this sub-flow 500C, which is based off of step 520 of FIG. 7A, user A is calling user B's phone at step 520. Steps 542 and 544 are the same steps 542 and 544 illustrated in FIG. 7B, respectively. In this sub-flow 500C, user B presses the call button on phone B to answer the call from user A in step 550. This action places both users on a live call at step 552. A live call can be considered to be a local input to avoid either of the phones falling asleep while a user is engaged with it. Either user can disconnect from a call by pressing the call button on that user's phone (step 554).

Figure 8A:
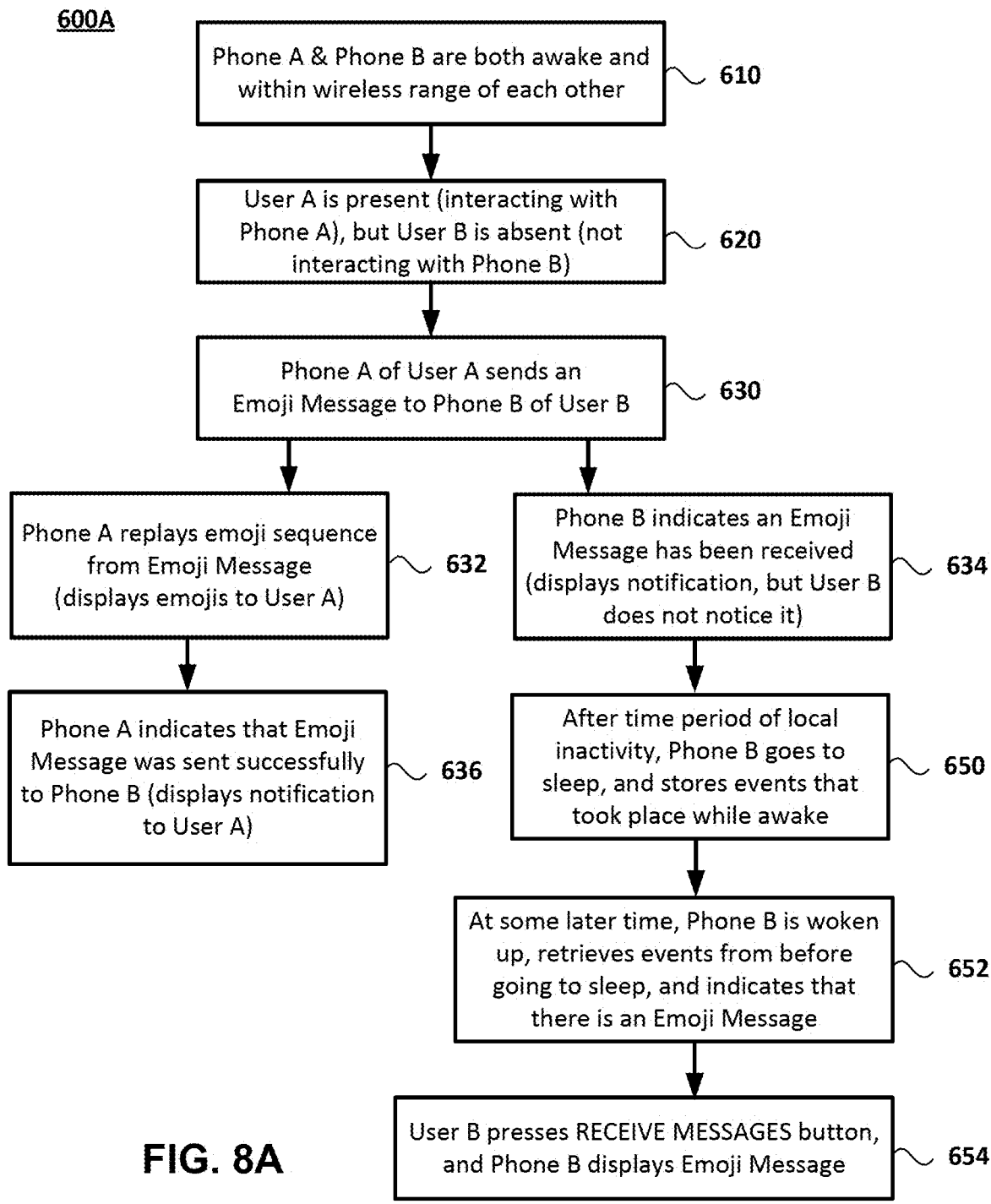
FIGS. 8A and 8B are flowcharts forming an example of another remote interaction process according to the present invention.
Figure 8B:
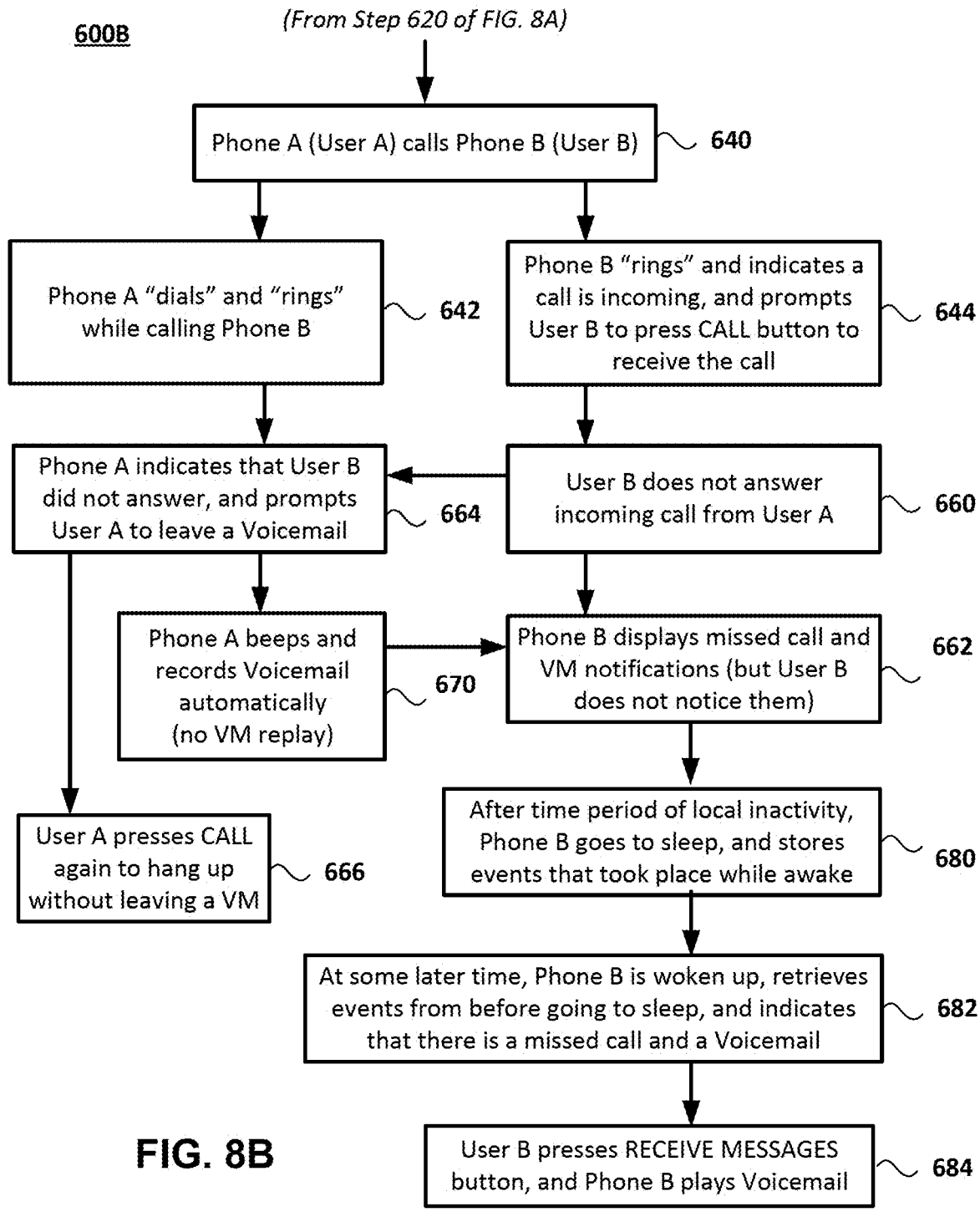

Turning to FIGS. 8A and 8B, an exemplary remote interaction flow or process for the communication devices is illustrated. Referring to FIG. 8A, in this example, the flow 600A involves both phones A and B being awake and within operating range of one another (step 610). In step 620, user A is present and interacting with user A's phone A. However, user B is absent from user B's phone and in other words, is not interacting with phone B.

In step 630, user A utilizes phone A to send an emoji message to user B via phone B. On phone A, the message's emoji sequence is replayed by being displayed to user A in step 632. At step 636, phone A indicates that the emoji message was sent successfully to phone B. This indication is in the form of a displayed notification on phone A to user A.

Turning to phone B, at step 634 phone B indicates that an emoji message was received by displaying an appropriate notification on phone B. However, user B doesn't notice the indication. After a certain time period of local inactivity, phone B goes to sleep at step 650 and stores events that took place while phone B was awake. At step 652, at some point later in time, phone B is woken up at which point phone B retrieves events from before it went to sleep. In particular, phone B indicates that there is an emoji message. At step 654, user B presses the receive messages button on phone B, which results in phone B displaying the received emoji message.

Referring to FIG. 8B, a sub-flow or process 600B that stems from step 620 in FIG. 8A is illustrated. In this flow 600B from step 620, user A utilizes phone A to call user B on phone B at step 640. At step 642 phone A "dials" and "rings" as it calls phone B. Simultaneously, phone B "rings" and indicates that a call is incoming, prompting user B to receive it by displaying an image of the call button on phone B (step 644). However, in this flow 600B, user B doesn't notice the image (step 660). After several rings, phone B displays a missed call notification at step 662. Phone A displays a notification that phone B did not answer the call and prompts user A to leave a voicemail (step 664). Voicemail is like sending a voice message but with fewer steps. Phone A beeps, records the voicemail message automatically, and doesn't replay it (step 670). Alternatively, user A can press the call button on phone A to hang up the call without leaving a voice message (step 666). Referring to back to phone B, at step 662 phone B displays a voicemail message notification.

At step 680, after five minutes of local inactivity, phone B goes to sleep and stores events that occurred while phone B was still awake. A while later, phone B is woken up (step 682). Phone B retrieves the events that took place when it was awake. At step 682, phone B indicates that there is one or more of an emoji message, a voice message, and/or a missed call. Phone B's user can access the stored messages by pressing the receive messages button at step 684. The user retrieves each message individually by pressing the receive messages button to hear or see each one. Messages are retrieved in the order they were received. Messages are stored until they are accessed and are then erased automatically.

Figure 9A:
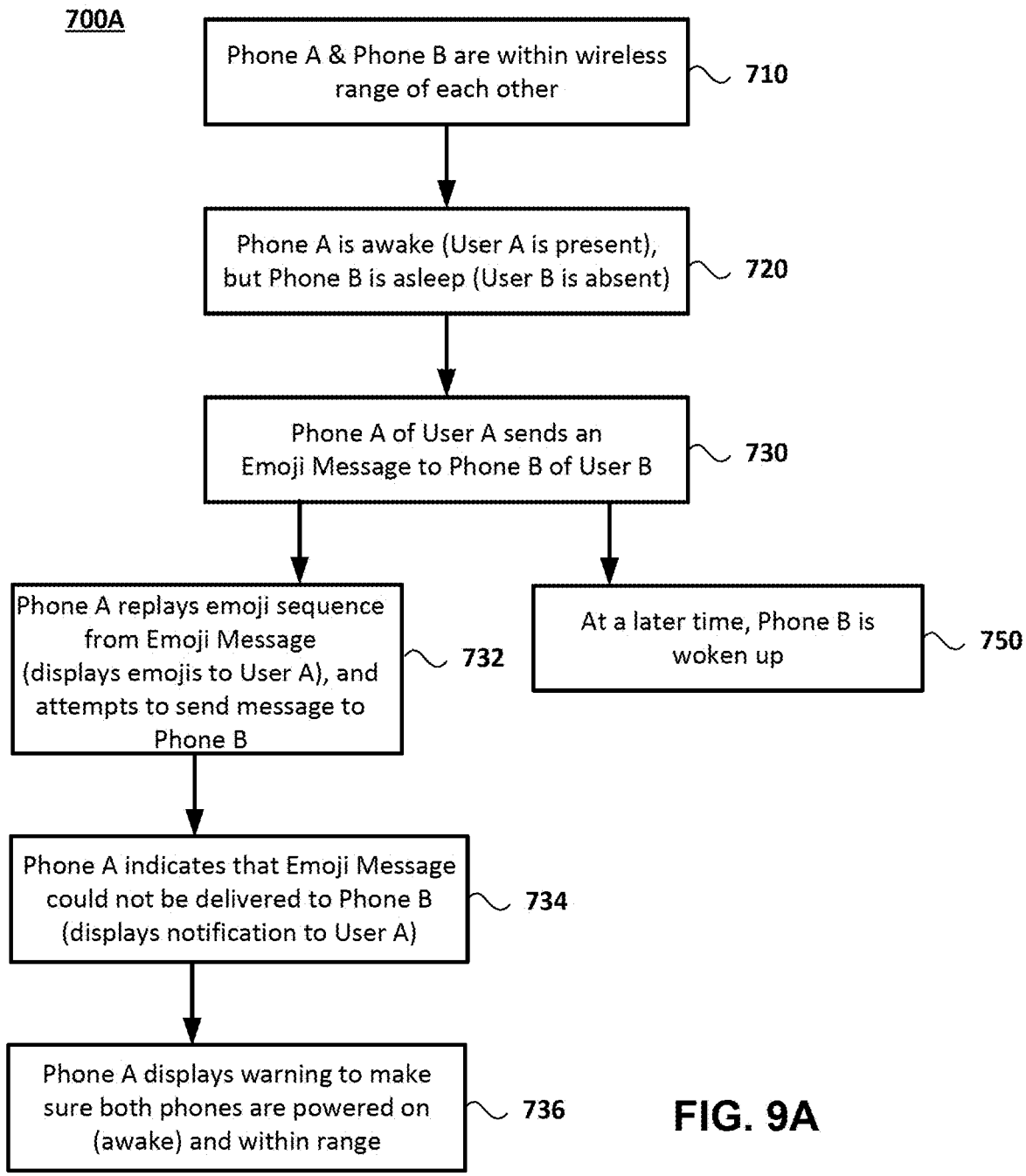
FIGS. 9A and 9B are flowcharts forming an example of another remote interaction process according to the present invention.
Figure 9B:
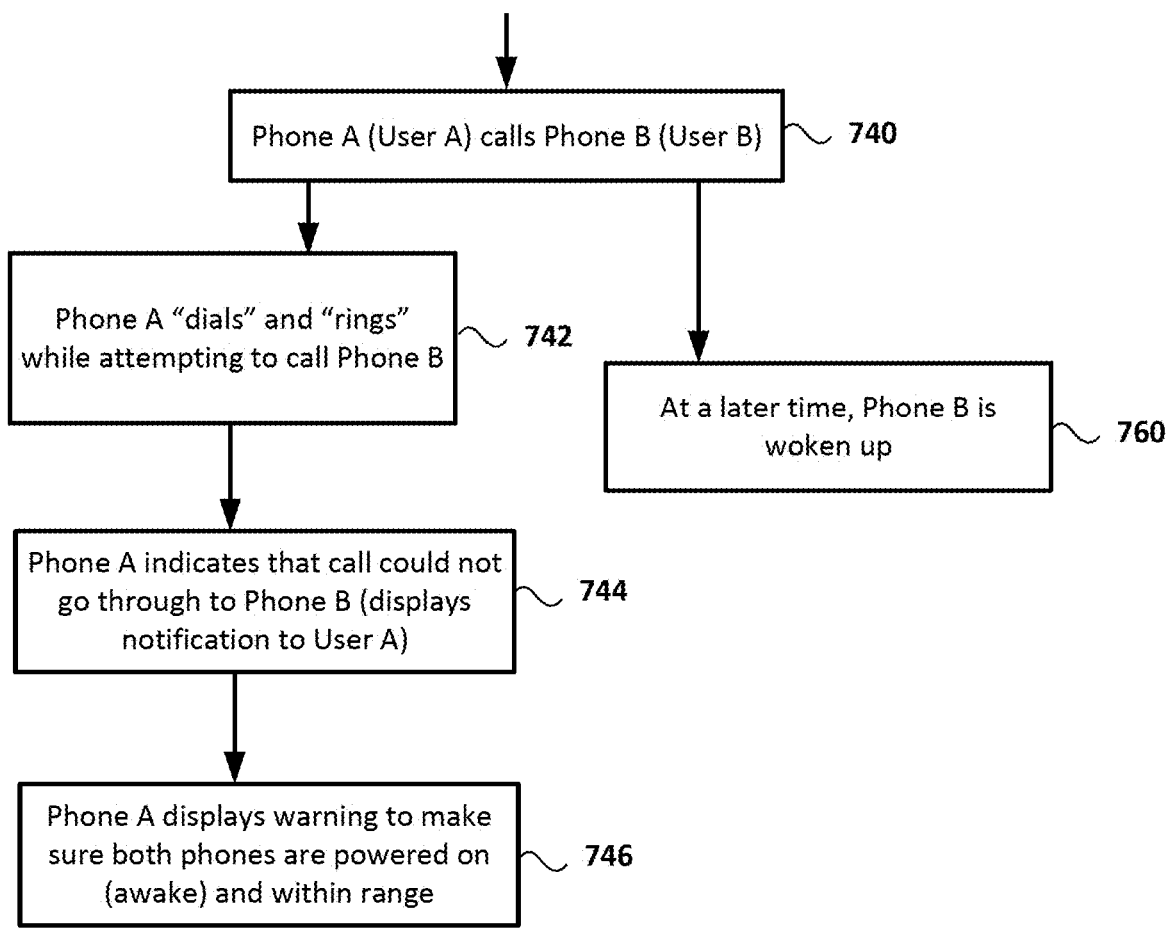

Turning to FIGS. 9A and 9B, an exemplary flow or process for the communication devices is illustrated. Referring to FIG. 9A, in this example, the flow 700A involves both phone A being awake and phone B being asleep. At step 710, phone A and phone B are within wireless range of each other. Phone A is awake and user A is present and using phone A (step 720). In addition, phone B is asleep and user B is absent.

At step 730, user A utilizes phone A to send an emoji message to phone B. At step 732, phone A replays the message's emoji sequence by displaying it on phone A for user A to see. Phone A attempts to send the emoji message. However, at step 734 phone A indicates that the emoji message could not be delivered. At step 736, phone A displays a prompt indicating that user A should make sure both phones are powered on and within range of one another. Phone B never receives the message or any notifications since it was asleep when the message was sent. Thus, when phone B is woken up at a later time in step 750, there are no prior activities stored.

Turning to FIG. 9B, a sub-flow or process 700B that stems from step 720 in FIG. 9A is illustrated. In flow 700B, user A utilizes phone A to call Phone B in step 740. In step 742, phone A "dials" and "rings" as it attempts to call phone B. When phone B does not answer the call, phone A indicates that the call could not go through (step 744). This indication takes the form of a displayed notification to user A on phone A. In addition, in step 746, phone A displays a prompt indicating that user A should make sure both phones are powered on and within range of one another. Phone B never receives the call or any notifications of the missed call since it was asleep when the call was made.

A while later, Phone B is woken up (step 760). Phone B does not know about any of the events that took place while it was asleep, and it does not indicate anything about the missed events or messages.

Figure 10:
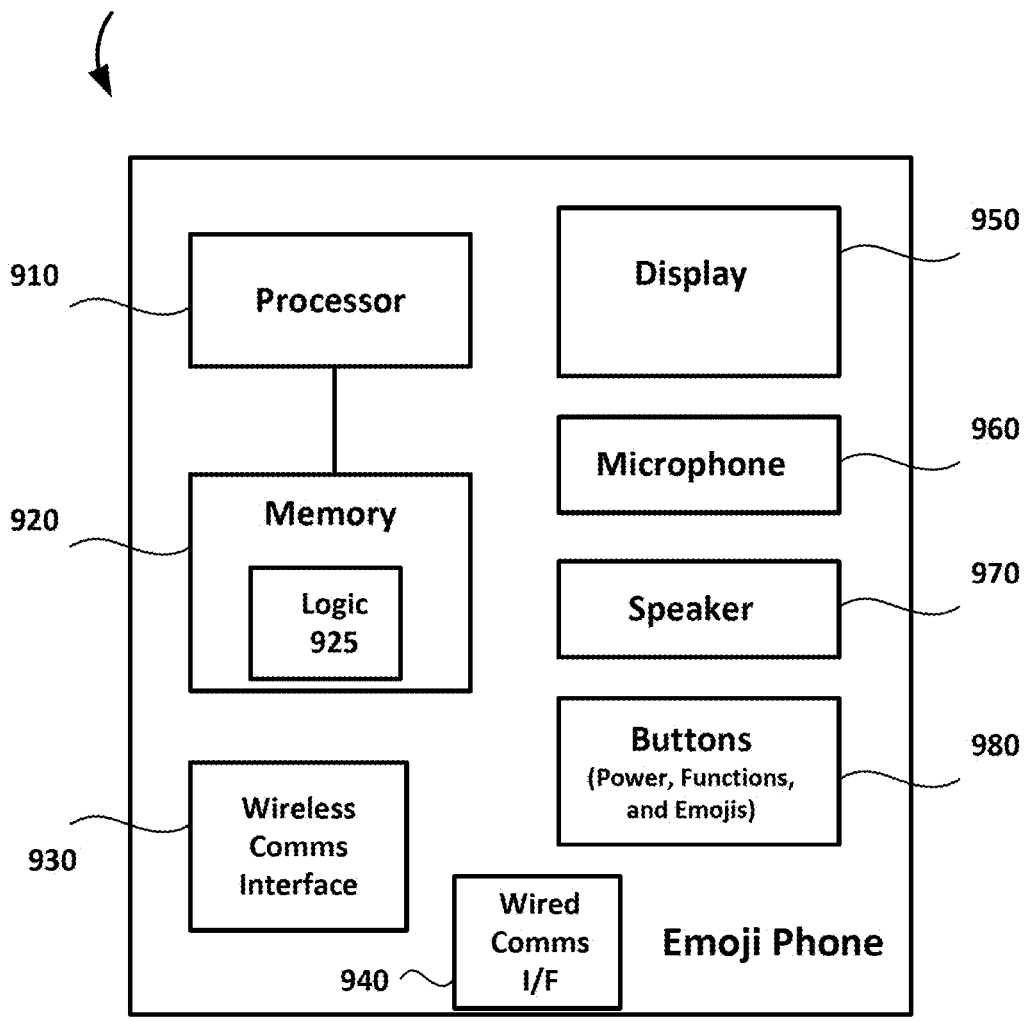
FIG. 10 is a block diagram illustrating various example components of an electronic device for implementing the emoji phones of FIGS. 1 and 1A-1C.

FIG. 10 is a block diagram illustrating various example components of an electronic device for implementing the emoji phones 10A, 10B of FIG. 1. Each of the phones 10A, 10B includes a processor 910, a memory 920 with logic 925, a wireless communications interface 930, a wired communications interface 940, a display 950, a microphone 960, a speaker 970, and buttons 980 (e.g., the power button, functional buttons relating to calling and messaging, and a set of emoji buttons).

In different embodiments of the invention, the communication processes can vary. In one embodiment, the first and second devices are configured to play voice messages and display emoji messages, one at a time and in an order in which the messages are received, in response to each press of the receive messages button. In another embodiment, voice messages and emoji messages are automatically deleted after the user plays the voice messages and views the emoji messages by pressing the receive messages button. In yet another embodiment, pressing the call phone button or the send message button on the first device or the second device automatically calls the other paired device of the second device or the first device or sends the other paired device of the second device or the first device a current voice message or emoji message, without requiring any user input to select a specific recipient device or user.

In an alternative embodiment, both a transmitting device and a receiving device of the first and second devices must be awake and within a predetermined range to send and receive voice calls, voice messages, and emoji messages between the first and second devices. In one embodiment, each of the first and second devices is configured to turn off the first and second wireless communications interfaces and enter a sleep state after the first or second device is inactive (does not receive any local input) for a threshold period of time, such that the first and second devices can no longer receive and track voice calls, voice messages, and emoji messages while in the sleep state. In another embodiment, each of the first and second devices is configured to turn on the first and second wireless communications interfaces and enter a wake state in response to receiving a user input, such that the first and second devices can once again receive and track voice calls, voice messages, and emoji messages while in the wake state.

Like numbers refer to like elements throughout. The terminology used herein is for the purpose of describing particular embodiments only and is not intended to be limiting of the invention. Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein. Well-known functions or constructions may not be described in detail for brevity and/or clarity.

As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. As used herein, phrases such as "between X and Y" and "between about X and Y" should be interpreted to include X and Y. As used herein, phrases such as "between about X and Y" mean "between about X and about Y." As used herein, phrases such as "from about X to Y" mean "from about X to about Y."

Spatially relative terms, such as "under", "below", "lower", "over", "upper", "lateral", "left", "right" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is inverted, elements described as "under" or "beneath" other elements or features would then be oriented "over" the other elements or features. The device may be otherwise oriented (rotated 90 degrees or at other orientations) and the descriptors of relative spatial relationships used herein interpreted accordingly.

It will also be understood that, as used herein, the terms "example," "exemplary," and derivatives thereof are intended to refer to non-limiting examples and/or variants embodiments discussed herein, and are not intended to indicate preference for one or more embodiments discussed herein compared to one or more other embodiments.

The term "comprising" which is synonymous with "including," "containing," or "characterized by," is inclusive or open-ended and does not exclude additional, unrecited elements or method steps. The term "consisting essentially of" limits the scope of a claim to the specified materials or steps "and those that do not materially affect the basic and novel characteristic(s)" of the claimed invention. The term "consisting of" as used herein, excludes any element, step, or ingredient not specified in the claim.

The invention being thus described, it will be apparent that the same may be varied in many ways. Such variations are not to be regarded as a departure from the spirit and scope of the invention, and all such modifications as would be obvious to one skilled in the art are to be included within the scope of the following claims.

What is claimed is:

1. A communication system comprising:
   a first communication device including a first display configured to display a first user interface, and a first wireless communications interface; and
   a second communication device including a second display configured to display a second user interface, and a second wireless communications interface,
   wherein the first communication device and the second communication device are pairable to allow the first communication device and the second communication device to communicate over a short-range wireless network via the first and second wireless communications interfaces, and each of the first and second user interfaces includes a plurality of emoji buttons associated with building emoji-based messages and playing emoji-based games,
   wherein when the first communication device and the second communication device are both powered on/awake and within a threshold distance from each other, and a first user of the first communication device and a second user of the second communication device are both present/currently active:
   the first communication device transmits an emoji message to the second communication device, displays a sequence of animated emojis from the emoji message in the first user interface on the first display, and displays a notification indicating that the emoji message was delivered successfully to the second communication device; and
   the second communication device receives the emoji message from the first communication device, and displays a prompt indicating that the second user can view the received emoji message in the second user interface on the second display.

2. The communication system of claim 1, wherein the short-range wireless network is a closed access network in which the first communication device and the second communication device can communicate only with each other and cannot communicate with any non-paired external devices.

3. The communication system of claim 1, wherein each of the first and second user interfaces has function buttons that include:
   a call button that is selectable to send and receive live two-way voice calls;
   a send message button that is selectable to transmit voice messages and emoji messages;
   a record voice button that is selectable to record the voice messages; and
   a check message button that is selectable to play an available voice message or view an available emoji message.

4. The communication system of claim 3, wherein each of the first and second user interfaces further includes an interactive view window including a toolbar configured to display notification icons, an animation corresponding to a current emoji selected by a first user or a second user, and an emoji tracker.

5. The communication system of claim 4, wherein each emoji tracker is a visual indicator that is configured to indicate a predetermined number of emoji slots allowed in an emoji message, to identify which of the emoji slots are filled and empty as the user presses emoji buttons to build a sequence of emojis, and to track a position of the current emoji that is displayed in the interactive view window within the sequence of emojis.

6. The communication system of claim 3, wherein the function buttons of the first and second user interfaces further includes a play games button, and in response to receiving user input pressing the play games button, the first and second communication devices are configured to:
- automatically display a single player emoji-based game if the user input pressing the play games button is received while the other one of the first and second communication devices is powered off/asleep or outside a threshold distance,
- display single player and multi-player emoji-based games if the user input pressing the play games button is received while both the first and second communication devices are powered on/awake and within the threshold distance from each other, or
- automatically display a multi-player emoji-based game if the user input pressing the play games button is received while the first and second communication devices are currently connected on a voice call.

7. The communication system of claim 1, wherein, when the first communication device and the second communication device are both powered on/awake and within a threshold distance from each other, and a first user of the first communication device and a second user of the second communication device are both present/currently active:
- the first communication device places a voice call to the second communication device, displays a notification that the voice call is connected for live two-way interaction if the second user accepts the voice call via the second communication device, or outputs a prompt to leave a voicemail if the second user did not answer the voice call; and
- the second communication device displays a prompt to accept the voice call incoming from the first communication device, displays a notification indicating a missed call if the second user did not answer the voice.

8. The communication system of claim 1, wherein, when the first communication device and the second communication device are both powered on/awake and within a threshold distance from each other, and a first user of the first communication device is present/currently active but a second user of the second communication device is absent/inactive:
- the first communication device transmits an emoji message to the second communication device, displays a sequence of animated emojis from the emoji message in the first user interface on the first display, and displays a notification indicating that the emoji message was delivered successfully to the second communication device; and
- the second device receives the emoji message from the first communication device, stores the received emoji message in a memory of the second communication device, and displays a notification indicating that the emoji message has been received in the second user interface on the second display.

9. The communication system of claim 1, wherein, when the first communication device and the second communication device are both powered on/awake and within a threshold distance from each other, and a first user of the first communication device is present/currently active but a second user of the second communication device is absent/inactive:
- the first communication device places a voice call to the second communication device, and outputs a prompt to leave a voicemail if the second user did not answer the voice call via the second communication device; and
- the second communication device displays a prompt to accept the voice call incoming from the first communication device, displays a notification indicating a missed call if the second user did not answer the voice call.

10. The communication system of claim 1, wherein, when the first communication device is powered on/awake but the second communication device is powered off/asleep or outside a threshold distance:
- the first communication device attempts to transmit an emoji message to the second communication device, displays a sequence of emojis from the emoji message in the first user interface on the first display, and displays an error message indicating that delivery of the emoji message to the second communication device failed, wherein the error message includes a warning that the second communication device must be powered on/awake and within a threshold distance from the first communication device to allow the first communication device to communicate with the second device over the short-range wireless network; and
- the second communication device cannot receive and store the emoji message while the second communication device is powered off/asleep or outside a threshold distance, and does not display any notification relating to the emoji message once the second communication device is powered on/awake.

11. The communication system of claim 1, wherein, when the first communication device is powered on/awake but the second device is powered off/asleep or outside a threshold distance:
- the first communication device attempts to place a voice call to the second communication device, and displays an error message indicating that the voice call cannot be connected with the second device, wherein the error message includes a warning that the second communication device must be powered on/awake and within a threshold distance from the first communication device to communicate with the second communication device over the short-range wireless network; and
- the second communication device cannot receive the voice call from the first communication device while the second communication device is powered off/asleep or outside a threshold distance, and does not display any notification relating to the voice call once the second communication device is powered on/awake.

12. The communication system of claim 1, further comprising a third communication device including a third display configured to display a third user interface, and a third wireless communications interface,
- wherein the third communication device is configured to perform a secure pairing process to allow the third communication device to communicate with the first communication device, the second communication device, or both over the short-range wireless network via the third wireless communications interface.

13. A communication system comprising:
- a first communication device including a first set of buttons and a first wireless communications interface; and
- a second communication device including a second set of buttons and a second wireless communications interface,
- wherein the first communication device and the second communication device are paired in advance to allow the first communication device and the second communication device to communicate exclusively over a short-range wireless network via the first and second wireless communications interfaces, each of the first and second sets of buttons includes a plurality of function buttons associated with calling and messaging functions, and a plurality of emoji buttons associated with building emoji-based messages and playing emoji-based games,
- wherein, when the first communication device and the second communication device are both powered on/awake and within a threshold distance from each other, and a first user of the first communication device is present/currently active but a second user of the second communication device is absent/inactive:
- the first communication device transmits an emoji message to the second communication device, displays a sequence of animated emojis from the emoji message in a first user interface on a first display on the first communication device, and displays a notification indicating that the emoji message was delivered successfully to the second communication device; and
- the second device receives the emoji message from the first communication device, stores the received emoji message in a memory of the second communication device, and displays a notification indicating that the emoji message has been received in a second user interface on a second display of the second communication device.

14. The communication system of claim 13, wherein the first communication device of a first user can transmit a remote input directed to the second communication device of the second user over a short-range wireless network via the first wireless communications interface, and the second wireless communication interface receives the remote input when the second communication device is powered on/awake and within a threshold distance from the first communication device.

15. The communication system of claim 14, wherein the short-range wireless network is a private peer-to-peer network in which the first communication device and the second communication device can communicate only with each other.

16. The communication system of claim 14, wherein the first communication interface and the second communication interface enable live two-way interaction between the user of the first communication device and the second user of the second communication device when the second communication device is powered on/awake and within the threshold distance from the first communication device, and the second user is present/currently active.

17. The communication system of claim 14, wherein the first communication device and the second communication device disable communications between the second communication device of the second user and the first communication device of the first user when the second communication device is powered off/asleep or outside the threshold distance from the first communication device.

18. A communication system comprising:
- a first communication device having a display including a first set of buttons and a first wireless communications interface; and
- a second communication device having a display including a second set of buttons and a second wireless communications interface,
- wherein the first communication device and the second communication device are paired in advance to allow the first communication device and the second communication device to communicate exclusively over a short-range wireless network via the first and second wireless communications interfaces, each of the first and second sets of buttons includes a plurality of function buttons associated with calling and messaging functions, and a plurality of emoji buttons associated with building emoji-based messages and playing emoji-based games, and the first communication device displays one or more prompts or notifications on the display of the first communication device when the second communication device is powered on/awake and within a threshold distance from the first communication device, and a second user is present/currently active,
- wherein, when the first communication device is powered on/awake but the second communication device is powered off/asleep or outside a threshold distance:
- the first communication device attempts to transmit an emoji message to the second communication device, displays a sequence of emojis from the emoji message in the first user interface on the first display, and displays an error message indicating that delivery of the emoji message to the second communication device failed, wherein the error message includes a warning that the second communication device must be powered on/awake and within a threshold distance from the first communication device to allow the first communication device to communicate with the second device over the short-range wireless network; and
- the second communication device cannot receive and store the emoji message while the second communication device is powered off/asleep or outside a threshold distance, and does not display any notification relating to the emoji message once the second communication device is powered on/awake.

19. The communication system of claim 18, wherein the display of the second communication device displays a prompt to receive a remote input from the first communication device when the second communication device is powered on/awake and within the threshold distance from the first communication device, and the second user is present/currently active.

20. The communication system of claim 18, wherein, when the first communication device and the second communication device are both powered on/awake and within a threshold distance from each other, and a first user of the first communication device and a second user of the second communication device are both present/currently active:
- the first communication device transmits an emoji message to the second communication device, displays a sequence of animated emojis from the emoji message in the first user interface on the first display, and displays a notification indicating that the emoji message was delivered successfully to the second communication device; and
- the second communication device receives the emoji message from the first communication device, and displays a prompt indicating that the second user can view the received emoji message in the second user interface on the second display.

\* \* \* \* \*